United States Patent
Elder et al.

(10) Patent No.: US 11,269,095 B2
(45) Date of Patent: Mar. 8, 2022

(54) CABLELESS SEISMIC ACQUISITION WITH HIERARCHICAL COMMUNICATION PROTOCOL

(71) Applicant: Wireless Seismic, Inc., Sugar Land, TX (US)

(72) Inventors: Keith Elder, Richmond, TX (US); Jerry Edward Stair, Richmond, TX (US); Garrick Thomas Wager, Arvada, CO (US); Steven Kooper, Richmond, TX (US); Joshua Dice, Louisville, CO (US)

(73) Assignee: Wireless Seismic, Inc., Sugar Land, TX (US)

( * ) Notice: Subject to any disclaimer, the term of this patent is extended or adjusted under 35 U.S.C. 154(b) by 0 days.

(21) Appl. No.: 16/442,162

(22) Filed: Jun. 14, 2019

(65) Prior Publication Data
US 2021/0181361 A1    Jun. 17, 2021

Related U.S. Application Data

(63) Continuation of application No. 16/166,799, filed on Oct. 22, 2018, now abandoned, which is a continuation of application No. 14/699,940, filed on Apr. 29, 2015, now Pat. No. 10,107,926.

(60) Provisional application No. 61/985,958, filed on Apr. 29, 2014, provisional application No. 61/986,019, filed on Apr. 29, 2014.

(51) Int. Cl.
*G01V 1/22*    (2006.01)
*G01V 1/24*    (2006.01)

(52) U.S. Cl.
CPC ............... *G01V 1/223* (2013.01); *G01V 1/22* (2013.01); *G01V 1/24* (2013.01)

(58) Field of Classification Search
CPC ............. G01V 1/22; G01V 1/223; G01V 1/24
USPC ......................................................... 367/77
See application file for complete search history.

(56) References Cited

U.S. PATENT DOCUMENTS 7,224,642 B1    5/2007 Tran
7,773,457 B2    8/2010 Crice et al.
(Continued)

FOREIGN PATENT DOCUMENTS

EP            2657723 A1    10/2013

OTHER PUBLICATIONS

Prosecution History of U.S. Appl. No. 14/699,940, by Elder et al., dated Mar. 29, 2017-Jun. 19, 2018, 94 pp.
U.S. Appl. No. 16/166,799, by Elder et al., filed Oct. 22, 2018.

*Primary Examiner* — Ian J Lobo
(74) *Attorney, Agent, or Firm* — Davis Graham & Stubbs LLP

(57) ABSTRACT

A cableless seismic acquisition system that is configured to resolve the locations of a plurality of cableless seismic acquisition units (e.g., up to 1,000,000 or more) of the system at sub-meter levels of accuracy (e.g., less than 10 cm, less than 5 cm, etc.) free of many of the limitations of existing manners of determining cableless unit locations in seismic acquisition systems. While accurately determining cableless unit locations for use in mapping underground structures of interest, the disclosed cableless seismic acquisition system also limits power demands of and ultimately power consumption by the cableless units to extend serviceable deployment time of the cableless acquisition system.

13 Claims, 41 Drawing Sheets

(56) References Cited

U.S. PATENT DOCUMENTS

| | | | |
|---|---|---|---|
| 8,228,757 B2 * | 7/2012 | Beffa | G01V 1/223 367/50 |
| 8,238,198 B2 | 8/2012 | Crice | |
| 8,614,928 B2 | 12/2013 | Kooper et al. | |
| 9,594,175 B2 | 3/2017 | Crice et al. | |
| 9,841,517 B2 | 12/2017 | Elder et al. | |
| 10,107,926 B1 | 10/2018 | Elder et al. | |
| 10,156,650 B2 | 12/2018 | Crice et al. | |
| 10,180,510 B2 | 1/2019 | Elam et al. | |
| 2005/0276162 A1 | 12/2005 | Brinkmann et al. | |
| 2008/0219094 A1 | 9/2008 | Barakat | |
| 2009/0225629 A1 | 9/2009 | Ray | |
| 2009/0324216 A1 | 12/2009 | Golparian | |
| 2010/0128565 A1 | 5/2010 | Golparian | |
| 2010/0195438 A1 | 8/2010 | Goujon | |
| 2010/0318299 A1 | 12/2010 | Golparian et al. | |
| 2012/0106296 A1 | 5/2012 | Boucard | |
| 2014/0098641 A1 * | 4/2014 | Ray | G01V 1/00 367/77 |

\* cited by examiner

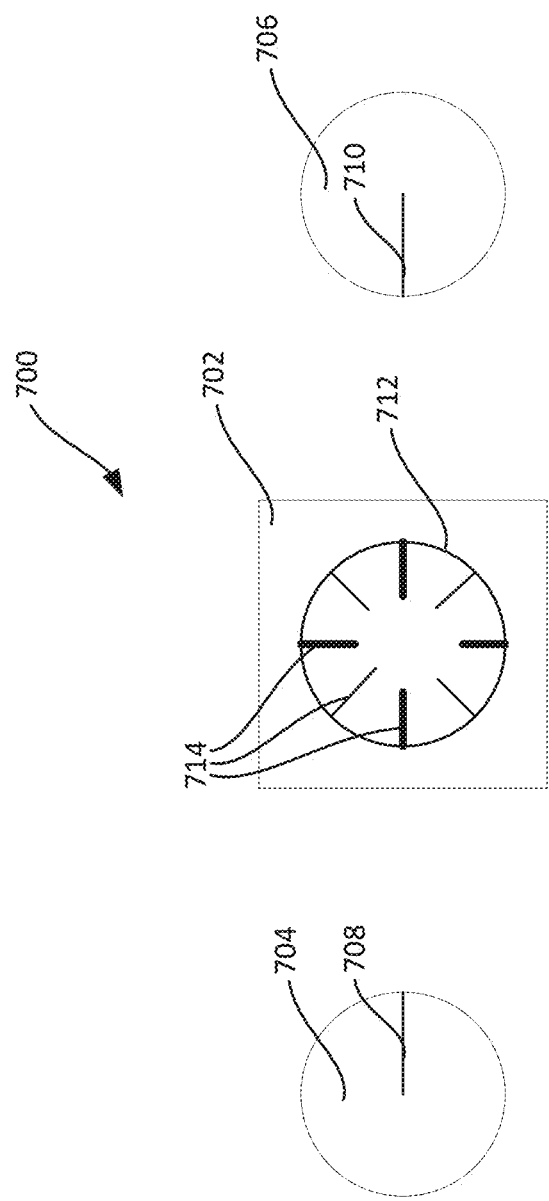

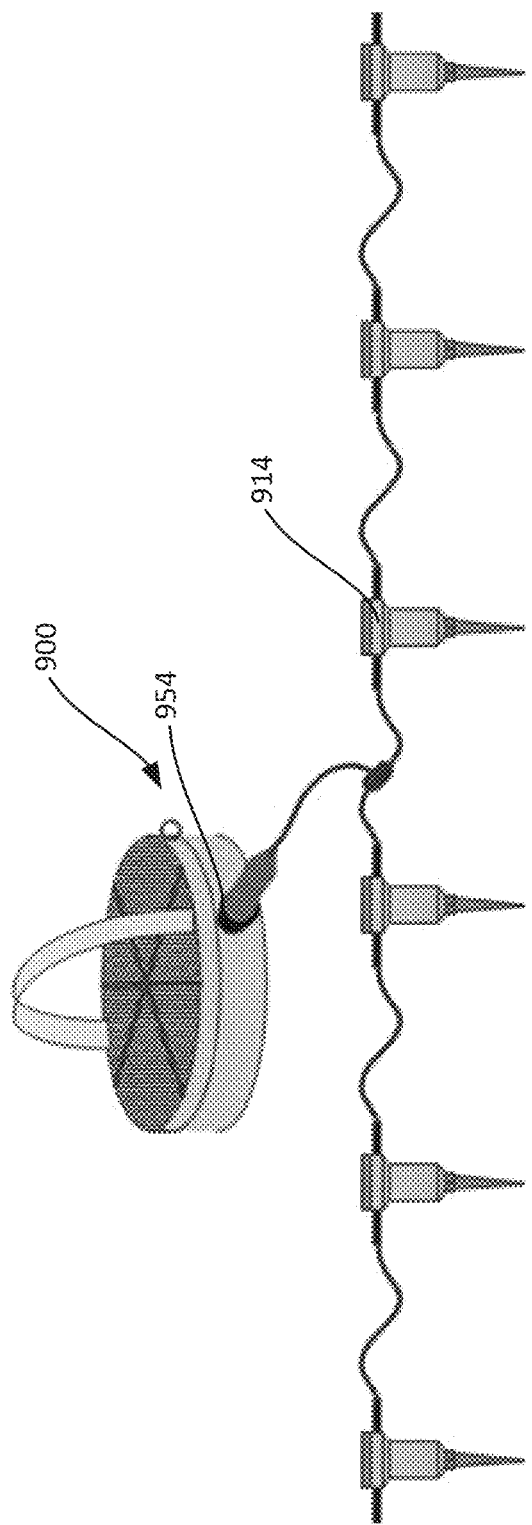
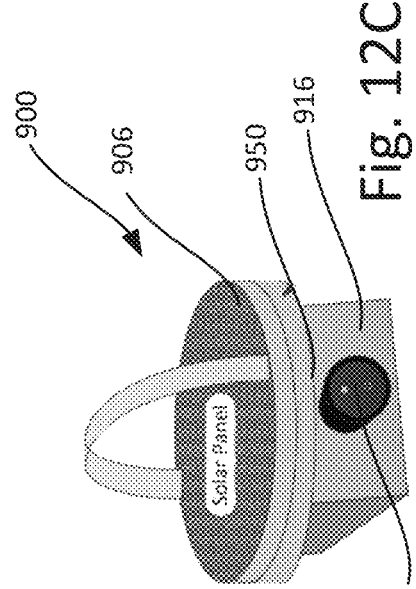

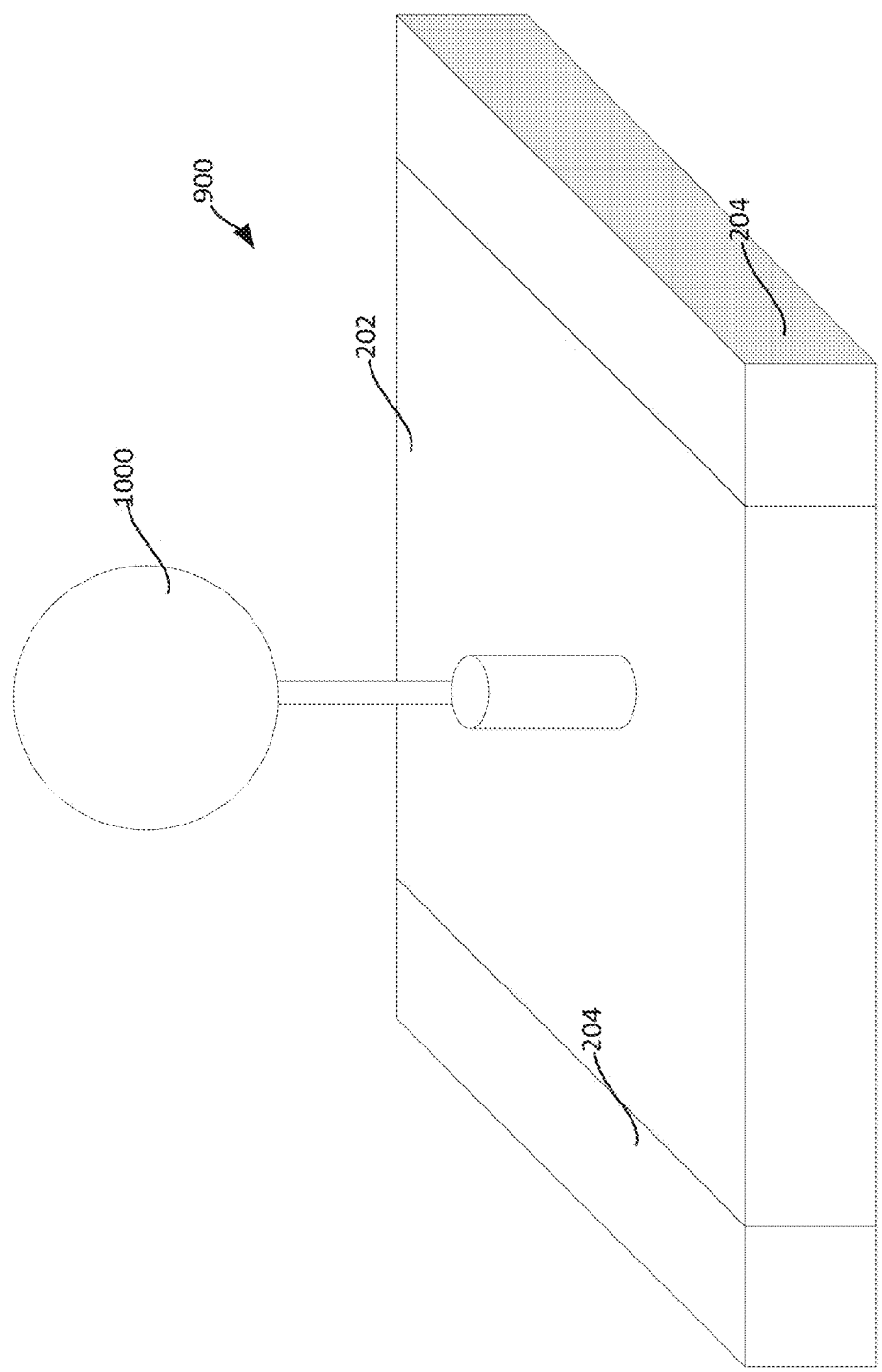

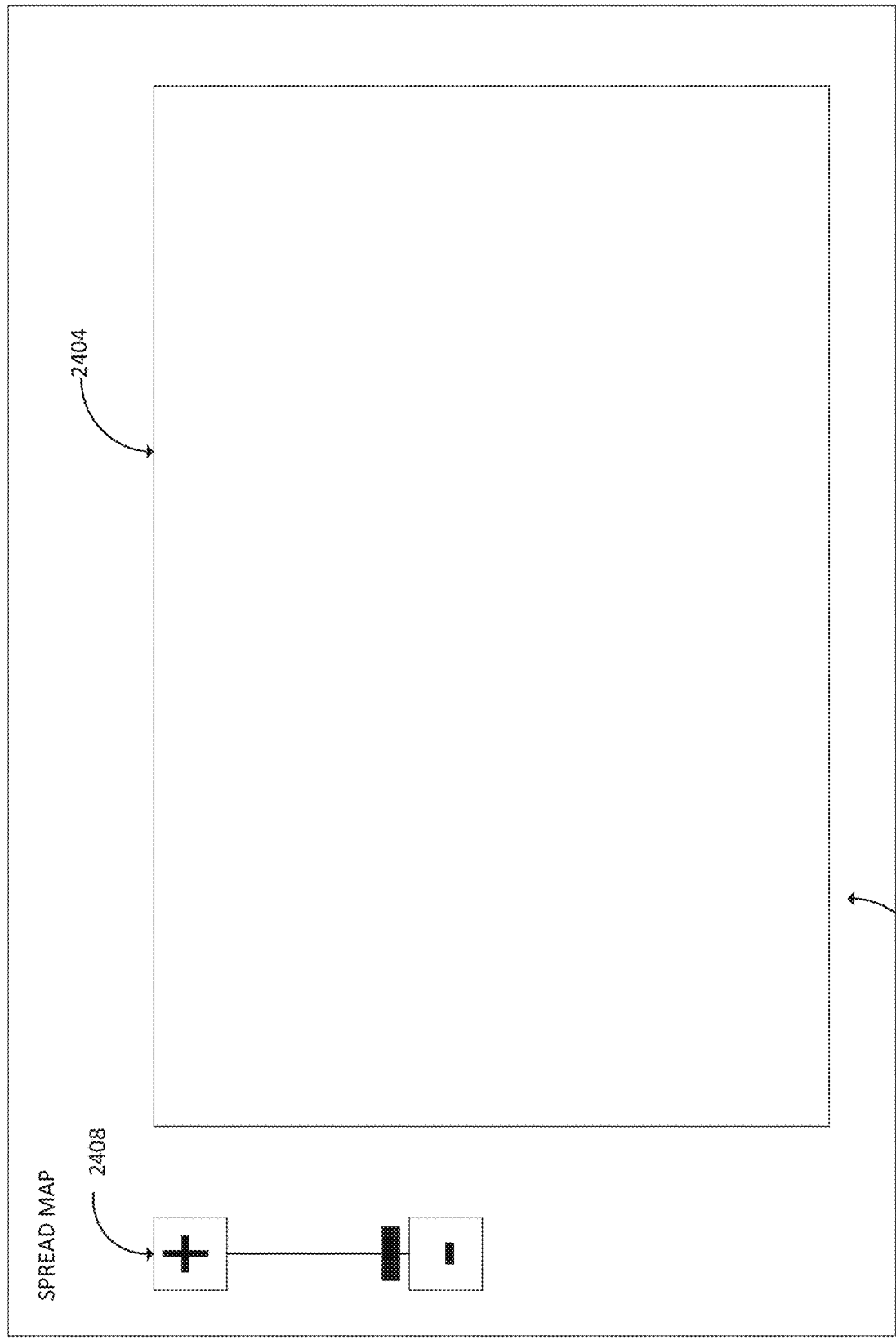

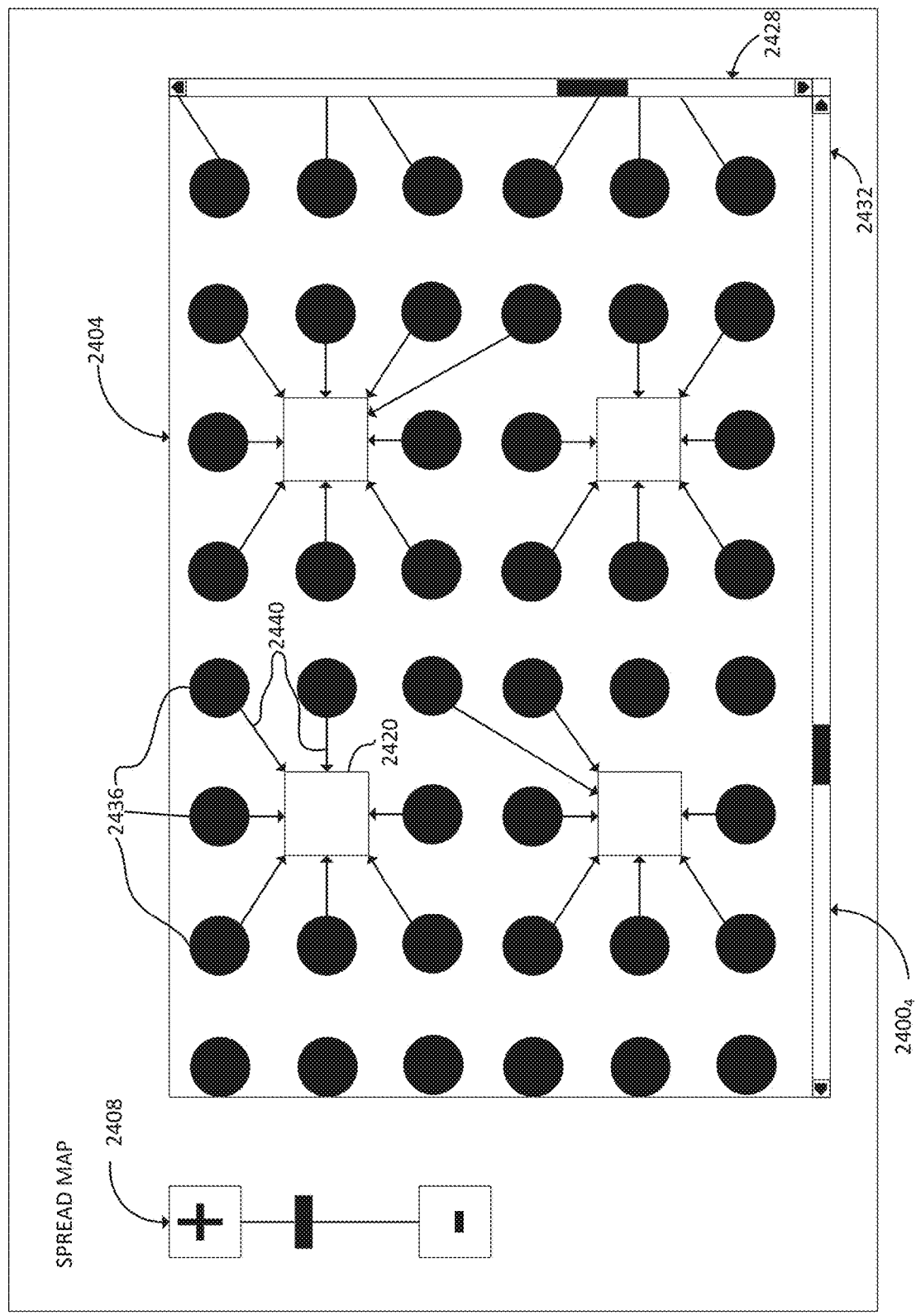

CABLELESS SEISMIC ACQUISITION WITH HIERARCHICAL COMMUNICATION PROTOCOL

CROSS-REFERENCE TO RELATED APPLICATIONS

This application is a continuation of U.S. application Ser. No. 16/166,799 filed on Oct. 22, 2018 entitled, "CABLELESS SEISMIC ACQUISITION WITH HIERARCHICAL COMMUNICATION PROTOCOL," which is a continuation of U.S. application Ser. No. 14/699,940 filed on Apr. 29, 2015 entitled "CABLELESS SEISMIC ACQUISITION WITH HIERARCHICAL COMMUNICATION PROTOCOL," which claims priority to U.S. Prov. App. 61/986,019 filed on Apr. 29, 2014, entitled "MOTES FOR CABLELESS SEISMIC SURVEYS" and which claims priority to U.S. Prov. App. 62/958,958 filed Apr. 29, 2014 entitled "LOW POWER CABLELESS SEISMIC ACQUISITION SYSTEM WITH AUTONOMOUS CONFIGURATION", which are incorporated by reference herein in their entireties.

BACKGROUND

Acquisition of seismic data through the use of seismic surveying techniques provides important data that is helpful in a number of different industries and contexts. For instance, seismic surveys may be utilized to create images of subsurface geological structures. These images may then be used to determine, among other applications, optimum places to drill for oil and gas and to plan and monitor enhanced resource recovery programs. Seismic surveys may also be used in a variety of additional contexts outside of oil exploration such as, for example, locating subterranean water and planning road construction.

A seismic survey is normally conducted by placing an array of seismic acquisitions units or vibration sensors (accelerometers or velocity sensors called "geophones") on the ground, typically a line or in a grid of rectangular or other geometry. Vibrations (often referred to as "source events") are created, such as by explosives, a mechanical device such as a vibrating energy source or weight drop. These vibrations propagate through the earth, taking various paths, refracting and reflecting from discontinuities in the subsurface. For instance, the seismic energy may propagate into the earth and be reflected and/or refracted by subsurface seismic structures (e.g., interfaces between subsurface lithologic or fluid layers characterized by different elastic properties). In turn, the refracted and reflected seismic energy may be detected by the array of vibration sensors deployed in connection with the seismic survey. In turn, signals at the sensors may be amplified and digitized, by separate electronics and/or internally in the seismic acquisition units. In other contexts, the survey may be performed passively by recording natural vibrations in the earth. In any regard, the data from the sensors is eventually processed to create the desired information about the subsurface geological structures in the area being surveyed.

Recently, seismic survey systems that forgo traditional cabling to provide data collection have been proposed with recognition of the benefits of providing cableless seismic acquisition units in a seismic survey (e.g., associated with the elimination of certain problems associated with deploying, maintaining, and collecting cables from a survey area). However, such cableless units present additional considerations in maximizing the benefit of the use of the cableless units. For example, the serviceable deployment time of the units can be reduced compared to cabled units as each cableless unit must generally rely upon a local power source (e.g., a battery or the like). In turn, the battery life is often a limiting factor in the serviceable deployment time of a cableless acquisition system. This limitation on serviceable deployment time applies to both cableless systems that utilize telemetry for data read out as well as nodal systems that store data locally at each acquisition unit during the course of the seismic survey.

Furthermore, it is important to precisely know the location of each cableless unit in a cableless system as well as synchronize the timing systems of the various cableless units to produce reliable information regarding the subsurface geological structure(s) of interest. However, determining the location of each cableless unit and synchronizing the timing systems of the units can place additional demands on the local power sources and further limit serviceable deployment time. Furthermore, labor intensive and costly surveying techniques are often required to precisely locate the various units in a survey (e.g., including surveyors employing hand-held GNSS (e.g., GPS) modules and other equipment to precisely locate each unit during deployment of the units in a field in any appropriate pre-defined pattern).

Some traditional systems utilize location determination units (e.g., GPS modules having GPS receivers, processors for processing received GPS signals, memory, etc.) on board each cableless seismic acquisition unit that are each operable to resolve each cableless unit's location and provide a coordinated reference to Coordinated Universal Time (UTC). Such location determination and timing synchronization may occur at the deployment of units and/or throughout the course of the survey. However, the use of GPS modules at the cableless units requires significant amounts of power, thus quickly degrading the serviceable deployment time of acquisition unit. Moreover, while attempts have been made to reduce the power requirement for such GPS modules (e.g., by duty cycling the GPS module to periodically activate, acquire location and timing information, and deactivate), the need to include a GPS module each acquisition module can still be cost prohibitive—this may especially be the case for very large arrays with thousands, tens of thousands, or, in anticipated applications, hundreds of thousands or more than a million units. Still further, the GPS modules are typically not able to resolve locations to any greater than about five meter accuracy. As a result of such inferior location accuracy, traditional approaches still often require traditional surveying techniques. Even without on-board GPS modules, high channel (e.g., 1,000,000 or more) systems using traditional cableless units would be cost prohibitive.

SUMMARY

In view of the foregoing, it has been recognized that, while cableless solutions show promise over traditional cabled systems, there is a continued need for improvements in cableless systems to address needs in the industry of seismic surveying. The present disclosure may facilitate highly scalable seismic survey systems that include a very large number of acquisition channels (e.g., 100,000 or more, 250,000 or more, 1,000,000 or more, etc.). Specifically, the present disclosure may facilitate scalable seismic survey systems that are cost-effective in view of the very large channel counts facilitated by the system. Accordingly, seismic systems may be facilitated with very large channel numbers that employ real time or near real-time data read out in a cost-effective manner.

The disclosed cableless seismic acquisition system may employ an array of cableless wireless acquisition units (e.g., also referred to herein as motes, mote units, digitizers) that each may include a power source (e.g., battery and/or solar panel), a geophone for acquiring seismic data or facilities for connection of a geophone, a receiver (e.g., GPS receiver including antenna, voltage regulator, RAM, etc.) configured to receive positioning signals from one or more positioning signal transmitters (e.g., GPS satellites, etc.), and a short-range radio transmitter unit that is configured to send the acquired seismic data and the positioning signals to a local concentrator unit (e.g., collection unit). As an example, the disclosed system may include a plurality (e.g., up to 1,000,000 or more) of cableless acquisition units arranged in any appropriate manner over a survey area, where a smaller number of local concentrator units may also be distributed over the survey area, each local concentrator unit being configured to receive seismic data and/or positioning signals from a subset of the plurality of cableless acquisition units (e.g., 2, 4, 10, 16, 20, etc.). For instance, the system may include a plurality of rows of concentrator units, where each row is associated with a line interface unit (LIU), base station unit (BSU), or cross-line collection device. In this regard, each concentrator unit may be configured to transmit acquired data to an adjacent concentrator unit in the row in a serial fashion, all of which may be received by the LIU of the row. Each of the various LIUs may be configured to transmit the acquired information to a central recording unit (CRU) or the like for any appropriate processing of the data.

Furthermore, the present disclosure discusses mechanisms for initializing a seismic system once deployed. That is, especially in the context of a system with very large channel counts, organization of the array to facilitate real time read out from the array may be burdensome to provide in a predetermined or prearranged fashion. In this regard, embodiments are disclosed herein that allow for distribution or deployment of motes, concentrators, LIUs, or other units into the seismic survey area that are configured for communication according to the telemetry described herein after deployment. Such configuration may include beaconing and/or other communication between units that may not include seismic data for purposes of establishing communication links between units for later transmission of seismic data.

One particular example of such configuration may include a determination that is made after deployment of the units regarding which motes a given concentrator unit may communicate with in a given area. As may be appreciated, a given concentrator may be capable of operable communication with a plurality of motes. As such, given concentrator may be capable operable communication with a number of motes that exceeds the bandwidth available for real-time communication with each of the motes. In this regard, a given concentrator may be required to make a determination of which of the motes to communicate with such that bandwidth available at the concentrator unit is sufficient to support communication with a limited number of motes. Additionally, two or more concentrators within a particular area of the survey may be in operative communication with a plurality of motes such that the two or more concentrators may each be capable of communication with a given mote. In this regard, the concentrators may be operative to collectively determine which motes each of the given concentrator units should communicate with in a real time read out telemetry. Additional aspects of array formation and organization are discussed herein. Furthermore, approaches to contingencies in the event of loss of communication with one or more motes and/or concentrators is discussed.

The present disclosure describes embodiments of a cableless seismic acquisition system that is configured to resolve the locations of a plurality of cableless seismic acquisition units (e.g., up to 1,000,000 or more) of the system at sub-meter levels of accuracy (e.g., less than 10 cm, less than 5 cm, less than 1 cm etc.) free of many of the limitations of existing manners of determining cableless unit locations in seismic acquisition systems. While accurately determining cableless unit locations for use in mapping underground structures of interest, the disclosed cableless seismic acquisition system also limits power demands of, and ultimately power consumption by, the cableless units to extend serviceable deployment time of the cableless acquisition system.

More particularly, each mote unit may acquire seismic data (e.g., in response to explosives, mechanical devices, etc.) as well as positioning signals from a plurality of remote positioning signal transmitters according to any appropriate frequency and transmit (e.g., stream or periodically transmit on a regular or ad hoc basis) the same (e.g., free of processing the positioning signals) to its local concentrator unit. The concentrator unit and/or other unit remote from the mote unit (e.g., CRU) may then process the received, unprocessed (e.g., raw) positioning signals in any appropriate manner to determine a location (e.g., GPS coordinates) of the mote unit at sub-meter levels of accuracy and associate (e.g., tag) the determined location with the acquired seismic data. The acquired seismic data and tagged location data (e.g., as well as any appropriate corresponding timing/clock information) may then be transmitted from the concentrator to one or more remote units (e.g., to the mote unit from which the seismic data was acquired, to another concentrator unit, to an LIU, etc.).

In one arrangement, the processing to determine the location of each mote unit may utilize real time kinematics (RTK) whereby the concentrator or other unit remote from the mote unit may function as the base station while the mote unit may serve as the rover station. After making an initial determination of the mote's location with the received positioning signals, for instance, the concentrator unit may utilize its location together with code and carrier measurements to fix any phase ambiguities in the initially determined location of the mote to resolve the motes location to sub-meter levels of accuracy. In another arrangement, the processing to determine the location of each mote unit may utilize differential processing whereby the positioning signals received from the mote may be processed in combination with positioning signals received directly at the concentrator or other remote unit from the remote positioning system to resolve the motes location to sub-meter levels of accuracy.

In any case, information from positioning signals received at the concentrator unit (e.g., from the motes, directly from the remote positioning system, etc.) may also be used to synchronize a timing system of the concentrator unit to that of the remote positioning system so that positioning signals received at a particular concentrator from various motes can be processed according to a common time reference. In one arrangement, the concentrator may send synchronized timing reference signals to each of its one or more motes, where each mote may use the synchronized timing reference signals to synchronize or otherwise correct an internal clock of the mote to a common time reference with the other motes in the system. One such example of a synchronized timing reference signal may be a pulse per second (PPS) signal. In any regard, the synchronized timing signals may then be appended to the received positioning signals before being transmitted back to the concentrator. In other arrangements, the concentrator may appropriately correct the local timing references appended to positioning signals received from the various motes using the already-synchronized timing system of the concentrator (e.g., which in some cases may further include accounting for transmission and processing latency, environmental factors, and the like).

Accordingly, a first aspect includes an apparatus for use in conducting a seismic survey. The apparatus includes a power source, a sensor for acquiring seismic information, and a short-range radio transmitter unit. The short-range radio transmitter is powered by the power source and configured to communicate a digital seismic signal including the seismic information via a wireless protocol with a concentrator. The short-range radio transmitter system is adapted for short-range communications of less than 200 m. The apparatus also includes a timing unit for associating a local time reference with the seismic information. The local time information is obtained by acquiring a remote time reference from a remote clock and using the remote time reference to control the timing unit so as to establish the local time reference applicable to the seismic information of the sensor. The local time reference is different than other time references used by other geophones of the seismic survey.

A number of feature refinements and additional features are applicable to the first aspect. These feature refinements and additional features may be used individually or in any combination. As such, each of the following features in relation to the first aspect or any other aspect that will be discussed may be, but are not required to be, used with any other feature or combination of features of the first aspect.

For instance, the power source may include a rechargeable battery. Additionally or alternatively, the power source may include a solar collector. The power source may be a remote source that provides power for use by the transmitter unit via wireless signals.

The sensor may include a geophone that outputs the seismic information in an analog signal. As such, an analog to digital convertor for receiving the analog signal and providing digital signal including the seismic information may be provided. Alternatively, the sensor (e.g., geophone) may output the seismic information in a digital signal. In this regard, the sensor may be MEMS accelerometer or the like.

The local time reference may be associated with the seismic information prior to transmission of the seismic data to the concentrator. Alternatively, the time reference may be associated with the seismic information after transmission to the concentrator (e.g., at the concentrator such as at the time of receipt of the data).

A second aspect includes a seismic system for use in conducting a seismic survey. The system includes a concentrator for wirelessly receiving seismic data via a first wireless protocol from a plurality of motes and for wirelessly transmitting the seismic data via a second wireless protocol to another concentrator. The system also includes first and second wireless motes of the plurality of motes that each includes a sensor for acquiring seismic data and a short-range radio for communicating with the concentrator via the first wireless protocol. As such, the first wireless protocol enables communication between the first wireless mote and the concentrator and the second wireless mote and the concentrator wherein the short-range radio of each of the first and second motes is adapted for short-range communications of less than 200 m.

A number of feature refinements and additional features are applicable to the second aspect. These feature refinements and additional features may be used individually or in any combination. As such, each of the foregoing or following features in relation to the second aspect or any other aspect that will be discussed may be, but are not required to be, used with any other feature or combination of features of the second aspect.

For instance, the short-range radio of each of the first and second motes may be adapted for short range communications of less than 100 m. The concentrator may be adapted for mid-range wireless communications (i.e., to another concentrator) of greater than 50 m. In an embodiment, the array may include multiple concentrators and the second wireless protocol may enable concurrent communications between different pairs of the concentrators. The different pairs of the concentrators may be in a single serial data communication line of concentrators.

A third aspect includes a seismic system for use in conducting seismic surveys. The system includes a central station for receiving seismic data from the array, a number of concentrators, and a plurality of seismic acquisition units. The concentrators are arranged in a plurality of serial data transfer lines where seismic data is passed from concentrator-to-concentrator along each of the serial data transfer lines towards the central station. Furthermore, a plurality of the seismic acquisition units are in communication with each of the concentrators. Each of the seismic acquisition units include a sensor (e.g., a geophone) for acquiring seismic data and a wireless transmitter for transmitting the seismic data to at least one of the concentrators. The sensor may be integrated to the mote and/or attachable to the mote. The sensor may be a single point receiver or may comprise a plurality (e.g., a string) of sensors such as a geophone string. The seismic acquisition units are configured for enabling communication between each of two of the seismic acquisition units and one of the concentrators. Furthermore, the concentrators are configured for enabling concurrent communication between two different pairs of the concentrators. The two different pairs are both in one of the serial data transfer lines.

A number of feature refinements and additional features are applicable to the third aspect. These feature refinements and additional features may be used individually or in any combination. As such, each of the foregoing and/or following features that will be discussed in relation to the other aspects may be, but are not required to be, used with any other feature or combination of features of the third aspect.

A fourth aspect includes a method for configuration of a cableless array of seismic data acquisition units. The method includes deploying a concentrator unit. In turn, the method includes controlling a directionalized antenna at the concentrator unit to define a scan field relative to the concentrator unit. A plurality of acquisition units are disposed within the scan field. In turn, the method includes receiving from each of the plurality of acquisition units in the scan field a signal and measuring at least one signal characteristic for each of the signals. The method further includes determining at least one of the plurality of acquisition units with which to establish operative communication based on the at least one signal characteristic of each corresponding one of the signals.

A number of feature refinements and additional features are applicable to the fourth aspect. These feature refinements and additional features may be used individually or in any combination. As such, each of the foregoing and/or following features that will be discussed in relation to the fourth aspect and any other aspect may be, but are not required to be, used with any other feature or combination of features of the fourth aspect.

For example, the scan field may include less than a circumferential entirety surrounding the acquisition unit. The directionalized antenna may include at least one of a phased array antenna or a segmented element antenna array. The plurality of acquisition units may include at least one acquisition unit from a data transmission network other than a serial data transmission network to which the concentrator unit belongs.

In an embodiment, the at least one signal characteristic may include at least one of a signal strength, a time of arrival, a time difference of arrival, an angle of arrival, a code, or a frequency. The method may also include establishing operative communication between the at least one of the plurality of acquisition modules and the concentrator unit. The establishing may further include coordinating communication between the at least one of the plurality of the acquisition modules and the concentrator unit. In an embodiment, the communication between the at least one of the plurality of acquisition modules and the concentrator unit may be without interference from others of the plurality of acquisition modules. That is, the concentrator may be operative to receive a communication from one or more of the plurality of acquisition modules even in the presence of other signals from other acquisition modules. The signal received from each of the plurality of acquisition units may be a response to a beacon signal transmitted by the concentrator unit through the scan field. Alternatively, the deploying may include locating the acquisition unit at a predetermined known location. The determining may be performed without regard to location data regarding the at least one of the plurality of acquisition units. The determining may be performed at least partially based on a predefined acquisition unit plan.

A fifth aspect includes a method of autonomously configuring a plurality of deployed acquisition units in a seismic survey area. The method includes scanning using a directionalized antenna at a concentrator unit to detect at least one of the plurality of deployed acquisition units. The method further includes communicating signals between the at least one of the plurality of deployed acquisition units and the concentrator unit and establishing communication between the at least one of the plurality of deployed acquisition units and the concentrator unit based on signal characteristics measured for the signals.

A number of feature refinements and additional features are applicable to the fifth aspect. These feature refinements and additional features may be used individually or in any combination. As such, each of the foregoing and/or following features that will be discussed in relation to the fifth aspect or any other aspect may be, but are not required to be, used with any other feature or combination of features of the fifth aspect.

For instance, the signal characteristics may be used to determine appropriate communication between the at least one of the plurality of deployed modules and the concentrator unit in relation to a predetermined seismic survey plan.

A sixth aspect includes a system for use in collection of seismic data in relation to a seismic survey. The system includes a plurality of seismic acquisition units operative to detect seismic energy and generate seismic data corresponding to the detected seismic energy. Each seismic acquisition unit includes a transceiver operative for communication with a device remote to the respective seismic acquisition unit. The system further includes a concentrator having a directionalized antenna controllable in at least a plane extending parallel to a reference plane upon which the concentrator is disposed. The directionalized antenna is controllably operable to transmit and receive signals from the plurality of seismic acquisition units within the scan field in a portion of the reference plane less than the entirety of the scan field. The system also includes a signal processing module at the concentrator operative to determine, based on signal characteristics of the received signals, an appropriate one of the plurality of seismic acquisition modules with which the concentrator is to communicate in connection with the seismic survey.

A number of feature refinements and additional features are applicable to the sixth aspect. These feature refinements and additional features may be used individually or in any combination. As such, each of the foregoing and/or following features that will be discussed in relation to the sixth aspect or any other aspect may be, but are not required to be, used with any other feature or combination of features of the sixth aspect.

For instance, the directionalized antenna may include at least one of a phased array antenna or a segmented element array antenna. The acquisition unit may be operative to communicate the seismic data to the concentrator. Also, the signal processing module may be operative to determine the appropriate one of the plurality of the seismic acquisition units based on the signal characteristics in relation to an anticipated signal characteristic of a predefined module according to a survey plan.

A seventh aspect includes a method for acquisition of seismic data in a seismic survey. The method includes acquiring seismic data at a mote unit and receiving positioning signals from a remote positioning system at the mote unit. The method further includes transmitting the seismic data and the positioning signals from the mote unit to a concentrator unit and processing the positioning signals remotely from the mote unit to determine a location of the mote unit. In turn, the method includes associating the location of the mote unit with the seismic data acquired by the mote unit. The method further includes transmitting the seismic data from the concentrator unit to a remote unit in the seismic survey.

A number of feature refinements and additional features are applicable to the seventh aspect. These feature refinements and additional features may be used individually or in any combination. As such, each of the foregoing and/or following features that will be discussed in relation to the seventh aspect or any other aspect may be, but are not required to be, used with any other feature or combination of features of the seventh aspect.

For instance, the positioning signals transmitted from the mote unit to the concentrator may be in an unprocessed state. As such, the processing may occur at a central recording unit remote from the mote unit and the concentrator unit. Alternatively, the processing may occur at the concentrator unit.

In an embodiment, the method may include synchronizing a timing system at the concentrator to a positioning system time reference based on the position signals from the remote positioning system. The positioning signals used in the synchronizing may be received at the concentrator unit by way of wireless communication from another unit in the seismic survey. Specifically, the another unit in the seismic survey comprises the mote unit. Alternatively, the positioning signals used in the synchronizing may be received directly at the concentrator unit from the positioning system.

In an embodiment, the method includes providing a timing reference from the concentrator unit to the mote unit.

In at least one application, the processing may include real time kinematics (RTK) processing performed in relation to the positioning signals. Additionally or alternatively, the processing comprises differential processing performed in relation to the positioning signals. As such, the processing may result in determination of the location to a resolution of less than 1 meter. Alternatively, the processing may result in determination of the location to a resolution of no more than about 10 cm. Further still, the processing may result in determination of the location to a resolution of no more than about 2 cm.

In an embodiment, the method may include acquiring seismic data from a plurality of mote units and receiving positioning signals at the plurality of mote units. In turn, the plurality of mote units each transmit the seismic data and the positioning signals to the concentrator unit. In an application the method may include receiving positioning signals at a plurality of mote units, and the plurality of mote units may each transmit the positioning signals to a plurality of concentrator units. The plurality of concentrator units may be operative to determine the position of each of the plurality of mote units based on the positioning signals, and the plurality of concentrator units may be in operative communication to determine, at least in part based on the position of each of the plurality of mote units, to which concentrator unit of the plurality of concentrator units each given one of the plurality of mote units is to transmit seismic data. In still another potential application, the concentrator unit may be operative to transmit at least the seismic data to another concentrator unit in the seismic survey that belongs to a serial data transfer path defined by a plurality of concentrator units.

In an embodiment, the acquiring may include generating an analogue signal representative of the acquired seismic data and digitizing the seismic data prior to the transmitting. Alternatively, the acquiring may include generating digital seismic data representative of the acquired seismic data for transmitting to the concentrator unit. In an embodiment, the positioning signals may include GNSS signals. The mote may include an integrated sensor for acquiring the seismic data, such that the mote may be a single point receiver.

An eighth aspect includes an apparatus for use in conducting a seismic survey. The apparatus includes a power source and a geophone for acquiring seismic data. The apparatus further includes a short-range radio transmitter unit powered by the power source and that is configured to communicate the seismic data and a receiver configured to receive positioning signals from one or more positioning signal transmitters. The receiver is operative to provide the positioning signals to the short-range radio transmitter unit without processing the positioning signals for use in determining a location based on the positioning signals.

A number of feature refinements and additional features are applicable to the eighth aspect. These feature refinements and additional features may be used individually or in any combination. As such, each of the foregoing features or following features that will be discussed in relation to the other aspects may be, but are not required to be, used with any other feature or combination of features of the eighth aspect.

A ninth aspect includes a system for use in conducting a seismic survey. The system includes at least one mote unit operative to acquire seismic data and positioning signals at the at least one mote unit. The system also includes a concentrator unit operative to receive, from the at least one mote unit the seismic data and the positioning signals. In turn, the system includes a location processing module remote from the at least one mote unit, operative to receive the positioning signals provided to the concentrator unit from the at least one mote unit. The system also includes a central recording unit remote from the at least one mote unit and the concentrator unit that is operative to receive the seismic data from the concentrator unit.

A number of feature refinements and additional features are applicable to the ninth aspect. These feature refinements and additional features may be used individually or in any combination. As such, each of the foregoing features or following features that will be discussed in relation to the other aspects may be, but are not required to be, used with any other feature or combination of features of the ninth aspect.

A tenth aspect includes a method for use in locating seismic acquisition units in a seismic survey. The method includes receiving, at a concentrator unit from a plurality of seismic acquisition units, seismic data and positioning signals received at the seismic acquisition units. The method also includes processing the positioning signals remotely from the seismic acquisition units to determine respective locations of each of the seismic acquisition units. The method further includes tagging the seismic data received from each of the seismic acquisition units with a respective determined location of the seismic acquisition unit and transmitting the tagged seismic data from the concentrator unit to a remote unit in the seismic survey.

A number of feature refinements and additional features are applicable to the tenth aspect. These feature refinements and additional features may be used individually or in any combination. As such, each of the foregoing features or following features that will be discussed in relation to the tenth aspect or the other aspects may be, but are not required to be, used with any other feature or combination of features of the tenth aspect.

For instance, the method may also include sending the determined locations from the concentrator unit to each of the respective seismic acquisition units and obtaining, at the concentrator unit from the plurality of seismic acquisition units, additional seismic data that is tagged with the determined locations. The method may also include synchronizing a timing system at the unit to a positioning system time reference based on the received positioning signals. The method may further include adjusting local timing references associate with the seismic data and positioning signals received from the seismic acquisition units with the synchronized timing system.

In an embodiment, the positioning signals received from the seismic acquisition units may be in an unprocessed state. In an embodiment, the processing may occur at the concentrator unit. In at least one application, the processing occurs at another unit remote from the seismic acquisition units and the concentrator unit, and the method further includes receiving the determined locations of the seismic acquisition units at the concentrator unit from the another unit before the tagging step.

An eleventh aspect includes a method for use in seismic data acquisition. The method may include disposing, in series, a plurality of concentrator units that are operative to wirelessly communicate in a serial data transfer line among the plurality of concentrators from an upstream concentrator to a downstream concentrator and a central recording unit. The method may also include receiving at each of the plurality of concentrator units seismic data from a plurality of motes in operative communication with respective ones of the plurality of concentrator units using a first wireless communication protocol. The method may include assigning a first concentrator unit in said serial data transfer line a first transmission parameter of a second wireless communication protocol. The second wireless communication protocol is different than the first wireless communication protocol. The method may also include assigning a second concentrator unit in said serial data transfer line a second transmission parameter of the second wireless communication protocol. In turn, the method may include first transmitting, using said first transmission parameter, seismic data from the first concentrator to at least one downstream concentrator and second transmitting, using said second transmission parameter, seismic data from the second concentrator to at least one downstream concentrator. At least a portion of the first transmitting and at least a portion of the second transmitting occur during a common transmission period.

A number of feature refinements and additional features are applicable to the eleventh aspect. These feature refinements and additional features may be used individually or in any combination. As such, each of the foregoing features or following features that will be discussed in relation to the eleventh aspect or the other aspects may be, but are not required to be, used with any other feature or combination of features of the eleventh aspect.

For instance, the second transmitting may include receiving a first set of seismic data from the first concentrator. The first set of seismic data may at least include seismic data acquired by the plurality of motes in operative communication with the first concentrator. In turn, the method may also include appending a second set of seismic data to the first set of seismic data. The second set of seismic data may at least include seismic data acquired by the plurality of motes in operative communication with the second concentrator. In an application, the first transmission parameter is the same as the second transmission parameter and the first concentrator is spaced apart in the serial data transmission line from the second concentrator such that the first transmitting does not interfere with the second transmitting.

A twelfth aspect incudes a method for use in seismic data acquisition. The method includes detecting loss of communication with a disabled concentrator in a serial data transmission line comprising a plurality of concentrators, where each concentrator is in operative communication with a plurality of motes to receive acquired seismic data from the plurality of motes. The method further includes establishing operative communication between adjacent concentrators relative to the disabled concentrator. The method further includes contacting a plurality of motes orphaned by the disabled concentrator and initiating communication with each of the orphaned motes and the adjacent concentrators.

A number of feature refinements and additional features are applicable to the twelfth aspect. These feature refinements and additional features may be used individually or in any combination. As such, each of the foregoing features or following features that will be discussed in relation to the twelfth aspect or the other aspects may be, but are not required to be, used with any other feature or combination of features of the twelfth aspect.

For instance, at least one of the orphaned motes may establish contact with a first of the adjacent concentrators and at least one different one of the orphaned motes may establish contact with a second of the adjacent concentrators. The method may also include recording seismic data at a local memory of each of the plurality of orphaned motes in a time period between the detecting and the initiating. In turn, the seismic data recorded at the local memory of each of the plurality of orphaned motes from the time period between the detecting and the initiating may be communicated to the adjacent concentrator with which each respective orphaned mote initiates communication.

The establishing may include referencing a data table indicative of a wireless protocol for communication between concentrators to update an index for each of the adjacent concentrators for communication between the adjacent concentrators. Further still, the initiating may include sending a beaconing signal from at least one of the adjacent concentrators and listening for the beaconing signal from each of the plurality of orphaned motes. As such, the initiating may include receiving the beaconing signal at each of the plurality of orphaned motes and acknowledging the receipt of the beaconing signal. The plurality of orphaned motes may receive instructions regarding communication on a wireless protocol for communication between the plurality of orphaned motes and the adjacent concentrators. As such, in an application, the establishing may include referencing a data table indicative of a first wireless protocol for communication between concentrators to update an index for each of the adjacent concentrators for communication between the adjacent concentrators using the first wireless protocol and the initiating may include communicating instructions regarding communication on a second wireless protocol for communication between the plurality of orphaned motes and the adjacent concentrators.

A thirteenth aspect includes a method for use in seismic data acquisition. The method incudes detecting loss of communication with a disabled concentrator in a serial data transmission line comprising a plurality of concentrators, where each concentrator is in operative communication with a plurality of motes to receive acquired seismic data from the plurality of motes. The method further includes recording seismic data at a local memory of each of a plurality of motes orphaned by the disabled concentrator in response to the detecting.

A number of feature refinements and additional features are applicable to the thirteenth aspect. These feature refinements and additional features may be used individually or in any combination. As such, each of the foregoing features or following features that will be discussed in relation to the thirteenth aspect or the other aspects may be, but are not required to be, used with any other feature or combination of features of the thirteenth aspect.

For instance, the method may include reestablishing operative communication between the plurality of motes orphaned by the disabled concentrator and the disabled concentrator. The method may also include transmitting the seismic data recorded at the local memory of each of the plurality of motes orphaned by the disabled concentrator to the disabled concentrator. In an embodiment, the method may include sending real time seismic data from each of the plurality of motes orphaned by the disabled concentrator to the disabled concentrator and sending the seismic data recorded at the local memory of each of the plurality of motes orphaned by the disabled concentrator to the disabled concentrator in a common transmission packet. The seismic data recorded at the local memory of each of the plurality of motes orphaned by the disabled concentrator sent to the disabled concentrator may include less than an entire seismic data record.

In an application, the method may include enabling a GPS module at each of the plurality of motes orphaned by the disabled concentrator. In turn, the method may also include synchronizing a local clock at each of the orphaned motes using the GPS module. Additionally, the method may include tagging the seismic data seismic data recorded at the local memory of each of the orphaned motes with a time stamp from the local clock of each of the orphaned motes.

In an application, the method may include enabling a GPS module of at least one upstream concentrator disposed upstream of the disabled concentrator in the serial data transmission line and synchronizing a local clock at the at least one upstream concentrator using the GPS module. In this regard, the at least one upstream concentrator may provide a synchronization signal to a plurality of motes in operative communication with the at least one upstream concentrator based on the local clock of the at least one upstream concentrator. The at least one upstream concentrator may also communicate a time reference based on the local clock of the at least one upstream concentrator to at least one other upstream concentrator, and the at least one other upstream concentrator may provide a synchronization signal to a plurality of motes in operative communication with the at least one other upstream concentrator.

In an application, the method may include enabling a GPS module of each of a plurality of motes in operative communication with the at least one upstream concentrator. In turn, the method may include synchronizing a local clock at each of the plurality of motes using the respective GPS module of each mote.

A fourteenth aspect includes a method for use in seismic data acquisition in an array. The method includes receiving a first time reference at a concentrator unit using a first wireless communications protocol from another unit in the array. The method also includes synchronizing a local clock at the concentrator at least partially based on a transmission latency and a first processing latency in relation to the time reference. The method also includes communicating a second time reference from the concentrator to a plurality of motes in operative communication with the concentrator using a second wireless communications protocol and synchronizing a mote local clock at each of the plurality of motes based on the second time reference and at least a second processing latency.

A number of feature refinements and additional features are applicable to the fourteenth aspect. These feature refinements and additional features may be used individually or in any combination. As such, each of the foregoing features or following features that will be discussed in relation to the fourteenth aspect or the other aspects may be, but are not required to be, used with any other feature or combination of features of the fourteenth aspect.

For instance, the first time reference may be received using a first wireless communication protocol and the second time reference may be communicated using a second wireless communication protocol different than the first wireless communication protocol.

A fifteenth aspect includes a system for presentation of information related to a seismic survey. The system includes a processor and a non-volatile memory connected to the processor and including a set of computer readable instructions. The computer readable instruction are executable by the processor to acquire, from a server, information related to a plurality of groups of devices that collectively facilitate the acquisition and transmission of seismic data from a subterranean region to the server. The devices in each group communicate over a common communication protocol, and at least two of the common communication protocols are different. The computer readable instruction are executable by the processor to also present, on a display, display information related to the acquired information from at least one of the groups.

A number of feature refinements and additional features are applicable to the fifteenth aspect. These feature refinements and additional features may be used individually or in any combination. As such, each of the foregoing features or following features that will be discussed in relation to the fifteenth aspect or the other aspects may be, but are not required to be, used with any other feature or combination of features of the fifteenth aspect.

For instance, the set of computer readable instructions may be executable by the processor to receive, from an input device, an input that identifies one of the pluralities of groups and present, on the display, the acquired information from the identified one of the pluralities of groups. The received input may be a signal corresponding to a manipulation of a zoom toolbar on the display. The display information may be status information for the devices of the plurality of groups of devices. For instance, the status information may include one of a working or down status.

In an application, the set of computer readable instructions may be executable by the processor to receive, from an input device, one or more threshold parameters related to the plurality of groups of devices and analyze at least some of the acquired information in view of the one or more received threshold parameters to determine the status information. The display information may relate to seismic data acquired by the seismic survey. For instance, the display information may indicate a presence or absence of seismic data at the devices of the at least one of the groups.

In an embodiment, the display information may include a plurality of graphical icons representative of the devices of the at least one of the groups. In an application, the set of computer readable instructions may be executable by the processor to modify at least one feature of one or more of the plurality of graphical icons based on the acquired information. For instance, the at least one feature may at least one of a color, shape, or size.

In an application, each of the devices of a first of the plurality of groups is a seismic acquisition unit including at least one geophone for acquiring seismic data, and each of the devices of a second of the plurality of groups may be a concentrator unit for collecting the seismic data acquired by at least some of the seismic acquisition units of the first of the plurality of groups. In this regard, the common communication protocol of the first of the plurality of groups may be different than the common communication protocol of the second of the plurality of groups.

Furthermore, any of the embodiments, arrangements, or the like discussed herein below in the detailed description may be used (either alone or in combination with other embodiments, arrangement, or the like) with any of the disclosed aspects. Merely introducing a feature in accordance with commonly accepted antecedent basis practice does not limit the corresponding feature to the singular. Any failure to use phrases such as "at least one" does not limit the corresponding feature to the singular. Use of the phrase "at least generally," "at least partially," "substantially" or the like in relation to a particular feature encompasses the corresponding characteristic and insubstantial variations thereof. Furthermore, a reference of a feature in conjunction with the phrase "in one embodiment" does not limit the use of the feature to a single embodiment.

In addition to the exemplary aspects and embodiments described above, further aspects and embodiments will become apparent by reference to the drawings and by study of the following descriptions.

BRIEF DESCRIPTION OF THE DRAWINGS

FIG. 7 depicts a schematic view of an embodiment of mote to concentrator communication utilizing a first wireless protocol corresponding to a level of communication in the hierarchical array for wireless readout of seismic data.

FIGS. 12A-12C depict various embodiments of a mote having different capabilities for connection of sensors thereto.

FIG. 13 depicts an embodiment of a concentrator having a directionalized antenna.

FIGS. 25A-25E depict various screenshots of an embodiment of a dashboard for use in control and/or observation of the operation of a hierarchical array for readout of seismic data.

DETAILED DESCRIPTION

Figure 1:
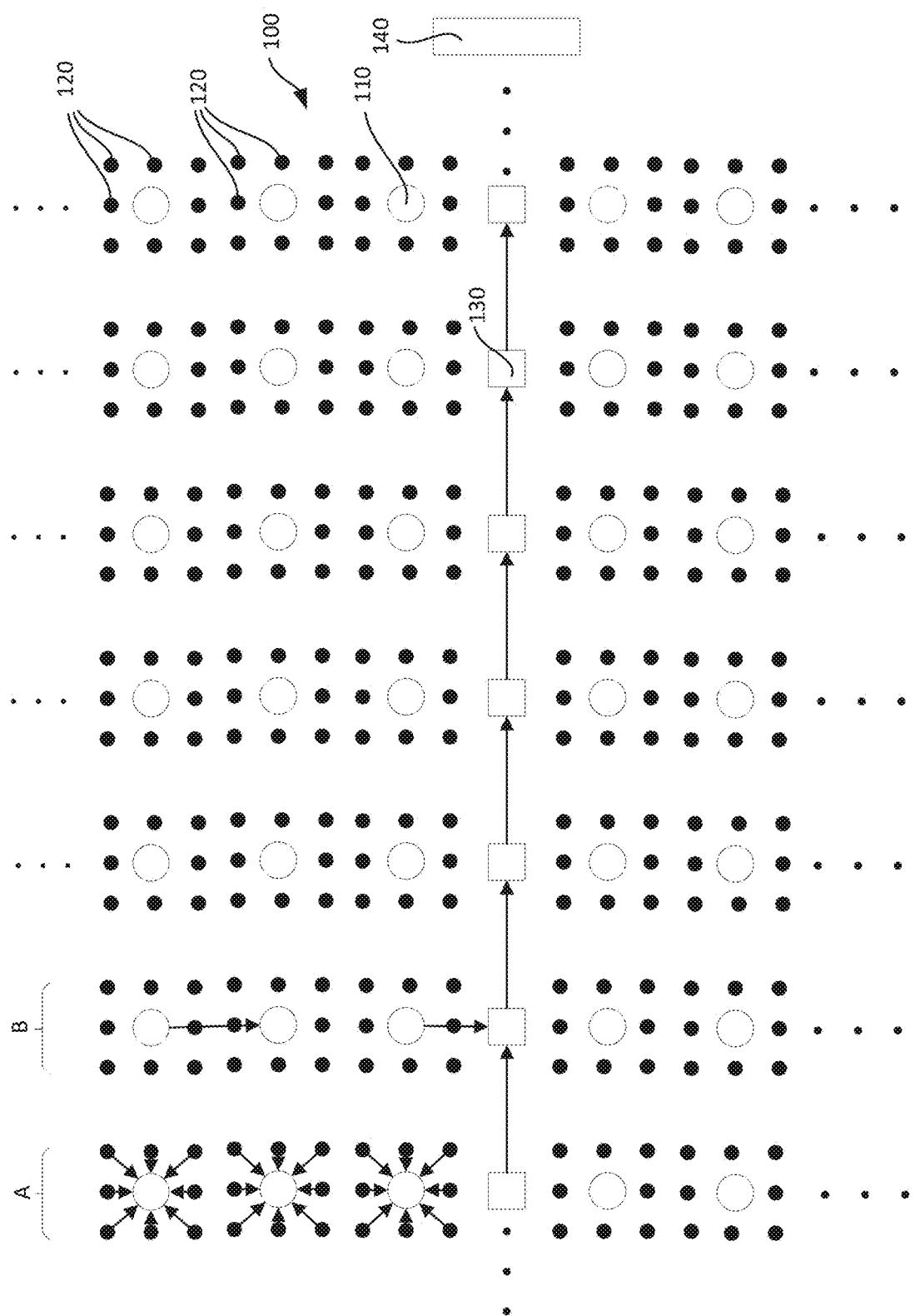
FIG. 1 depicts an embodiment of an array for readout of seismic data utilizing hierarchical wireless protocols.

The following description is not intended to limit the invention to the forms disclosed herein. Consequently, variations and modifications commensurate with the following teachings, skill and knowledge of the relevant art, are within the scope of the present invention. The embodiments described herein are further intended to explain modes known of practicing the invention and to enable others skilled in the art to utilize the invention in such, or other embodiments and with various modifications required by the particular applications(s) or use(s) of the present invention.

Disclosed herein are utilities for cableless seismic data acquisition in seismic surveys. The present disclosure generally relates to arrays that use hierarchical communication protocols for, in at least a portion of an array and/or for a part of a survey, real time or near real time read out of seismic data from the array. As such, the present disclosure facilitates real time or near real time seismic data read out by way of radio telemetry. Additionally, the radio protocols disclosed herein may also be capable of providing signals by way of radio communication to the array (e.g., from a central recording station or the like). In this regard, embodiments described herein may include mote units (also referred to herein as digitizers) that include a sensor, such as a geophone, and a radio transmitter to transmit seismic information and/or receive signals. For example, the motes may communicate with local concentrators. In at least some embodiments contemplated herein, mote-to-mote communication may also be facilitated. A concentrator may be in communication with a plurality of motes for aggregation and/or retransmission of seismic data from the motes. Accordingly, the concentrators, in turn, may employ a concentrator-to-concentrator ("multi-hop") wireless telemetry architecture to relay the seismic information to a central recording unit where the seismic data can be collected, combined, and/or processed as desired. Accordingly, described herein are approaches to hierarchical communication protocols that provide levels of protocols to facilitate real time or near real time data read out. That is, concentrators to concentrator communication may be provided at a first protocol level and concentrator to mote communication may be provided at a second protocol level. There may also be further levels of protocols (e.g., wired or wireless backhaul protocols).

There are many potential advantages of such a system as will be apparent from the description below. By using low-power transmitters for the seismic acquisition units, and potentially distributing some functionality between the seismic acquisition units and the concentrators, very simple, low-cost, low maintenance, and low-power acquisition units can be realized. These may even be powered by solar collectors and/or wireless power technologies to extend operation and reduce handling. Moreover, distinct wireless protocols can be utilized for the various levels of communication between devices. In this manner, the overall bandwidth available for reading out seismic data is increased, thus leading to improved telemetry for reading out data from the array and for improving communication of signals to the array.

There are many benefits that may be facilitated when implementing multi-protocol and/or multi-level arrays as described herein. One important benefit is the potential to enable arrays with a very large number of wireless transmission channels, e.g., more than 100,000 channels (some formed by reusing frequency bands). In this regard, it is envisioned that the system architecture disclosed herein can be used to implement arrays having 1,000,000 or more channels. Such arrays can provide improved geographic coverage and/or channel (e.g., geophone) density while providing real-time readout telemetry and avoiding delays to the survey.

It will be appreciated that such large and/or dense arrays demand, as a practical matter, inexpensive units that require little attention (e.g., units that do not require (or at least seldom require) battery changes and do not require manpower to read out data). Certain embodiments described herein utilize simple motes for seismic data acquisition coupled with concentrators. Each of these elements can be constructed on a large scale at low-cost and can operate with little attention. For example, it is anticipated that each unit may cost less than $100.00 to produce and function indefinitely without a battery change.

In this regard, a number of difficulties are addressed that arise with the scaling of channels in other systems. A number of parameters of a seismic survey system may be judged on a "per channel" basis. Advantageously, an acquisition system would favorably scale such that the per channel parameters improve as the number of channels increase. For instance, cost per channel is a prime example of this concept. Preferably, the cost per channel for a system remains economically feasible as the number of channels increase. Traditional approaches to systems with cableless telemetry do not favorably scale in this regard. That is, assuming each wireless unit in traditional systems supports a given number of channels, an increase in channels results in one-for-one increase in the number of units required. As such, given the fact such systems may include relatively complex processing devices at each unit, the cost of such units scales unfavorably with increased channel count. For instance, each additional unit may include relatively expensive radios, GPS modules, signal processing capability, batteries, and/or other necessary equipment. In turn, the economics of such systems may impose a limit on the number of channels feasibly provided.

Furthermore, weight per channel also preferably scales favorably as channel counts increase. However, traditional systems (particularly cabled systems) exhibit an unfavorable scalability in relation to weigh per channel. For instance, it has been contemplated that weight alone may render cabled systems having 1,000,000 channels improbable given the logistical costs of such an array.

However, the currently contemplated system described herein provides beneficial relationships in relation to scalability in both cost per channel and weight per channel, among other parameters such as power consumption per channel or the like. For instance, in comparison to other systems which may add cost, weight, or other unfavorably scalable parameters in relation increased channel counts, the present disclosure provides benefits and scalability as the number of channels increases. That is, given the system architecture where a number of lightweight, low cost mote units are serviced by a concentrator, adding 5, 10, or even 20 or more channels (provided by the motes) may add a fraction of the weight or cost of providing an equivalent number of traditional units to achieve the same channel count. In this regard, as the demand for increased numbers of channels continues, a system as described herein provides increasingly advantageous economic and logistic benefits in relation to cost per channel and weight per channel, among other such parameters.

As such, embodiments are discussed that may facilitate relatively large channel count systems to facilitate efficient deployment, module location, data read out telemetry, array organization and initialization, among other functions of the seismic array. For example, the utilities described herein may be capable of resolving the locations of a plurality of cableless seismic acquisition units (e.g., up to 1,000,000 or more) of a cableless seismic acquisition system at sub-meter levels of accuracy free of many of the limitations of existing manners of determining cableless unit locations in seismic acquisition systems. While accurately determining cableless unit locations for use in mapping underground structures of interest, the disclosed cableless seismic acquisition system also limits power demands of and ultimately power consumption by the cableless units to extend serviceable deployment time of the cableless acquisition system. The system may include an array of cableless wireless acquisition units (e.g., motes or mote units) that acquire subterranean seismic data as well as positioning signals from a plurality of remote positioning signal transmitters according to any appropriate frequency and transmit the same (e.g., free of processing the positioning signals) to a local concentrator unit. The concentrator unit and/or other unit remote from the mote unit (e.g., CRU) may then process the received, unprocessed positioning signals in any appropriate manner to determine a location (e.g., GPS coordinates) of the mote unit at sub-meter levels of accuracy and associate (e.g., tag) the determined location with the acquired seismic data. The acquired seismic data and tagged location may then be transmitted from the concentrator to one or more remote units (e.g., to the mote unit from which the seismic data was acquired, to another concentrator unit, to an LIU, etc.).

The following discussion generally begins with a description of the basic architecture of embodiments of motes, concentrators, and system including motes and concentrators. Thereafter, additional approaches to initialization, operation, location, or other activities of a system for seismic acquisition using embodiments described herein are discussed in greater detail.

With reference to FIG. 1, an embodiment of an array 100 includes a plurality of concentrators 110 (e.g., concentrator or collection units) arranged in lines or the like to form an array of concentrators 110, where each concentrator 110 is associated with a respective plurality of motes 120 (i.e., is configured to receive or otherwise communicate with a local "network" of motes 120 that is less than all of the motes 120 in the system 100). Each mote 120 may acquire seismic information and wirelessly transmits the same to its local concentrator 110 as illustrated in relation to Line A in FIG. 1. The concentrators 110, in turn, transmit the acquired seismic data in the various rows in a serial fashion, all of which may be received by a line interface unit (LIU) 130 of the row as illustrated in Line B of FIG. 1. The acquired data is then transferred from LIU-to-LIU to a central recording unit (CRU) 140 for storage and access by technicians and the like. The arrangement depicted in FIG. 1 may be referred to as a "rib and backbone" configuration where the LIUs 130 form a backbone from which ribs (e.g., rows, lines) of concentrators 110 extend (e.g., where each rib may form a serial data communication line among the concentrators 110). As depicted, the concentrators 110 may extend from either side of a particular LIU 130. While not shown, the LIUs 130 may extend from the CRU 140 in additional directions from other than the single direction shown in FIG. 1. In this regard, the concentrator-to-concentrator communication may utilize a "bucket brigade" telemetry protocol as described, for example, in U.S. Pat. No. 7,773,457, which is commonly assigned with the present application and incorporated by reference herein.

The communications between the motes 120 and the concentrators 110, the communications between adjacent concentrators 110, and the communications between a concentrator 110 and an LIU 130 may all be wireless communications (e.g., utilizing radio frequency (RF) communications). In one arrangement, distinct wireless protocols can be utilized between the motes 120 and their local concentrator 110 on the one hand, and for concentrator-to-concentrator communication on the other hand, to increase the overall bandwidth available for reading out seismic data (e.g., to enable systems with wireless transmission of a large number of channels, e.g., up to 1,000,000 channels or more, some communication including the reuse of frequency bands) and thereby improve geographic coverage and/or geophone density while providing real-time readout and limiting delays to the survey. For instance, a spread spectrum frequency hopping protocol may be implemented between the concentrators 110 (e.g., as described in detail in U.S. patent application Ser. No. 14/175,868 and/or U.S. Pat. No. 8,238,198, which are both incorporated herein by reference in the entirety.

The communications between adjacent LIUs 130 and between the last LIU 130 and the CRU 140 may be wireless or wired (e.g., via a fiber optical line or cable). In the case where the communications are wireless, a third wireless protocol different than the mote-to-concentrator and concentrator-to-concentrator wireless protocols may be used. In this regard, the array 100 may execute at least three different wireless protocols. For example, the wireless protocol between the LIUs 130 may be, for example, an IEEE 802.11 protocol or other appropriate protocol described in greater detail below. The spacing between the LIUs 130 may be greater than that between adjacent concentrators 110 within each line. For instance, the spacing between adjacent concentrators 110 may be on the order of 25-100 meters whereas the spacing between LIUs 130 may be on the order of 200 meters in the illustrated embodiment of FIG. 1, which is not to scale. In any case, the location, density, spacing, or other parameters regarding the placement of the concentrators 110, motes 120, LIUs 130 and CRUs 140 may be provided according to a predefined survey design or the like.

In an embodiment, the wireless protocol utilized for communication between concentrators 110 and motes 120 may facilitate communication between a plurality of motes 120 and a given concentrator 110. As will be described in greater detail below, the wireless communication protocol for communication between motes 120 and a given concentrator 110 may include addressing techniques whereby motes 120 are specifically addressed utilizing a unique identifier. In an embodiment, the data read out from motes 120 to a given concentrator 110 may be facilitated by way of a concentrator 110 polling for motes 120 to transmit data to the concentrator 110 using the unique identifier to address a given mote 120. Alternatively, motes 120 may utilize transmission parameters that facilitate simultaneous communication (e.g., communications during at least a common transmission period) of data to the concentrator 110. In this regard, the available bandwidth of the wireless communication protocol for communication between motes 120 and a given concentrator 110 may at least in part determine the number of motes 120 with which the concentrator 110 may communicate. For instance, a given concentrator 110 may communicate with a number of different motes 120 such as 2 or more motes, 5 or more motes, 10 or more motes, 15 or more motes, or even 20 or more motes.

Regardless of the number of motes 120 with which a concentrator 110 is in operative communication, the communication protocol used to communicate between motes 120 and a given concentrator 110 may still maintain excess bandwidth for utilization for other administrative purposes beyond transmission of seismic data between the motes 120 and the concentrator 110. This excess bandwidth may be utilized for, for example, readout of stored data from a memory of a mote 120, communication of administrative data to the mote 120, transmission of synchronization data between a mote 120 and a concentrator 110, local communication from a mobile (e.g., handheld) module and the mote 120, communication of organization data to a mote 120, communication of a test data to or from a mote 120, or other administrative communications facilitated outside of the real time data telemetry used for communication of seismic data.

In an embodiment, the array 100 may employ a multilevel telemetry architecture for read out of seismic data and/or communication of signals to various units within the array 100. That is, the array 100 may employ a plurality of different wireless protocols to facilitate communication between various units in the array 100. As such, wireless communication between motes 120 and a concentrator unit 110 may be by way of a first protocol. Wireless communication between concentrator units 110 may be by way of a second protocol. Additionally, the second protocol may be used to communicate from a concentrator unit 120 to a LIU 130. The first protocol may be different than the second protocol. Specifically, the first protocol may be specifically tailored (e.g., include communication parameters) suited for shorter range communication than the second protocol. Communication between an LIU 130 and the CRU 140 may be by way of a third protocol different than the first protocol and the second protocol. The third protocol may be a wired or wireless protocol. In an embodiment, the first protocol may comprise, for example, an IEEE 802.15 protocol such as ZigBee, Bluetooth, WirelessHART, ISA100.11a, MiWi, DASH7, or other appropriate protocol. In this regard, the first protocol may be a protocol that utilizes a 900 MHz or 2.4 GHz band. In other embodiments, the first protocol may comprise a proprietary protocol discussed in further detail below. The second protocol may comprise an IEEE 802.11 standard such as, for example, a WiFi protocol. In this regard, the second protocol may be a protocol that utilizes a 900 MHz or 2.4 GHz or a 5.8 GHz band. In other embodiments, the second protocol may comprise a proprietary protocol discussed in greater detail below. The third protocol may comprise a protocol such as Ethernet (TCP/IP protocol), a 3G protocol (e.g., UMTS, EDGE, CDMA2000, DECT), a 4G protocol (e.g., LTE, WiMAX, HSPA+, etc.), or other protocol. These protocols may also facilitate bi-directional communication among units in the array 100, for example, for communicating commands, timing signals, location data, or other signals to or from various units in the array.

As may be further appreciated, the concentrator units 110 may communicate along a serial data transfer line for communication of data within the array. For example, seismic data may be communicated from upstream concentrator units 110 remote from the LIUs 130 and/or CRU 140 to downstream concentrator units 110 nearer the LIUs 130 and/or CRU 140. As may be appreciated, the wireless communication protocol utilized by the concentrator units 110 may facilitate serial data transfer within the serial data transfer line of concentrator units 110. Specifically, two or more concentrator units 110 within a given serial data transfer line may communicate in a common transmission time period to facilitate improved bandwidth within the serial data transfer line. Accordingly, the wireless communication protocol utilized by the concentrators 110 may facilitate communication by the two or more concentrator units 110 without interference therebetween. Communication without interference as used herein may indicate that the respective units communicating may be capable of discerning the signal transmitted in a communication pair even if another unit is communicating that is within transmission range of the pair such that the given communicating pair receives the interfering transmission. That is, in the instance of multiple concentrator units 110 within a given serial data transmission line, a first concentrator unit 110 may be communicating to a second concentrator unit 110 during the same common transmission time as a third concentrator unit 110. However, the first and second of concentrator units 110 within the serial data communication line may not be interfered with by the third concentrator 110 also communicating. For instance, transmission parameters may be assigned to the communicating concentrator units so as to avoid interference. This may include, for example, frequency division multiplexing, code division multiplexing, or other selection of transmission parameters to avoid interference. It should also be noted that by avoiding interference, it is not meant that the potentially interfering concentrator units 110 need to be outside of the transmission range of one another, but merely that the concentrator units 110 that are communicating are capable of discerning the intended communicated signal without a another concentrator unit 110 interfering with the communication of the given intended signal. For example, a given concentrator unit 110 may be within transmission range of another concentrator unit 110, but may be capable of rejecting a signal from the other concentrator unit 110 using, for example, co-channel rejection techniques known in the art. As such, in this case, avoiding interference may simply mean still being able to functionally communicate within a pair without degradation or loss of the ability to discern a signal from the counterpart unit in the communication pair or communication group. In any regard, it may be appreciated that multiple concentrator units 110 within a given serial data transmission line may communicate the same time. So that multiple concentrator unit pairs 110 are in operative communication within a given serial data transmission line so as to improve data read out speeds within the serial data transmission line.

Figure 1A:
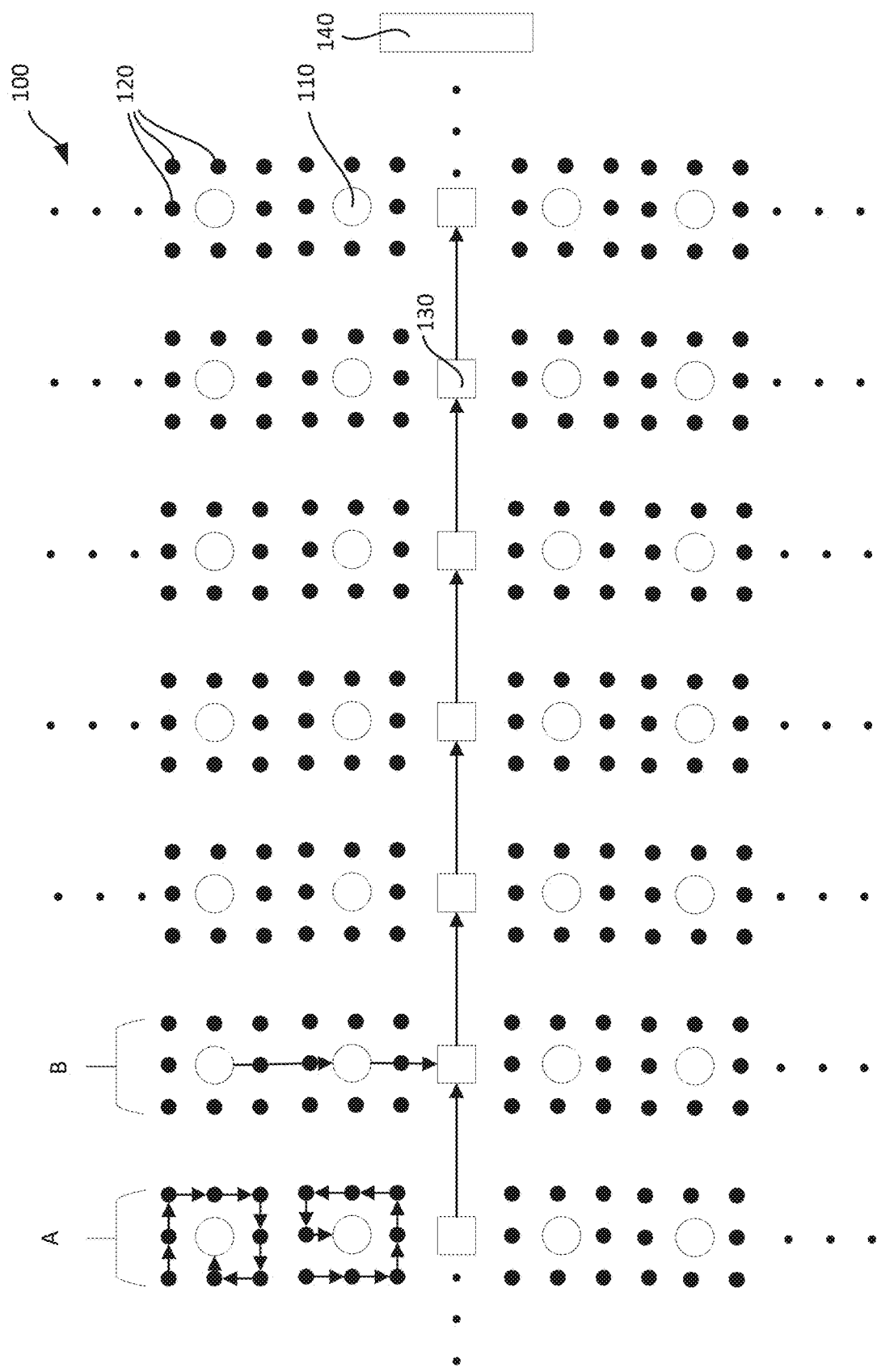
FIG. 1A depicts an alternative embodiment of an array for readout of seismic data utilizing hierarchical wireless protocols.

FIG. 1A depicts an alternative embodiment of an array 100. As may be appreciated, in FIG. 1, the motes 120 may each communicate directly with a given concentrator 110. In contrast, in FIG. 1A, the motes 120 may communicate in a mote-to-mote fashion such that data may be relayed in a serial fashion among the plurality of motes 120 prior to being communicated to a concentrator 110. In this regard, the motes 120 may support serial data communication among the plurality of motes 120, for example, using a bucket brigade style wireless protocol as described above.

Figure 2:
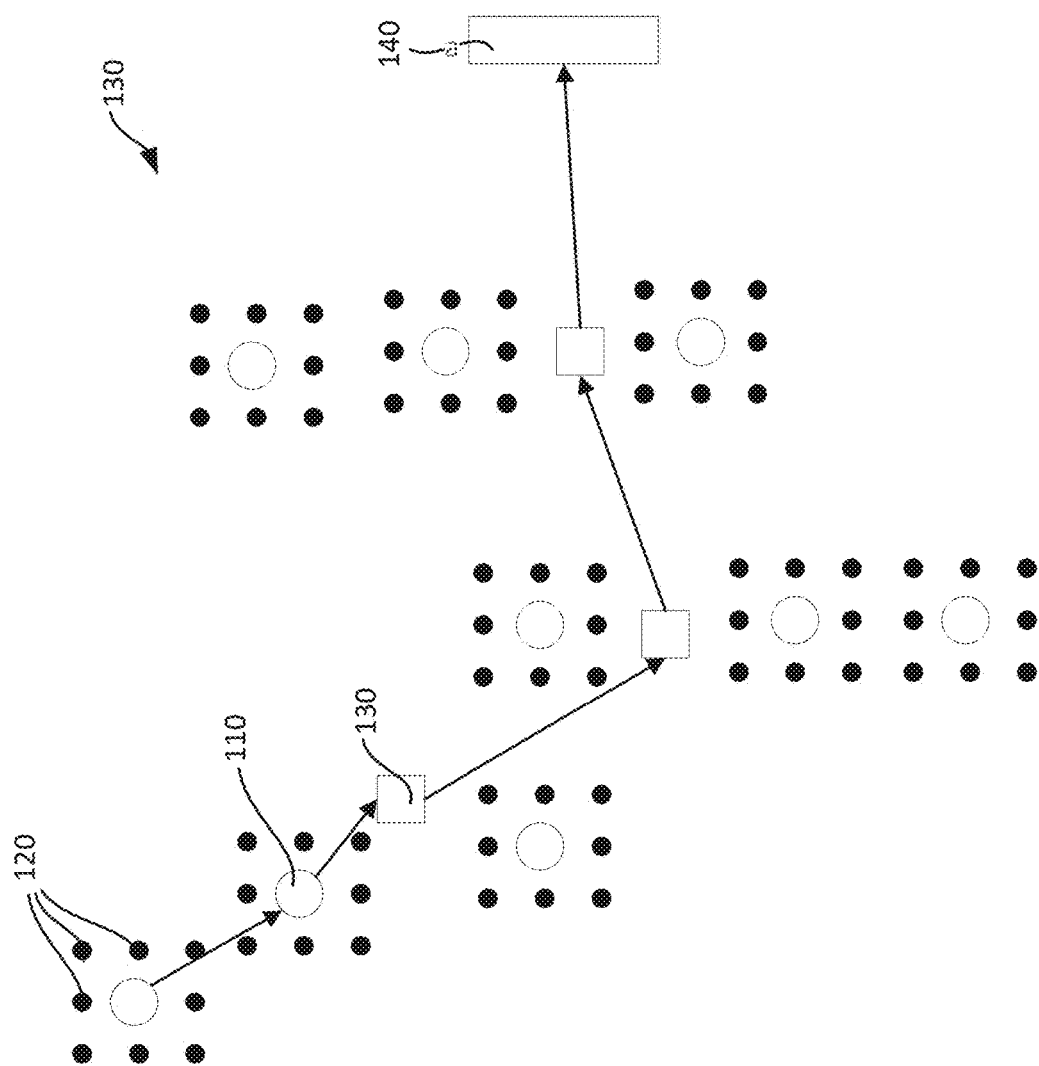
FIG. 2 depicts another alternative embodiment of an array for readout of seismic data utilizing hierarchical wireless protocols.

With further reference to FIG. 2, the motes 120, concentrators 120, LIUs 130, and CRU 140 may be arranged such that the array 100 does not conform to a linear grid-like layout shown in FIG. 1. That is, while the array 100 may take the form of a regular grid-like array of lines shown in FIG. 1, the same protocols and communication techniques described herein may be used for an irregular arrangement as shown in FIG. 2. As such, the array 100 may take the form of an ad hoc arrangement whereby units in the array 100 may be deployed in a nonlinear or regular pattern.

Figure 3:
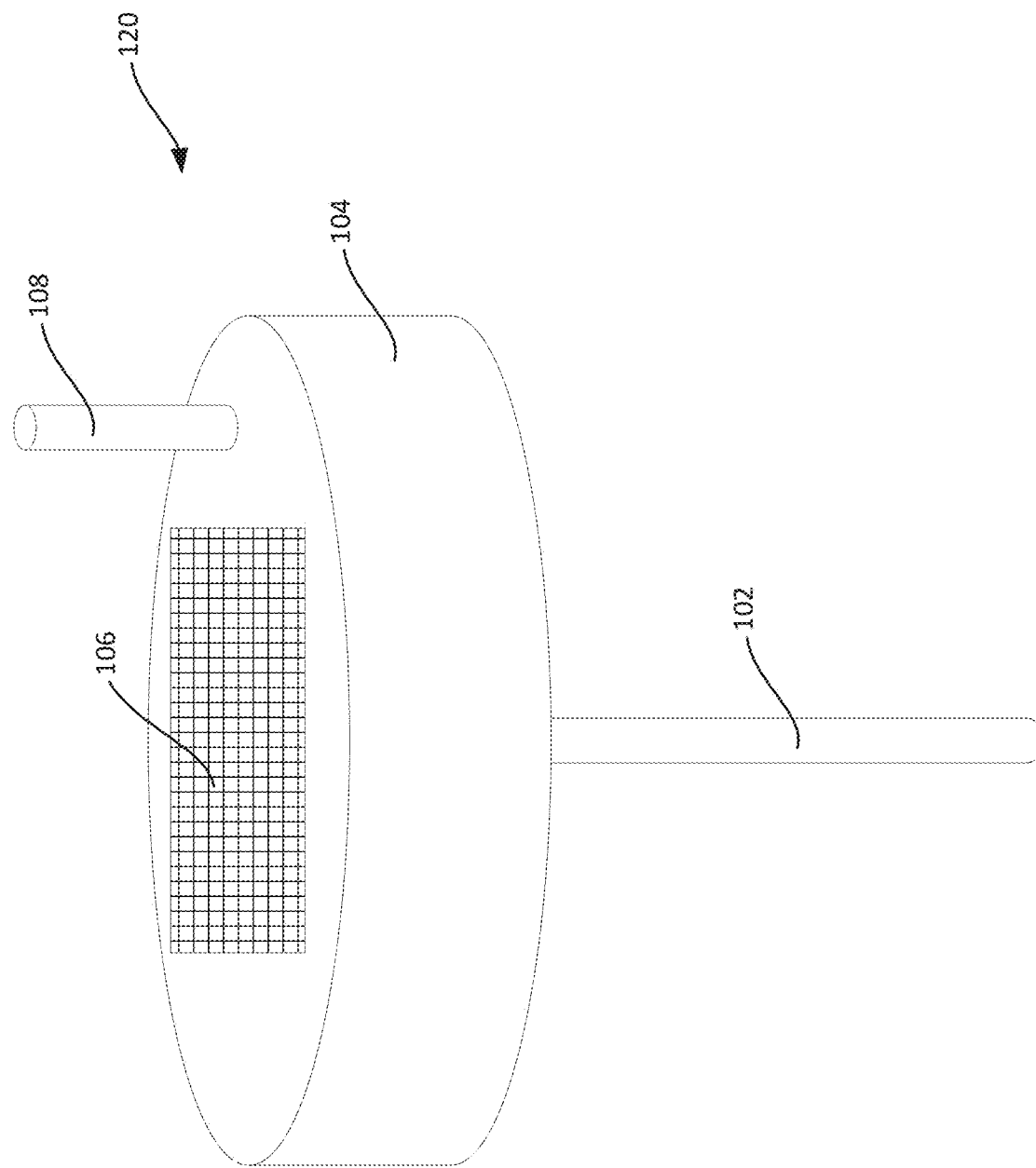
FIG. 3 depicts a perspective view of an embodiment of a mote for use in a hierarchical array for wireless readout of seismic data.

FIG. 3 is a perspective view of an embodiment of a mote 120. As noted above, it is desirable to implement the present invention using low-cost, simple, lightweight, and low-maintenance motes 120. This is particularly important for very large and/or dense arrays where expensive units or units requiring substantial maintenance may be impractical. The illustrated mote 120 is an example of a low-cost, simple, lightweight, and low maintenance unit. The illustrated mote 120 includes a geophone spike 102, a housing 104, a solar array 106, and an antenna 108. The spike 102 preferably penetrates the ground so as to provide good ground contact for the sensor instrument. In this regard, the geophone or sensors instrument, as will be understood by those skilled in the art, may include a velocity sensor, an accelerometer, or other sensor for detecting vibrations during the seismic survey. In general, seismic surveys utilize a repeating source such as repeated explosive charges, vibrations or weight drops to induce vibrations through the ground that are detected by the geophones. In some cases, passive vibration sources may also be utilized. The mote 120 may have various capability for interface with various embodiments of geophone units. Further examples of this are discussed in greater detail below.

The illustrated housing 104 may house a number of electronic components that may vary among embodiments as described below. For example, the housing 104 may house a rechargeable battery, an analog-to-digital convertor, antenna chip sets and associated logic, memory, and/or other components. In certain implementations, a solar collector or array 106 may be utilized to recharge the batteries so as to extend the operational life of the batteries and minimize battery changes. It will be appreciated that this is important in very large or very dense arrays including many motes 120.

The illustrated mote 120 further includes an antenna 108 for transmitting, and in some embodiments, receiving wireless signals. Although the antenna 108 is shown as protruding from the housing 104 for purposes of the present discussion, those skilled in the art will understand that short-range wireless transmissions can be implemented with antennae that are not required to physically extend from the housing 104 (e.g., to improve/reduce noise of the mote 120). Further embodiments of potential antenna configurations are discussed in greater detail below. It is anticipated that the mote 120 will be very simple in construction and may be quite small in size, for example, having a diameter or width of no more than about six inches and it may be substantially smaller.

Figure 4A:
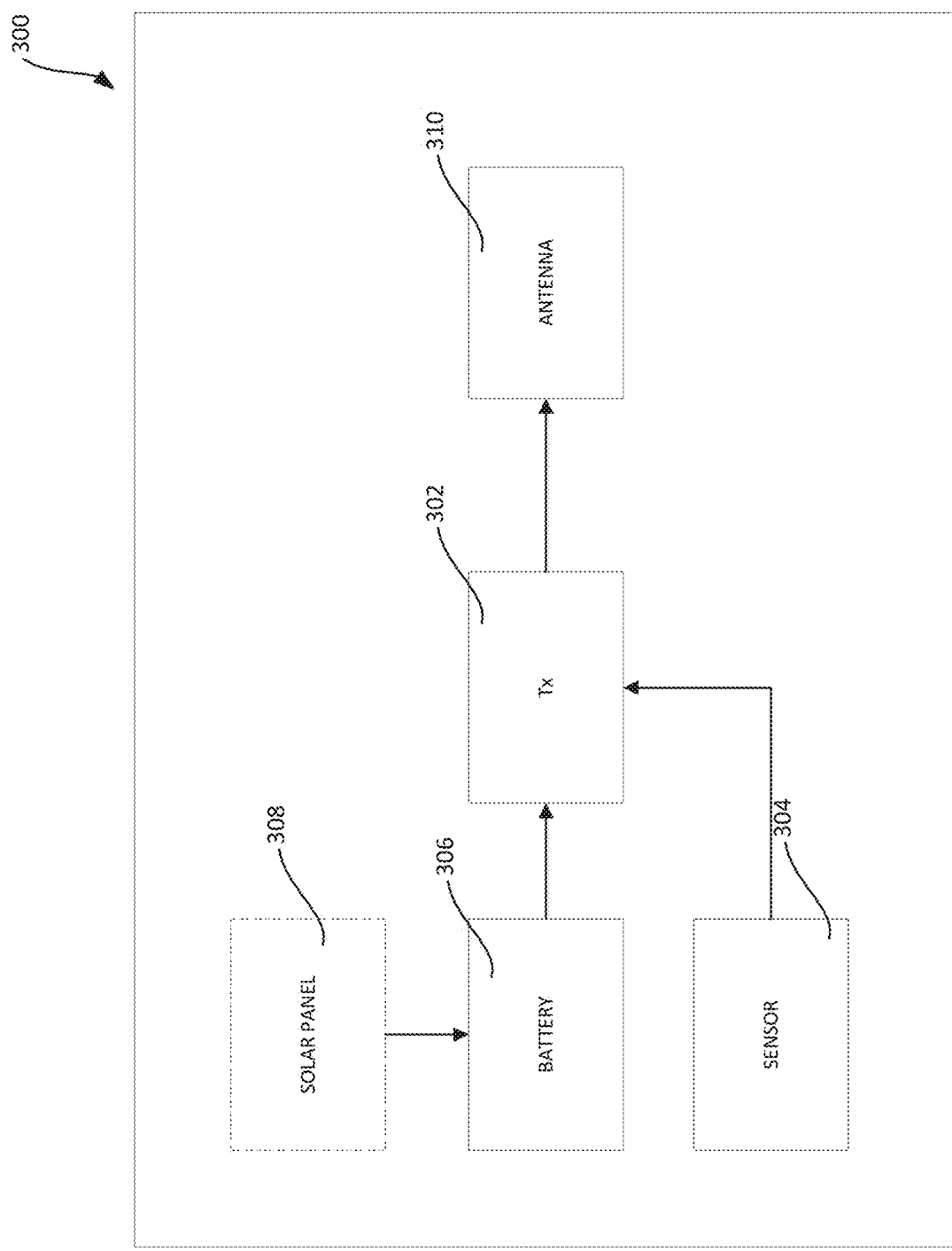
FIGS. 4A-4F depict schematic views of various embodiments of a mote for use in a hierarchical array for wireless readout of seismic data.

As noted above, many different implementations of a mote are possible. FIG. 4A is a schematic diagram of a first embodiment of a mote 300. The illustrated mote 300 includes a power source or battery pack 306, a sensor 304, a transmission module 302, and an antenna 310. The sensor 304 senses vibration or movement of the ground. For example, the sensor may be a velocity sensor, an accelerometer, or other instrument. The sensor 304 provides an output signal based on the sensed vibrations. The output signal may be an analog signal or a digital signal. For example, certain MEMS accelerometers may provide a digital output signal.

In the illustrated embodiment, the output from the sensor 304 is processed by transmission module 302 and transmitted in a wireless signal from the antenna 310. In this regard, the signal transmitted from the antenna 310 may be an analog or digital signal, though it is anticipated that a digital signal will be generally preferred in order to reduce power requirements and extend battery life.

Various components of the mote 300 require a power source. The illustrated mote 300 includes a battery pack 306 that may include one or more batteries such as rechargeable batteries. It is anticipated that the power and energy requirements of the mote 300 will be very small and conventional off-the-shelf batteries may be utilized. In this regard, it is anticipated that motes in accordance with the present invention may draw less than 100 mW of power in operation. For example, in an embodiment, a mote 120 may draw less than 50 mW of power in operation. Further still, a mote 120 may draw 25 mW or less of power in operation. One or more rechargeable 18650, AA, or AAA batteries or button batteries may be utilized. The battery life and operational life of the concentrator 300 can be extended by providing a source of energy for recharging the battery pack 306. In the illustrated embodiment, a solar panel 308 is provided for recharging the battery pack 306. Alternatively, the battery pack 306 may be recharged by other energy sources such as received RF signals, ground vibrations, or the like.

It will be understood that it is generally necessary to synchronize the time references associated with seismic data acquired at different units across an array. The illustrated mote 300 may be used in contexts where synchronization is accomplished separate from the mote 300, e.g., at a local concentrator 110 or is accomplished via post-processing of the data (e.g., to assign "true" time references after the fact). For example, where many identical motes 120 are utilized in the array, and where transmissions from the motes 120 to adjacent concentrators 110 are short, it may be possible to associate time references with seismic data at the concentrator 110 rather than at the mote 120. For example, the seismic data may be sampled or re-sampled at the concentrator 110. In this manner, a common time reference may be provided to correlate seismic data acquired at different motes 120 of the array 100. Various additional approaches to synchronization of motes and/or concentrators are discussed in greater detail below.

Figure 4B:
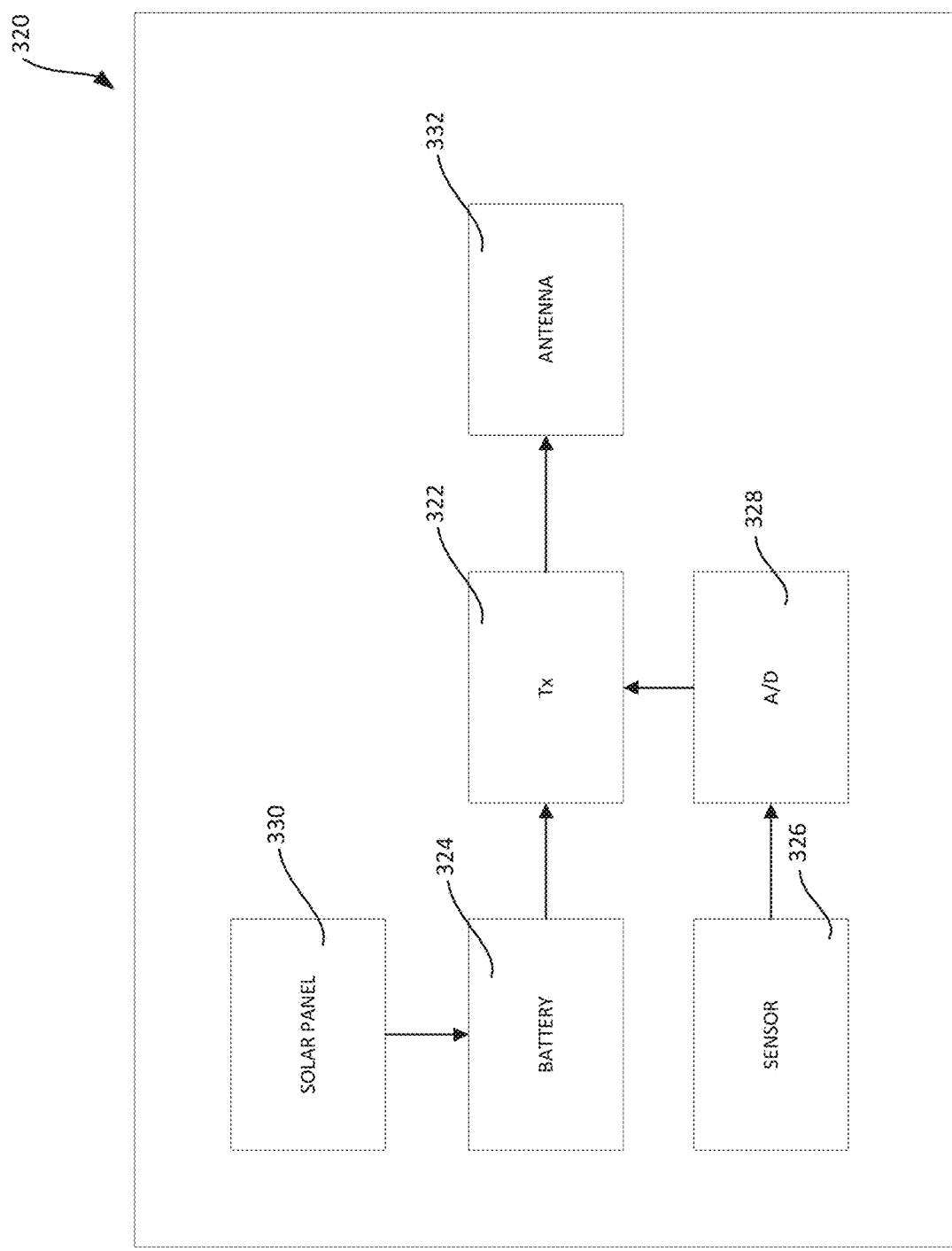

FIG. 4B is a schematic diagram of an alternative embodiment of a mote 320 in accordance with the present invention. The illustrated mote 320 includes a solar panel 330, a battery pack 324, a transmission module 322, and an antenna 332, all similar to the corresponding components described above in connection with FIG. 4A. In the illustrated embodiment, an analog-to-digital convertor 328 is interposed between the sensor 326 and the transmission module 322. In operation, the sensor 326 provides an analog output signal. The analog output signal is sampled by the analog-to-digital convertor 328 to provide a corresponding digital signal for transmission by the transmission module 322 and antenna 332. In this manner, a low-power digital signal can be output by the mote 320 so as to reduce power requirements and extend battery life. Synchronization of the seismic data may be accomplished at the concentrator or otherwise via post processing.

Figure 4C:
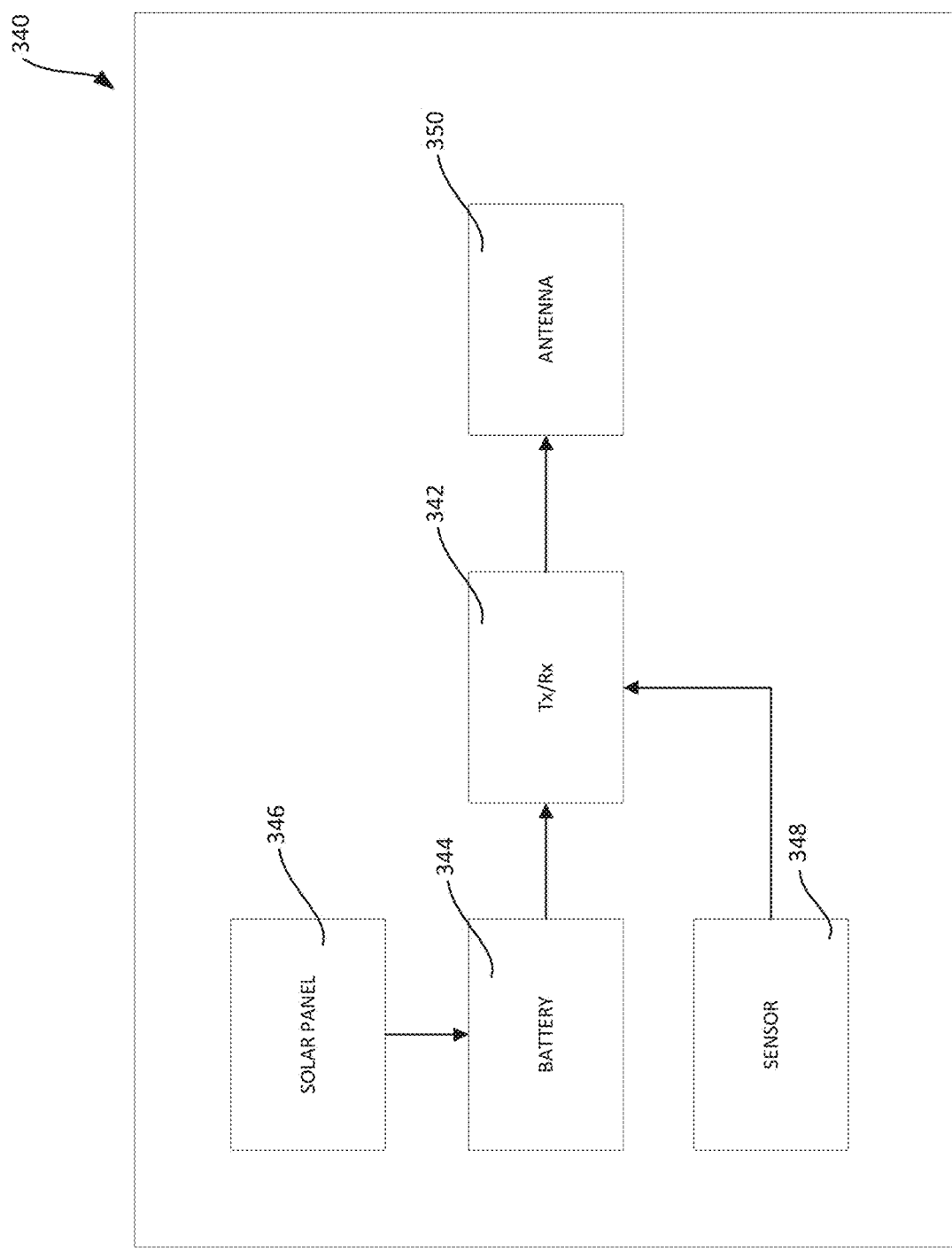

FIG. 4C is a schematic diagram of an alternative embodiment of a mote 340 in accordance with the present invention. The illustrated mote 340 includes a solar panel 346, a battery pack 344, a sensor 348, and an antenna 350 that are similar to the corresponding components as shown above in connection with FIG. 4A. In the illustrated embodiment, the mote 340 further includes a transmit and receive module 342 for managing wireless communications to or from the mote 340. As described above, the mote 340 may transmit wireless signals including seismic data or other wireless signals to adjacent concentrators (or motes or other array platforms). Transmissions may be made to nearby motes equipped with transmit and receive modules, for example, for purposes of synchronization, array configuration, bandwidth management, or other purposes as discussed in greater detail below.

In addition, there are many reasons why the mote 340 may receive wireless signals from a local concentrator 110 or other platform of the seismic array 100. For example, it may be desirable to enable the motes 120 to respond to polling signals from another unit in the array 100, to receive signals instructing the motes 120 to go to low-power operation, to return to normal operation, to begin recording seismic data, to cease recording seismic data, to switch frequencies, transmission modes, or other characteristics, or to otherwise facilitate management of the array 100. The illustrated module 342 enables transmission and reception of wireless signals via the antenna 350 or another antenna. It will be appreciated that the same or different wireless communications protocols may be utilized for receiving and transmitting wireless signals.

For example, in one embodiment, motes 120 may be addressed by other units in the array for communication therewith. For example, the concentrator 110 may communicate directly with motes 120 by addressing an individual given mote 120 within communication range of the concentrator 110. In this regard, while concentrator-to-mote communications are described, similar concepts may be applied in relation to communication with the mote 120 by way of an LIU 130 and/or CRU 140. Specifically, each mote 120 may have a unique identifier associated with the mote 120. For example, each mote 120 may have a serial number that uniquely identifies the mote 120. In turn, the unique identifier (e.g., an electronic or a physical serial number) may be utilized to address the mote 120. For example, the unique identifier may be appended to a data packet communicated by the concentrator 110. In this regard, the unique identifier may be contained in a header of a data packet communicated by the concentrator 110. In this regard, a plurality of motes 120 may each be operative to receive the communication containing the unique identifier. In turn, each mote 120 may be operative to analyze the data packet to determine the unique identifier and compare it to a unique identifier stored in memory at the mote 120. If the unique identifier corresponds to the unique identifier associated with the mote 120, the mote 120 may process the received message from the concentrator 110. In the event that the unique identifier does not correspond the mote 120 may not process the message or simply disregard the message.

In this regard, concentrators 110 and/or other units within the array 100 may receive identification of the unique identifiers for motes 120 within communication range of unit. This may be the case even if the concentrator 110 in or other unit does not maintain contact with the mote 120. For example, it may that, during the course of the survey, the assignment of motes 120 concentrators 110 is altered such that a concentrator 110 that previously did not communicate with a given mote 120 establishes communication with the given mote 120 at some point during the survey. In this regard, the concentrator 110 may have stored therein or receive from an external source addressing information in the form of the unique identifier for addressing messages to the mote 120. Additionally or alternatively, unique communication parameters such as unique identifier frequencies, codes, time divisions, or the like may also be utilized to communicate with unique corresponding ones of the motes 120.

Figure 4D:
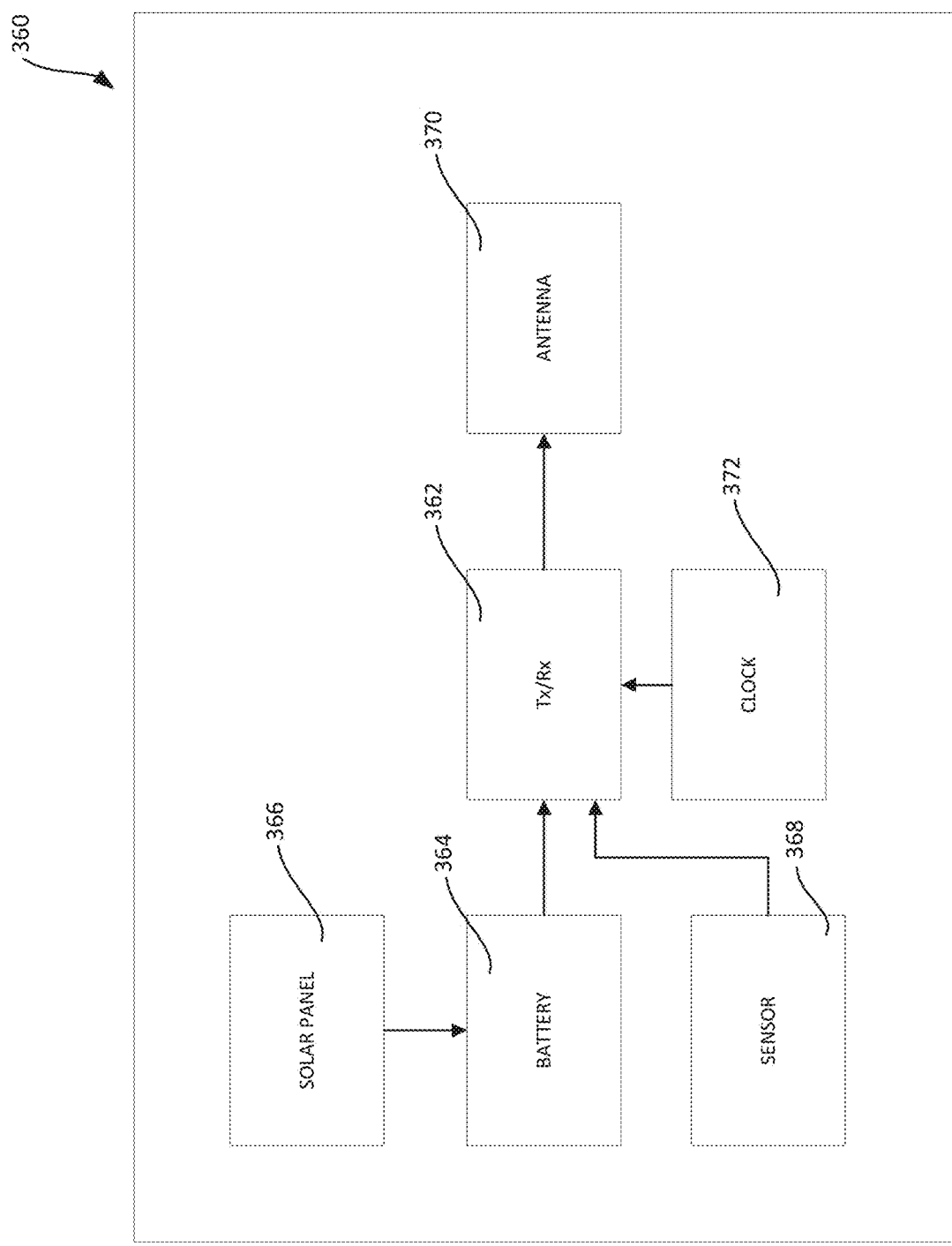

FIG. 4D is a schematic diagram of a further alternative embodiment of a mote 360 in accordance with the present invention. The illustrated mote 360 includes a transmission module 362, a battery pack 364, a solar panel 366, a sensor 368, and an antenna 370 that are similar to the corresponding elements described above in connection with FIG. 4A. The illustrated mote 360 further includes a clock 372. The clock 372 is operative for providing clock signals such that a time reference can be associated with seismic data from the sensor 368. For example, the time references from the clock 372 can be utilized by a processor at a remote platform of the array (e.g., at a local concentrator, a remote concentrator, or other platform of the array) together with a latency value or values, such that the seismic data is adjusted to a common time reference with respect to other motes 120 of the array 100. The latency value or values may include transmission latency and/or processing latency. In this regard, a correction to the time reference from the clock 372 may take into account transmission and processing latency, clock drift, environmental factors and the like. Alternatively, the time reference from the clock 372 may be corrected in post processing to account for such factors.

Furthermore, it may be appreciated that the distance between communicating concentrators 110 may be greater than the distance between a concentrator 110 in communication with the mote 120. In this regard, when performing synchronization as described above where a time reference in connection with a latency value is used in relation to the clock 372, transmission latency and processing latency may be factored into concentrator-to-concentrator communication for purposes of radio synchronization, whereas concentrator-to-mote radio synchronization may only account for processing latency. That is, because the distance between concentrators may be greater than the concentrator-to-mote spacing, the greater distance may affect the transmission latency when communicating between concentrators, whereas the transmission latency may be disregarded given the short range communications between concentrator and mote.

Figure 4E:
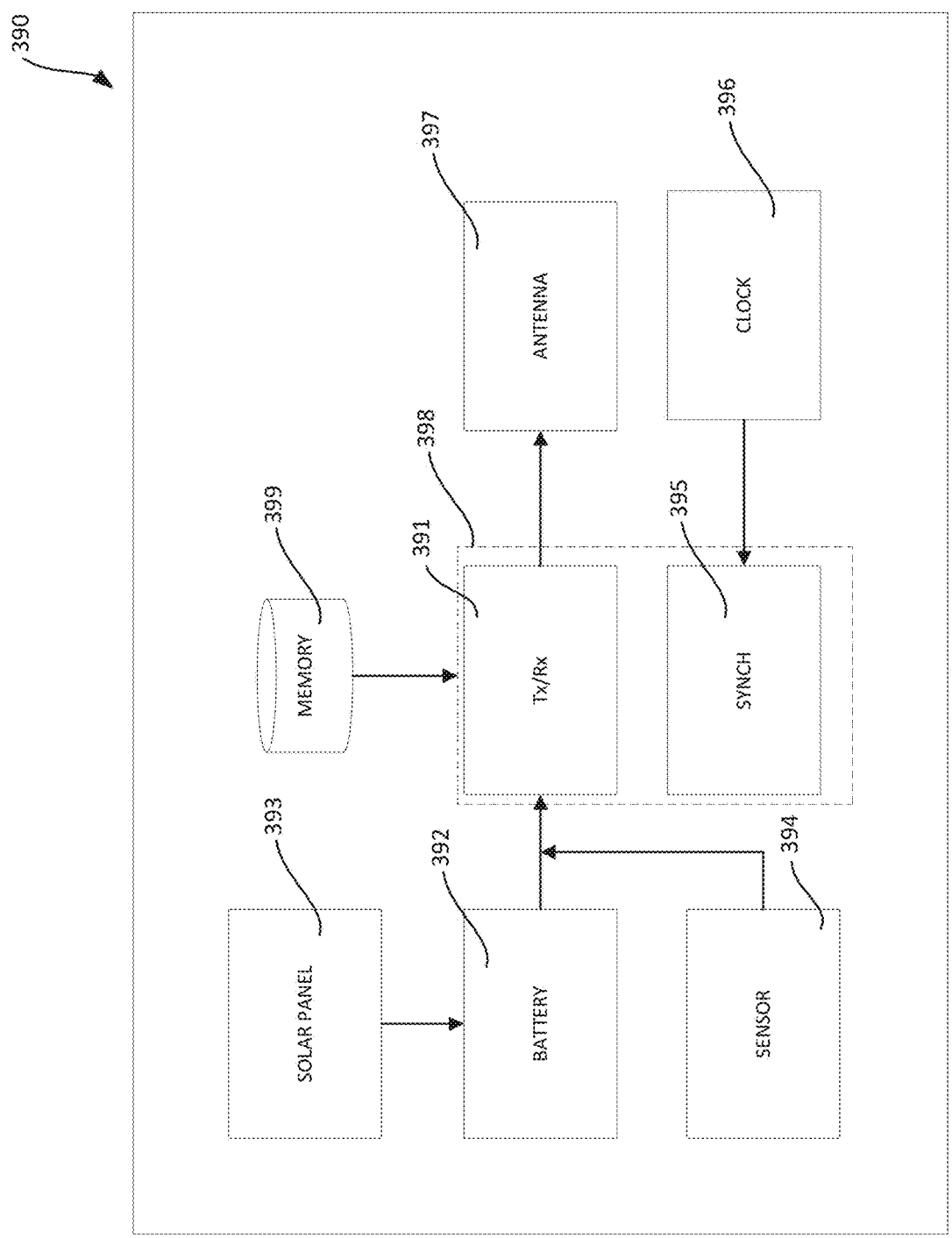

FIG. 4E is a schematic diagram of a still further embodiment of a mote 390 in accordance with the present invention. The illustrated mote 390 includes a transmit and receive module 391, a battery pack 392, a solar panel 393, a sensor 394, and an antenna 397 which may all be similar to the corresponding components as described in connection with FIG. 4C above. The illustrated mote 390 further includes a clock 396 and a synchronization module 395. As discussed above, high-quality imaging requires synchronization of seismic data acquired at different motes 120 across the array 100. This can be accomplished by applying time references to the seismic data at each mote 120, where the time references are synchronized across the array 100. Unfortunately, due to transmission and processing latencies, clock drift and other factors, the time references at different motes 120 will not stay synchronized over time without some form of clock discipline. Furthermore, given the desire to provide low-cost, low maintenance units, it may be impractical or infeasible to use highly precise clocks at the motes 120. Rather, relatively low-cost clocks that may be routinely synchronized may provide cost, weight, complexity, and other advantages over such high precision clocks. For instance, conventionally cableless seismic units have been equipped with GPS units such that the clocks of each unit can be continuously or periodically disciplined to GPS time. However, this increases the costs of individual units and power usage, thus shortening battery life. Moreover, the additional costs required for GPS at each mote 120 may be prohibitive in the context of very large and/or very dense arrays.

In turn, the synchronization module 395 of the illustrated mote 390 may be operative to wirelessly receive a time reference from an external component and to adjust the received time reference to account for transmission and processing latency and/or other factors such that the seismic data can be associated with a time reference that is common with other motes 120 of the array 100. For example, GPS time or other "true" time may be obtained at a local concentrator 110, a remote concentrator 110 or another platform of the array 100. In at least some embodiments, the synchronization module 395 may include a GPS module for use in synchronizing the clock 396. The time reference may be directly or indirectly communicated to the mote 390 and processed by the synchronization module 395 to provide the desired time reference. The process for receiving an external time reference and processing the external time reference to account for transmission and processing latency is described in U.S. Pat. No. 8,228,757, which is incorporated herein by reference in its entirety. Furthermore, as described above transmission latency as well as processing latency may be used when using radio synchronization techniques between concentrators. However, in the case of concentrator-to-mote communication, processing latency may be used and transmission latency may be disregarded given the relatively short distances contemplated.

The illustrated mote 390 may further include memory 399 (e.g., solid-state memory) operatively associated with a processor 398 running the transmit and receive module 391 and synchronization module 395. In many contexts, it may be desirable to provide substantial memory in connection with the mote 390. For example, in some cases, seismic data may be stored for a substantial period of time. This may occur where a transmission line from the mote to a central recording unit is interrupted, when it is desired to read out the array at a certain time of day or where noise levels are low, or for any other reason that local storage may be desired. In this regard, the mote 390 may be capable of executing in a hybrid radio telemetry system such as that described in U.S. patent application Ser. No. 14/205,902 and/or U.S. patent application Ser. No. 14/205,904, both of which are incorporated by reference herein. That is, the mote 390 may be capable of both real time data read out and storage of seismic data for delayed readout (e.g., upon reestablishment of communication once lost or the end of the survey). Such approaches to this hybrid radio telemetry are addressed specifically below in connection with operation of an embodiment of an array 100.

Figure 4F:
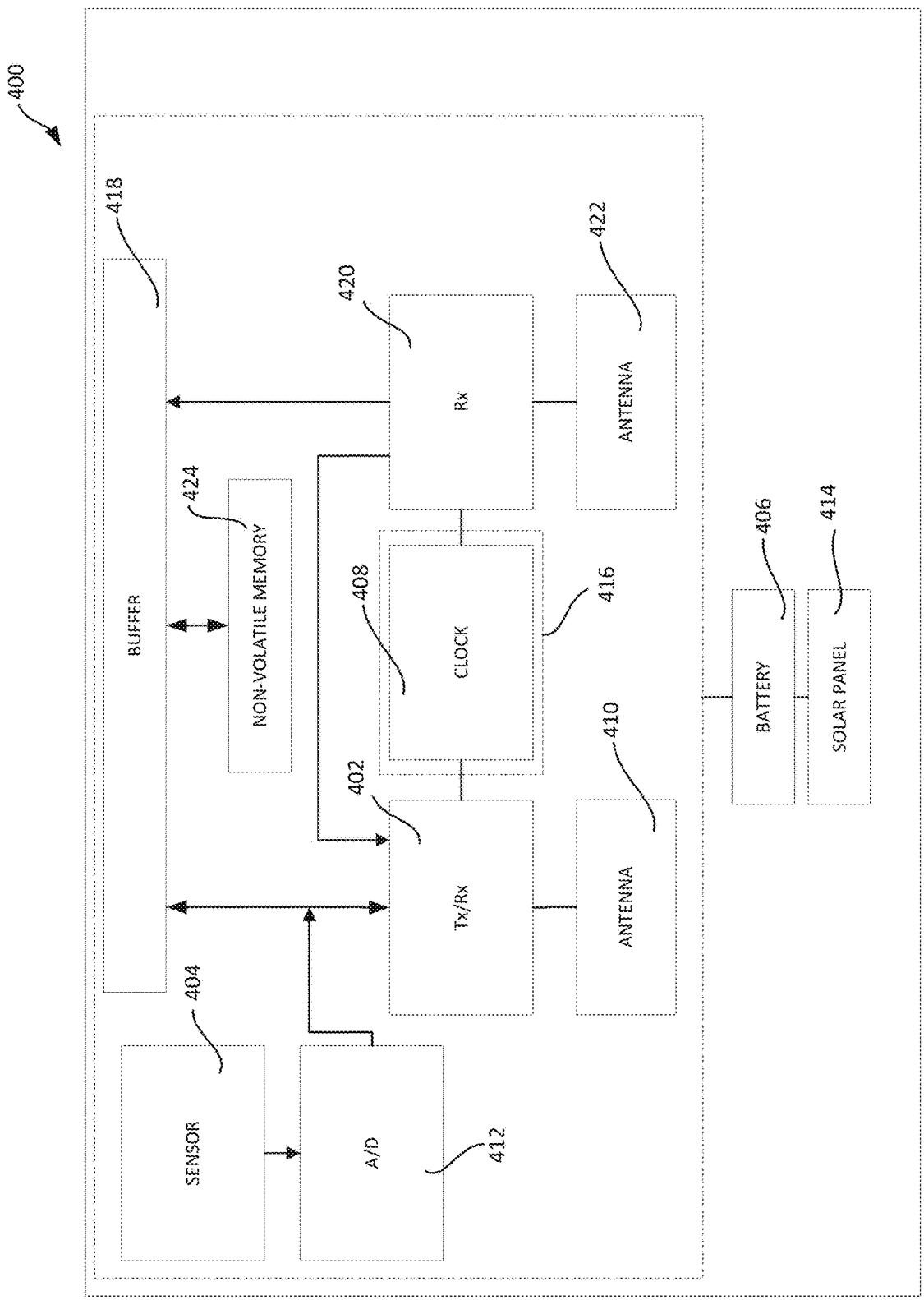

FIG. 4F presents a schematic diagram of an embodiment of a mote 400. The illustrated mote 400 may include a sensor 404, a power source or battery pack 406 to power one or more components of the mote 400, a transmission/receiving module 402, a clock 408 and an antenna 410. The sensor 404 (e.g., velocity sensor, an accelerometer, analog geophone element, MEMS sensor, or other instrument) senses vibration or movement of the ground and provides an output signal (e.g., analog or digital) to the transmission/receiving module 402 based on the sensed vibrations for transmission by the antenna 410. For example, certain MEMS accelerometers may provide a digital output signal. In one arrangement, the sensor 404 may be in the form of an internal geophone. In another arrangement, the mote 400 may include a geophone connector to replace and/or be used in place of an internal geophone.

In the case where the sensor 404 outputs an analog signal, the mote 400 may include an A/D converter 412 configured to convert the analog signals into corresponding digital signals and pass the same to the transmission/receiving module 402. While not shown, the mote 400 may also include any appropriate analog front end (AFE) including conditioning circuitry configured to interface the sensor 402 with the A/D converter 412. Even though the signal transmitted from the antenna 410 may be an analog or digital signal, a digital signal is often preferred to reduce power requirements and extend battery life. The AFE and/or A/D converter 412 may also allow the mote 400 to perform self tests of the sensor 404 and/or A/D converter 412.

The battery pack 406 may include one or more batteries such as rechargeable batteries. As it is anticipated that the power and energy requirements of the mote 400 may be small, conventional off-the-shelf batteries may be utilized in one embodiment (e.g., rechargeable AA or AAA batteries or button batteries). In this regard, it is anticipated that the mote 400 may draw less than 100 mW less than 50 mW, or even 25 mW or less of power in operation. To extend the battery and overall operational life of the mote 400, a source of energy for recharging the battery pack 406 such as a solar panel 414 may be provided. Alternatively, the battery pack 406 may be recharged by other energy sources such as received RF signals, ground vibrations, or the like.

The transmission/receiving module 402 may generally manage wireless communications to or from the mote 400 (via antenna 410) with its local concentrator 110. As one example, the transmission/receiving module 402 may manage the transmission of seismic data sensed by the sensor 404 as well as corresponding time references from clock 408 and synchronization module 416 to a local concentrator 110 for further transmission and/or processing. As another example, the transmission/receiving module 402 may manage wireless transmissions to local concentrators 110 (e.g., also equipped with transmission/receiving modules) for purposes of synchronization, array configuration, bandwidth management, or other purposes.

Additionally, the transmission/receiving module 402 may manage the receipt of wireless signals received from one or more remote platforms of the array 100 (e.g., local concentrator 110, etc.). For example, it may be desirable to enable the motes 400 to receive signals (e.g., from a local concentrator 110, etc.) instructing the motes 400 to go to low-power operation, to return to normal operation, to begin recording seismic data, to cease recording seismic data, to switch frequencies, transmission modes, or other characteristics, or to otherwise facilitate management of the array 100. Furthermore, the transmission/receiving module 402 may be configured to implement any appropriate wireless protocol for facilitating communications between the mote 400 and its local concentrator 110 (e.g., a short-range protocol).

The clock 408 is operative for providing clock signals such that a time reference can be associated with seismic data collected by the sensor 404. For example, the transmission/receiving module 402 may be configured to tag or otherwise associate seismic signals sensed by the sensor 404 with corresponding time references provided by the clock (e.g., where each time reference indicates a time that a corresponding portion of the seismic data was sensed by the sensor 404) and transmit the same (via antenna 310) to a remote platform of the array 100 (e.g., local concentrator 110, etc.)

As described above, it may be important to ensure that seismic data sensed by the various motes of the array 100 are all processed according to a common time reference. Stated differently, it may be important to synchronize all of the clocks 408 of the various motes 400 so that the seismic survey can be conducted according to a synchronized or normalized time reference. In one arrangement, the time references from the clock 408 of each mote 400 can be utilized by a processor at a remote platform of the array (e.g., at a local concentrator 110, a remote concentrator 110, LIU 130, and/or other platform of the array 100) together with a latency value or values, clock drift, environmental factors and/or any appropriate correction factors such that the seismic data is adjusted to a common time reference with respect to other motes of the array.

In this regard, the mote 400 may, in one embodiment, further include a synchronization module 416 that is operative to wirelessly receive (e.g., via antenna 410 and transmission/receiving module 402; via antenna 422 and receiving module 420, discussed in more detail below; etc.) time references from an external component or platform (e.g., from remote platform of the array 100 such as a local concentrator 110, from a remote positioning system such as a GPS, etc.) and adjust the time reference received from the clock 408 to account for transmission latency and processing latency and/or other factors (that would otherwise skew the various timing references of the various clocks 408 of the motes 400) such that the seismic data can be associated with a time reference that is common with other motes 400 of the array. For example, GPS time or other "true" time may be obtained at a local concentrator 110, a remote concentrator 110 or another platform of the array 100 which may be appropriately directly or indirectly communicated to the motes 400 and processed by the synchronization modules 416 to provide the desired time reference. One process for receiving an external time reference and processing the external time reference to account for transmission and processing latency is described in U.S. Pat. No. 8,228,757, which is co-owned with the present application and incorporated herein by reference in its entirety.

As another example, the mote 400 may further include a receiving module 420 (e.g., GPS receiver) that is configured to directly receive (e.g., via antenna 422) positioning signals from a remote positioning system (e.g., GPS satellites) and pass the same to the synchronization module 416 which may be configured to parse timing information out of the positioning signals and use the same to adjust the local timing information supplied by the clock 408. Furthermore, and as will be discussed in more detail below, the received positioning signals may be passed to transmission/receiving module 402 where the positioning signals may be transmitted (via antenna 410) in a substantially or fully unprocessed state to local concentrator 110 for resolution (e.g., by the local concentrator 110 and/or by another remote platform of the array 100) of a location of the mote 300 (e.g., GPS coordinates) at high levels of accuracy (e.g., sub-meter, such as 10 cm or less). This technique may be referred to as a distributed GPS approach, which is discussed in greater detail below.

As also shown in FIG. 4F, the mote 400 may include any appropriate data buffer 418 (e.g., solid-state drive, such as flash memory, etc.) that may be used to store seismic data, timing references, received positioning signals and/or other wireless signals before being transmitted to remote platforms and/or upon being received from remote platforms. For instance, the buffer 418 may be used to store seismic data when a transmission channel from the mote 400 to a local concentrator 110 is interrupted or otherwise not accessible, when it is desired to read the seismic data at a certain time of day or where noise levels are low, or for any other reason that local storage may be desired.

The buffer 418 may also be in operative communication with a non-volatile memory 424 such as, for example, a large array of flash memory. In this regard, the mote 300 may be operative to store seismic data collected over a relatively long duration. For example, in the event the mote 400 loses communication with a concentrator unit 110, the mote 400 may begin to store acquired seismic data locally in the non-volatile memory 424. The mote 400 may remain in this mode for the duration of the survey, or upon reconnection to a concentrator unit 110, may begin to read out data from the non-volatile memory 424 (e.g., concurrently with real time readout of "live" acquired seismic data) by way of wireless communication with a concentrator unit 110. When reading out the non-volatile memory by wireless readout, the seismic data records stored in the non-volatile memory 424 may be fragmented or divided such that only a portion of record is transmitted during a transmission to a concentrator unit 110. In turn, the records may be reassembled at the concentrator unit 110, LIU 130, and/or CRU 140 after transmission thereto.

Figure 5:
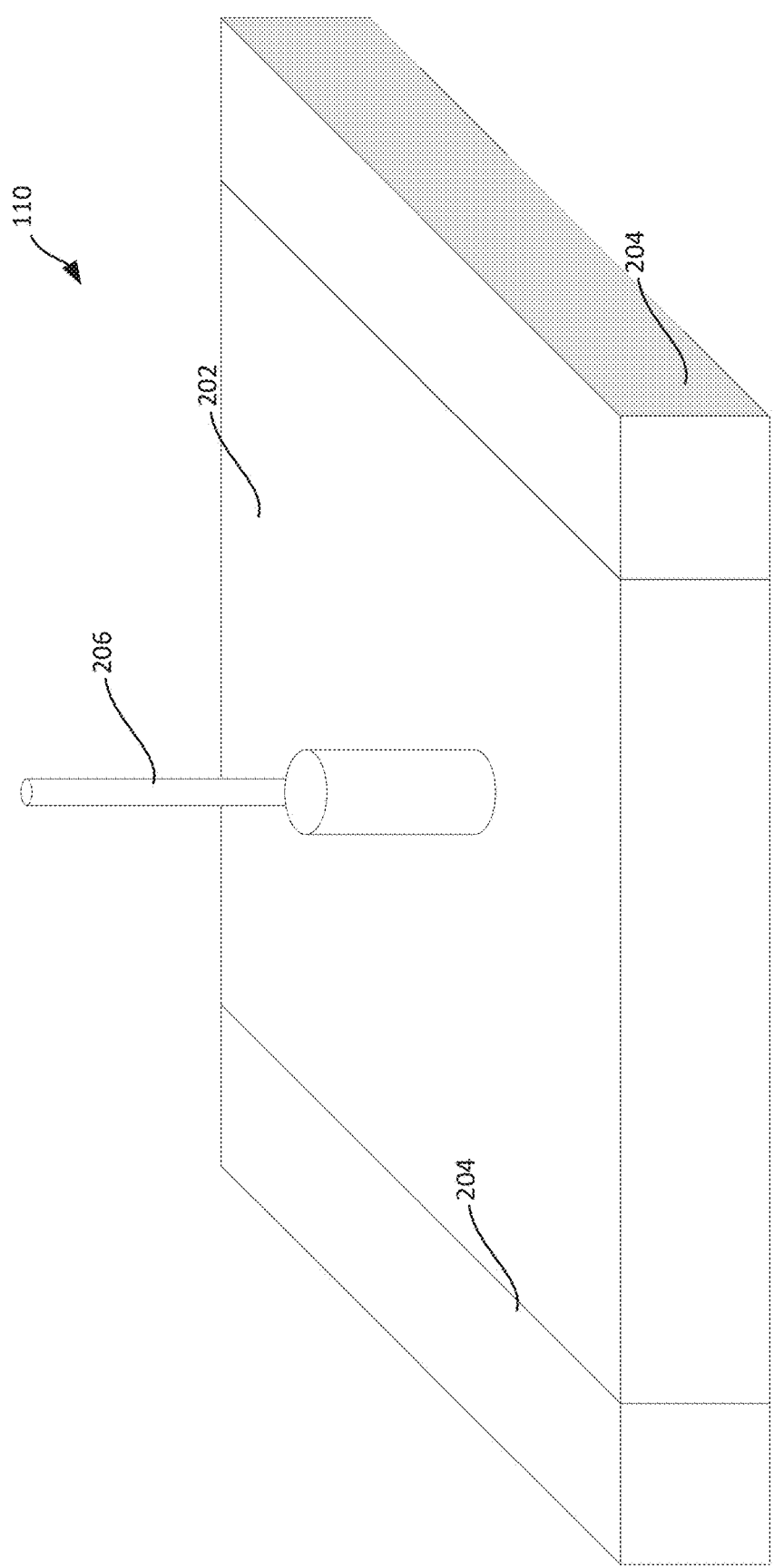
FIG. 5 depicts a perspective view of an embodiment of a concentrator for use in a hierarchical array for wireless readout of seismic data.

FIG. 5 is a perspective view of an embodiment of a concentrator 110. As will be appreciated from the discussion below, in certain array contexts, it is anticipated that a large number of concentrators 110 will be geographically distributed across the array, for example, in a grid pattern or in a number of parallel lines. This is advantageous as it facilitates wireless transmissions even where the terrain is uneven as line of sight transmissions from each concentrator 110 to a central recording unit 140 may not be required. Rather, the multihop configuration from concentrator 110 to concentrator 110 may facilitate relayed serial data communication from the concentrators to the central recording unit. In addition, because individual concentrators are not required to make long-range transmissions, power requirements are reduced and battery life is extended. Accordingly, it is desirable that the concentrators be simple, robust, and low-cost units.

The illustrated concentrator 110 includes a housing 202, battery packs 204 connected to the housing 202, and an antenna 206. The housing 202 may house certain electronic components such as a processor, memory, transmission and reception logic, a clock, synchronization logic and associated components as will be described in more detail below. The battery packs 204 preferably provide power and energy sufficient to enable operation of the concentrator 110 throughout the course of a survey. In the illustrated embodiment, two battery packs 204 are utilized. The battery packs 204 may be configured to be hot-swappable. That is, either of the battery packs 204 may be removed and replaced as necessary while the concentrator 110 continues to operate utilizing the remaining battery pack so that operation is not interrupted.

The illustrated concentrator 110 further includes an antenna 206. As will be understood from the description below, the concentrator 110 is generally operative in two modes which may both be active simultaneously. First, the concentrator 110 may be operative for receiving wireless signals and in some cases transmitting wireless signals to multiple motes 120 in the vicinity of the concentrator 110. Second, the concentrator 110 may be operative for transmitting wireless signals to and receiving wireless signals from adjacent concentrators 110 or other array platforms (e.g., a line interrupt unit (LIU) 130, central recording unit (CRU) 140, or other unit in the array 100). The illustrated antenna 206 may be used for either or both of these modes of wireless communication. Alternatively, the illustrated antenna 206 may be used for one mode of wireless communications, such as concentrator-to-concentrator communications, whereas a separate antenna (e.g., an internal antenna provided on a communication chipset within housing 202) may be used for the other mode. At least for concentrator-to-concentrator wireless transmissions, it may be desirable that the antenna 206 extend vertically some distance from the housing 202 so as to improve effective signal strength in uneven terrain or where foliage or other obstructions may attenuate signal transmissions. For example, the antenna 206 may extend vertically for about one to three feet from the housing 202. Additional radio and antenna configuration embodiments are described in greater detail below.

Figure 6A:
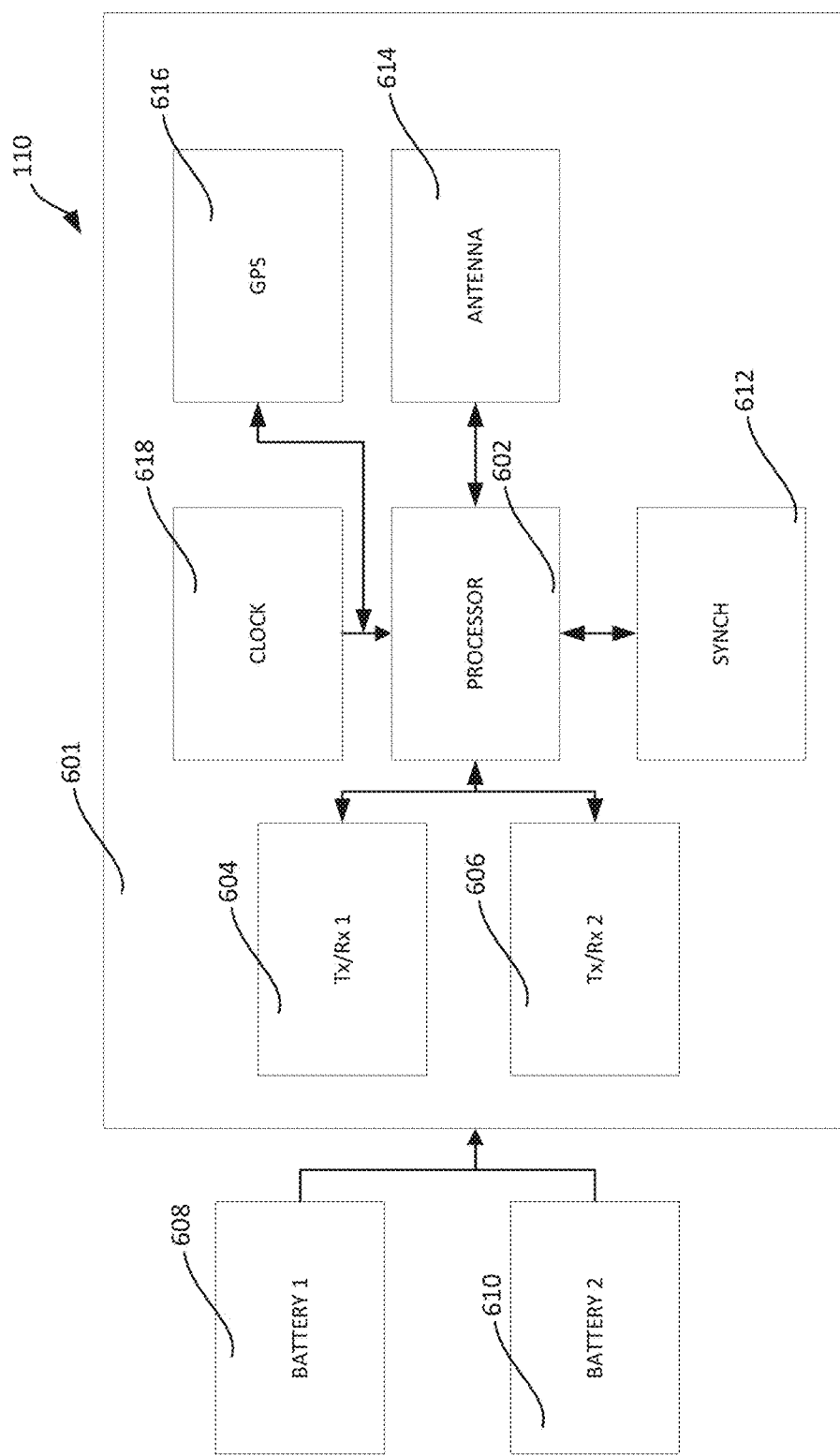
FIG. 6A-6B depict schematic views of various embodiments of a concentrator for use in a hierarchical array for wireless readout of seismic data.

FIG. 6A is a schematic diagram of an embodiment of a concentrator 110 in accordance with the present invention. As will be described in more detail below, each concentrator 110 of the seismic array is operative for receiving seismic information from one or more motes 120 and for transmitting the seismic information to another concentrator 110 or to another platform of the array 100. In preferred embodiments, each concentrator 110 receives seismic information from two or more motes 120 and communicates the seismic data from concentrator-to-concentrator by way of serial data communication to a central recording unit 140. In this regard, the concentrator 110 may receive seismic data from an upstream concentrator 110 and transmit seismic data from one or more upstream concentrators 110, as well from local motes 120, to a downstream processor (e.g., an LIU 130, a CRU 140, or other unit). Preferably, the concentrator 110 does not include a geophone but, rather, simply collects and re-transmits seismic data. Accordingly, the concentrator 110 can be produced as a relatively simple, low-cost unit.

It will be appreciated that the concentrator 110 may, however, execute additional functionality. For example, the concentrator 110 may be adapted to communicate upstream as well as downstream in the array 100. Such upstream communications may be utilized in array formation, transmitting timing and synchronization information, and other maintenance or quality control signaling. In addition, the concentrator 110 may include tilt sensors, accelerometers, and other components that may be used for automatic start-up functionality, sensing environmental conditions and the like. For example, the concentrator 110 may incorporate any or all the teachings of U.S. Pat. No. 8,614,928, the entirety of which is incorporated by reference herein. The description below focuses on functionality related to seismic data acquisition and readout.

In addition, one or more (up to all) of the concentrators 110 in the array may include flash or other storage. Such storage may be used, among other things, to store seismic data when a transmission path to a central recording unit is down and the transmission path to the CRU 140 cannot be immediately healed. In such cases, data from motes 120 can be stored at a local concentrator 110 or transmitted to an accessible concentrator (upstream or downstream) with storage. The data may then be stored for later retrieval, or transmitted to the central recording unit 140 when the transmission path is restored.

The illustrated concentrator 110 includes a number of electronic components housed within housing 601 and detachable battery packs 608 and 610 that can be connected to and detached from the housing 601. As discussed above, the battery pack 608 and 610 are configured to be hot-swappable so that a low-battery can be swapped-out without disrupting operation of the concentrator 600. In this regard, the status of the battery packs 608 and 610 can be monitored, e.g., using a volt meter, and low-battery alerts can be displayed at the concentrator 600 and/or transmitted to a central control station. In the latter regard, warnings may be displayed to an operator so that a worker can be discharged to replace battery packs as necessary. In this manner, uninterrupted operation of the concentrators of the array can be assured throughout a survey process. The batteries are preferably rechargeable. The concentrator 600 may include a solar array or allow for wireless battery recharging.

The electronic components in housing 601 include first and second transmit and receive modules 604 and 606 and an antenna 614. As noted above, the concentrator 110 is generally operative for wireless communications with local motes as well as with adjacent concentrators or other array platforms. Preferably, the concentrator 110 utilizes at least two different wireless protocols in this regard. For example, transmit and receive module 604 can accommodate wireless communication with local motes using a short-range, low-power communications protocol. For example, an off-the-shelf personal area network technology such as Bluetooth or Zigbee may be employed. Alternatively, a proprietary protocol may be utilized. Such protocols may be employed, for example, in the 900 MHz, 2.4 GHz or 5.8 GHz bands. In any event, the wireless protocol utilized for communication between the motes and the concentrator 110, as well as the transmitter power settings and other transmission parameters, are preferably selected to minimize power consumption and avoid interference with concentrator-to-concentrator communications while supporting the short-range communication required for communication between the motes 120 and the concentrator 110. In this regard, the motes 120 may be positioned at various distances from the concentrator 110. For instance, all motes 120 that communicate with a given concentrator 110 may be within about twenty meters of the given concentrator 110. In another application, each mote 120 in communication with a concentrator 110 may be no more than ten meters from the concentrator 110. However, is still other applications, motes 120 may be positioned 50 meters or more from the concentrator 110 with which the mote 120 is in communication. In this regard, the protocol for communication between the motes 120 and the concentrator 110 may support communication at 50 meters, 75 meters, or even as far as 100 meters.

The illustrated transmit and receive module 606 manages communication between the concentrator 600 and other concentrators or other array platforms such as line interface units or a central recording unit. In preferred implementations, as will be described in more detail below, seismic data is transmitted from concentrator-to-concentrator to relay seismic information from the motes 120 to a central recording unit 140 using the serial data transmission line between concentrators 110. Such an architecture allows for reliable communication in uneven terrain environments and reduces the transmission power required, thereby extending battery life. Moreover practical implementations of arrays may have a limited number of channels available for the motes. This, combined with the desire (in some cases) to provide a dense population of motes 120, may require that the spacing between concentrators 110 be kept relatively short. However, in order to reduce survey costs and optimally manage the bandwidth utilized by the concentrators, it is desirable that the concentrators be capable of transmission ranges greater than that between the concentrators and the motes. Accordingly, the communications protocol managed by the transmit and receive module 606, as well as the transmission power settings and transmission parameters, are preferably selected to accommodate mid-range wireless communications. For example, the spacing between concentrators may be greater than 20 meters in some cases. The layout of concentrators 110 in relation to motes 120 is discussed in greater detail below in connection with FIG. 11.

The illustrated concentrator 110 is depicted as including an antenna 614. It will be appreciated that a single antenna may be utilized for wireless communications with local motes and other concentrators or array platforms. Alternatively, one antenna may be utilized for communicating for with the motes and another antenna may be utilized for communicating with other concentrators or network platforms. As will be described below, directional antennas may be utilized for either or both of these types of communications. Such directional antennas reduce transmission power requirements for a given transmission range and reduce crosstalk, thereby improving bandwidth across the array. Directional antenna technology and associated functionality is described in U.S. patent application Ser. No. 14/042,251, which is incorporated herein by reference. Communication between the transmit and receive modules 604 and 606 and the antenna 614 may be implemented via a processor 602.

The illustrated concentrator 600 further includes a clock 618, a synchronization module 612, and an optional GPS module 616. As discussed above, it is desirable to synchronize time references across the array so as to facilitate processing of the seismic data and generation of images of the subterranean region under analysis. In addition, synchronization of clocks across the array allows for management of various other functions such as frequency hopping or other coordinated transmission of information between the various platforms of the array. In this regard, the illustrated concentrator 110 includes a clock 618 that is disciplined by a synchronization module and/or an on-board GPS module 616. Where an on-board GPS module 616 is provided, GPS time references can be utilized to periodically or continually adjust the time and frequency of the clock 618. For example, the GPS module 616 may be utilized to discipline the clock 618 periodically (rather than continually) so as to conserve power.

Alternatively or additionally, the synchronization module 612 may receive time reference information from an external source, such as another concentrator or other network platform, and adjust the time reference based on calculated transmission and processing latencies or other factors, to yield a local time reference for the concentrator 110. Such a process is described in U.S. Pat. No. 8,228,757, which is incorporated herein by reference. This local time reference may be utilized for managing operation of the concentrator 110 as well as for associating time references with seismic data from local motes. Alternatively, the local time reference may be transmitted to local motes. The motes may then utilize the time reference as received or perform a further adjustment of the time reference, e.g., related to transmission and processing latencies of the mote in relation to the concentrator 110. As noted above, the time reference components 612, 616, and 618 of the concentrator 110 may also be used for sampling or re-sampling information from the motes.

Figure 6B:
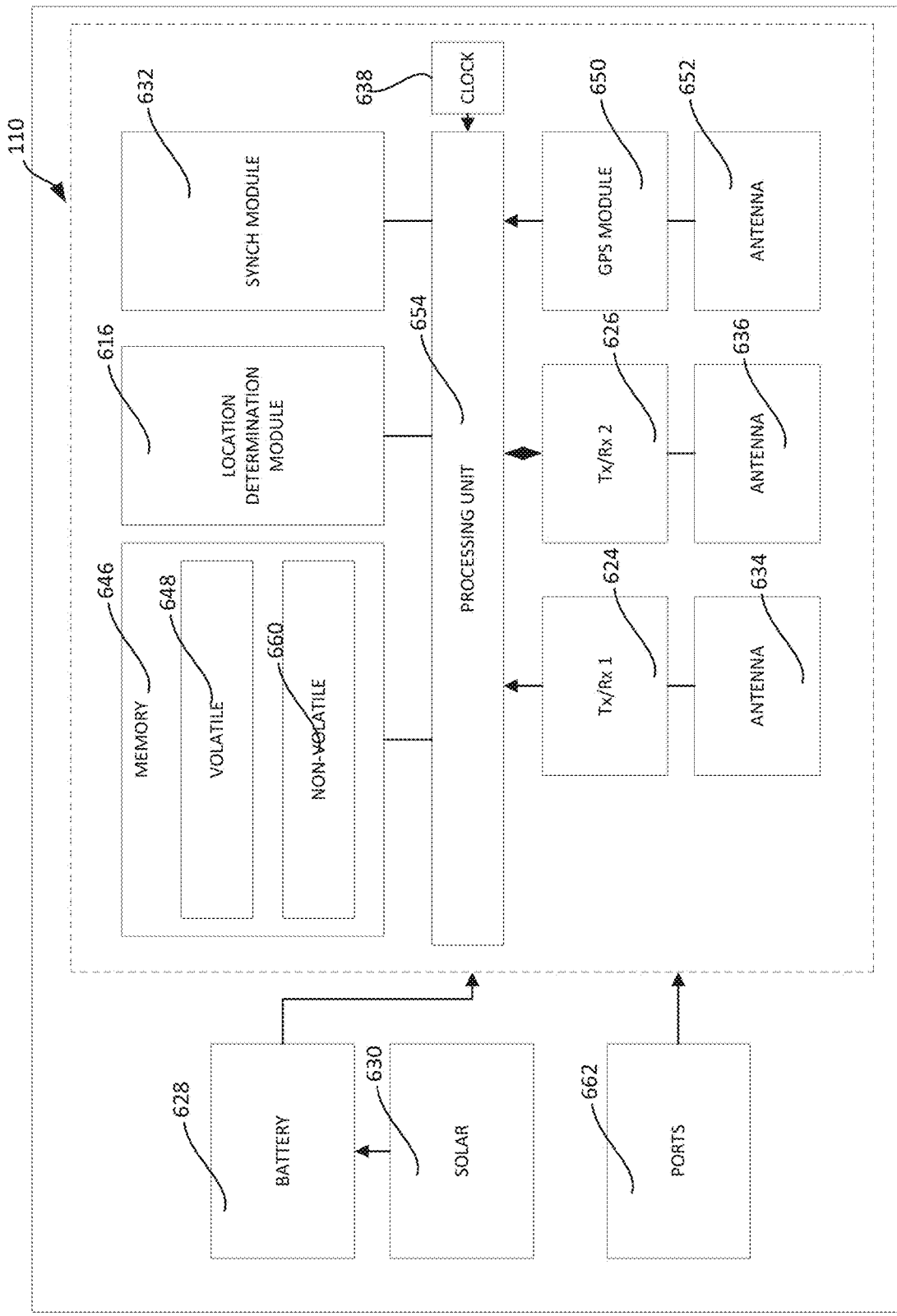

FIG. 6B presents a schematic diagram of another embodiment of a concentrator 110. As discussed herein, each concentrator 110 of the array 100 generally receives seismic information from one or more local motes 120 and communicates the seismic data from concentrator-to-concentrator in daisy-chain or serial fashion eventually to the CRU 140. Furthermore, each concentrator 110 may receive positioning signals and/or embedded timing information from the one or more local motes 120 for use in determining a location (e.g., geographic coordinates) of each of the motes 120 (e.g., by the concentrator 110 and/or by one or more remote platforms, e.g., LIU 130). As discussed herein, each mote 120 may be configured to receive positioning signals from one or more remote positioning systems and transmit the same (e.g., in an unprocessed state) to a local concentrator 110 for processing and/or retransmission. In this regard, the concentrator unit 110 depicted in FIG. 6B may be utilized in conjunction with a mote 120 for distributed GPS processing as will be described in greater detail below.

In any event, the concentrator 110 may receive seismic data from one or more upstream concentrators 110, as well from local motes 120, and relay the seismic data to one or more downstream concentrators 110 and/or processors (e.g., LIU 130, CRU 140, etc.). In one arrangement, the concentrator 110 does not include a geophone but, rather, simply collects and re-transmits seismic data. Accordingly, the concentrator 110 may in some arrangements be produced as a relatively simple, low-cost unit.

In another arrangement, the concentrator 110 may be adapted to communicate upstream as well as downstream in the array 100 (e.g., upstream or downstream in its particular row or line of concentrators 110 in the array 100). For instance, upstream communications may be utilized in array formation, transmitting timing and synchronization information, and other maintenance or quality control signaling. In addition, the concentrator 110 may include tilt sensors, accelerometers, and other components that may be used for automatic start-up functionality, sensing environmental conditions and the like.

Broadly, the illustrated concentrator 110 includes a number of interconnected electronic components housed or contained within a housing as well as one or more detachable/hot-swappable batteries 628 (e.g., first and second rechargeable battery packs) for powering the electronic components of the concentrator 110. In one arrangement, the concentrator 110 includes a solar array 630 or allows for wireless battery recharging.

As shown, the electronic components may include at least first and second transmission/receiving modules 624 and 626 electrically interconnected to first and second respective antennas 634, 636 for respectively facilitating wireless communications between the concentrator 110 and one or more local motes 120 as well as between the concentrator 110 and one or more adjacent concentrators 110. In one arrangement, the first and second transmission/receiving modules 624 and 626 may utilize at least two different wireless protocols for the aforementioned communications. For example, the first transmission/receiving module 624 can accommodate wireless communications with local motes 120 using a short-range, low-power communications protocol such as an off-the-shelf personal area network technology (e.g., Bluetooth, Zigbee, etc.), a proprietary protocol (e.g., in the 900 MHz, 2.4 GHz or 5.8 GHz bands), and/or the like. In any event, the wireless protocol utilized for communications between the concentrator 110 and the local motes 120 as well as the transmitter power settings and other transmission parameters are preferably selected to minimize power consumption and avoid interference with concentrator-to-concentrator communications while supporting the short-range communication required for communication between the concentrator 110 and the motes 120.

The second transmission/receiving module 626 manages communication between the concentrator 110 and other concentrators 110 or other array platforms such as LIUs 130 or the CRU 140. For instance, the wireless communications protocol managed by the second transmission/receiving module 626, as well as the transmission power settings and transmission parameters, may be selected to accommodate mid-range wireless communications (e.g., to reduce survey costs and optimally manage the bandwidth utilized by the concentrators 110. In one arrangement, the spacing between concentrators may be greater than 20 meters. In still other arraignments, concentrators 110 may be spaced apart by about 25 meters, 50 meters, or even 100 meters or more. While first and second respective antennas 634, 636 are depicted for respectively facilitating wireless communications through the first and second transmission/receiving modules 624 and 626, it is also envisioned that a single antenna may be utilized for both wireless communications between the concentrator 110 and its local motes 120 (through the first transmission/receiving module 624) and wireless communications between the concentrator 110 and other concentrators or network platforms (through the second transmission/receiving module 626). In one arrangement, directional antennas may be utilized for either or both of these types of communications to reduce transmission power requirements for a given transmission range and reduce crosstalk, thereby improving bandwidth across the array. Directional antenna technology and associated functionality is described in U.S. patent application Ser. No. 14/042,251, which is incorporated herein by reference.

The illustrated concentrator 110 may also include a clock 638, a synchronization module 632, an on-board GPS module 650 (e.g. including a GPS receiver, processor for processing received GPS signals, memory, etc.), and an antenna 652 interconnected to the GPS module 650. As discussed above, it is desirable to synchronize time references across the array 100 to facilitate accurate processing of the seismic data and generation of images of the subterranean region under analysis. In addition, synchronization of clocks and/or time references across the array 100 allows for management of various other functions such as frequency hopping or other coordinated transmission of information between and/or among the various platforms of the array 100. In this regard, the clock 638 may be disciplined by the synchronization module 632 and/or GPS module 650.

In one arrangement, the GPS module 650 may receive GPS time references from a plurality of GPS satellites and use the same to periodically or continually adjust the time and frequency of the local clock 638. In another arrangement, the synchronization module 632 may receive time reference information from an external source, such as from another concentrator 110 or other network platform, and adjust the time maintained by the clock 638 based on calculated transmission and processing latencies or other factors, to yield a local time reference for the concentrator 110 (e.g., UTC time, GPS time, etc.). In a further arrangement, the synchronization module 632 may utilize timing references in the remote positioning signals received from the local motes 120 (e.g., via antenna 634 and first transmission/receiving module 624) to synchronize the time of the local clock 638 to UTC time, GPS time, etc. The synchronized local time may be utilized for managing operation of the concentrator 110 as well as for associating time references with seismic data from local motes 120 and/or may be transmitted to local motes 120; the motes 120 may then utilize the local time reference as received or else perform a further adjustment of the time reference, e.g., related to transmission and processing latencies of the mote in relation to the concentrator 110.

As shown, the concentrator 110 includes a processing unit 654 (e.g., one or more processors, microprocessors, microcontrollers, etc.) electrically interconnected to the battery 628, first and second transmission/receiving modules 624, 626, GPS module 650, etc. that broadly executes instructions and manages overall operations of the concentrator 110. For instance, the processing unit 654 may include a digital signal processor (e.g., microprocessor) that is configured to appropriately process (e.g., measure, filter, compress, etc.) seismic and/or positioning signals received from local motes 120 (e.g., via first transmission/receiving module 624), from adjacent concentrators 110 (e.g., via second transmission/receiving module 626, etc.). As another example, the processing unit 654 may also include a microcontroller for overall system management of the concentrator 110.

The concentrator 110 also includes any appropriate memory 646 such as volatile memory 648 (e.g., RAM) into which instructions, calculations, etc. may be temporarily loaded by the processing unit 660 during operation of the concentrator 500 (e.g., during execution of the synchronization module 632) as well as non-volatile memory 648 (e.g., solid state storage such as flash or the like) to store data (e.g., seismic data from motes 120) such as when a transmission path to an LIU 130 or the CRU 140 is down and cannot be immediately healed and/or the like. In such cases, data from motes 120 can be stored at a local concentrator 110 or transmitted to an accessible concentrator 110 (upstream or downstream) with storage. The data may then be stored for later retrieval or transmitted to the CRU 140 when the transmission path is restored. In one arrangement, the concentrator 110 may include one or more ports 662 (e.g., Ethernet) for cabled signal transmission to adjacent concentrators 500, to an LIU 130, etc.

Figure 10:
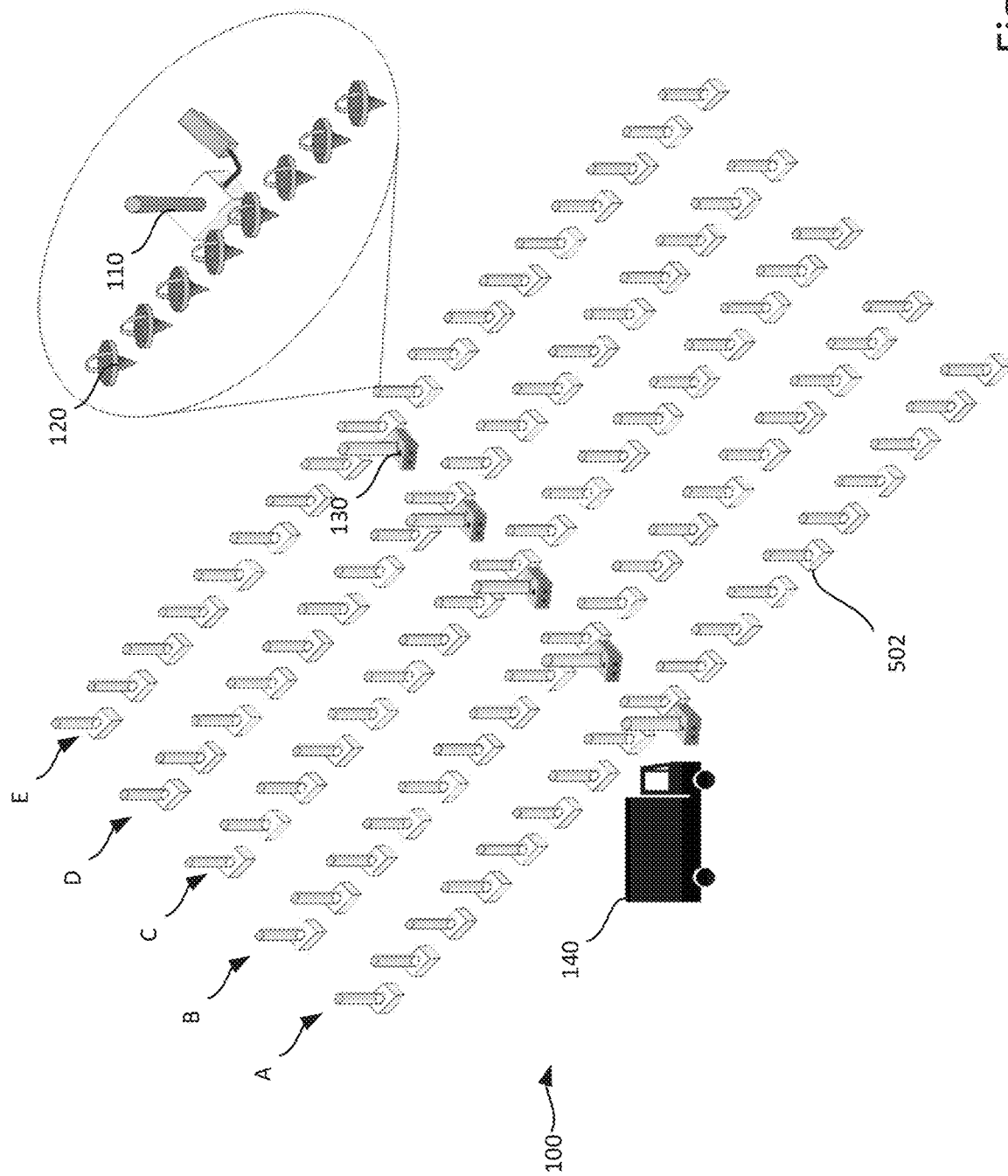
FIG. 10 depicts an embodiment of an array.

FIGS. 7-12C show examples unit configurations of motes and concentrators in accordance with the present invention. Referring initially to FIG. 10, the illustrated array 100 includes a number of concentrators 110 arranged in lines A-E. in this regard, each of the concentrators 110 may communicate along each respective line (e.g., line A, line B, line C, line D, and line E) in a multi-hop manner such that each concentrator 110 passes data towards a respective LIU 130 for each of the given lines. Each of the concentrators 110 in the illustrated array 100 is associated with a plurality of motes 120. The motes 120 acquire seismic information and transmit the seismic information to the local concentrators 110. Finally, the seismic data is transferred from LIU-to-LIU to a central recording unit (CRU) 140.

As discussed above, the communications between the motes 120 and the concentrators 110, the communications between concentrators 110, and the communications between a concentrator 110 and LIU 130 may all be wireless communications. The communications between the LIUs and between the last LIU 130 and the CRU 140 may be wireless or via a fiber optical line or cable. In a preferred implementation, the communications between the LIUs 130 and between the last LIU 130 and the CRU 140 are wireless and are conducted according to a still further wireless protocol different than that used for communications between the motes and the concentrators or between the concentrators. In this regard, the array 100 may execute at least three different wireless protocols. The spacing between the LIUs 130 may be greater than the spacing between adjacent concentrators 110 within the line A-E. For example, with further reference to FIG. 11, various spacing configurations are discussed.

A spread spectrum frequency hopping protocol may be implemented between the concentrators. Such a protocol is described in detail in U.S. patent application Ser. No. 14/175,868, which is incorporated herein by reference in its entirety.

It will be appreciated that the illustrated configuration of the array 100 allows for a relatively dense population of geophones across the array 100. In addition, the array 100 allows for simple bandwidth management as the communications protocol utilized by the motes 120 may allow for multiple channels, for example, twelve-sixteen channels, whereas only eight motes 120 are utilized in connection with each concentrator 110 in the illustrated array 100. Additional motes (e.g., 20 or more) may be provided in operative communication with each concentrator unit 110 in a given embodiment. Accordingly, a channel may be reused by motes, even where the motes 120 implement omnidirectional transmissions, and any potential interference can be readily addressed via co-channel rejection by the concentrators 110. Moreover, as the concentrators 110 do not include geophones for acquiring seismic data, the positioning of the concentrators 110 may be relaxed, thereby simplifying the process for initiating the array 100 and allowing for placement of the concentrators 110 at locations that improve signal transmission (e.g., avoiding local depressions in the terrain). Additionally or alternatively, as described above, the concentrator 110 or mote 120 communication may include addressing communication to each respective mote 120.

The array 100 of FIG. 10 may be thought of as being constructed from a number of building blocks, where each block includes a concentrator 110 associated with, for example, at least two motes 120. Such a block 700 is illustrated in FIG. 7. The illustrated block 700 includes a concentrator 702 associated with motes 704 and 706. The block 700 may be implemented using omnidirectional antennas, directional antennas, or a combination thereof. For example, the concentrator 702 may utilize directional antennas whereas the motes 704 and 706 utilize omnidirectional antennas. In the illustrated embodiment, the concentrator 702 and the motes 704 and 706 utilize directional antennas which reduces power requirements and improves bandwidth management across the array.

Specifically, mote 704 includes a directional antenna 708 preferably aligned to transmit and receive between the mote 704 and the concentrator 702. Similarly, mote 706 includes a directional antenna 710 aligned to transmit and receive signals between the mote 706 and the concentrator 702. Concentrator 702 includes directional antenna for communicating with the motes 704 and 706 as well as with upstream and downstream concentrators (not shown in FIG. 7). In this manner, mote 704 will preferentially receive signals transmitted to mote 704 from concentrator 702 and will be relatively unaffected by signals from other directions (from other concentrators or motes associated therewith). Similarly, mote 706 will preferentially receive signals from concentrator 702 and will be relatively unaffected by signals from other concentrators or motes associated therewith. Motes 704 and 706 can be controlled to transmit on different frequencies or otherwise have different transmission parameters (e.g., code division multiplexing, time divisional multiplexing, or other multiplexing protocols) so that the motes 704 and 706 do not interfere with one another.

It will thus be appreciated that the directional antenna 712 of the concentrator 702 includes directional elements for communicating with mote 704, mote 706, an upstream concentrator, and a downstream concentrator. Thus, the directional antenna 712 may include at least four directional elements. In the illustrated embodiment, the directional antenna 712 includes more than four directional elements 714. Preferably, the directional elements 714 are distributed about the periphery of the directional antenna 712. In this manner, a worker can place the concentrator 702 without being limited to precise placement or angular alignment. Once the concentrator 702 is placed by the worker, a scanning process can be utilized to determine the optimal elements for communication with each of the first mote 704, second mote 706, upstream concentrator, and a downstream concentrator. For example, each element may be utilized to transmit and/or receive signals in the scan process, and then optimal element may be selected based on signal strength. In some cases, the selected elements will not be spaced 90° apart.

Figure 8:
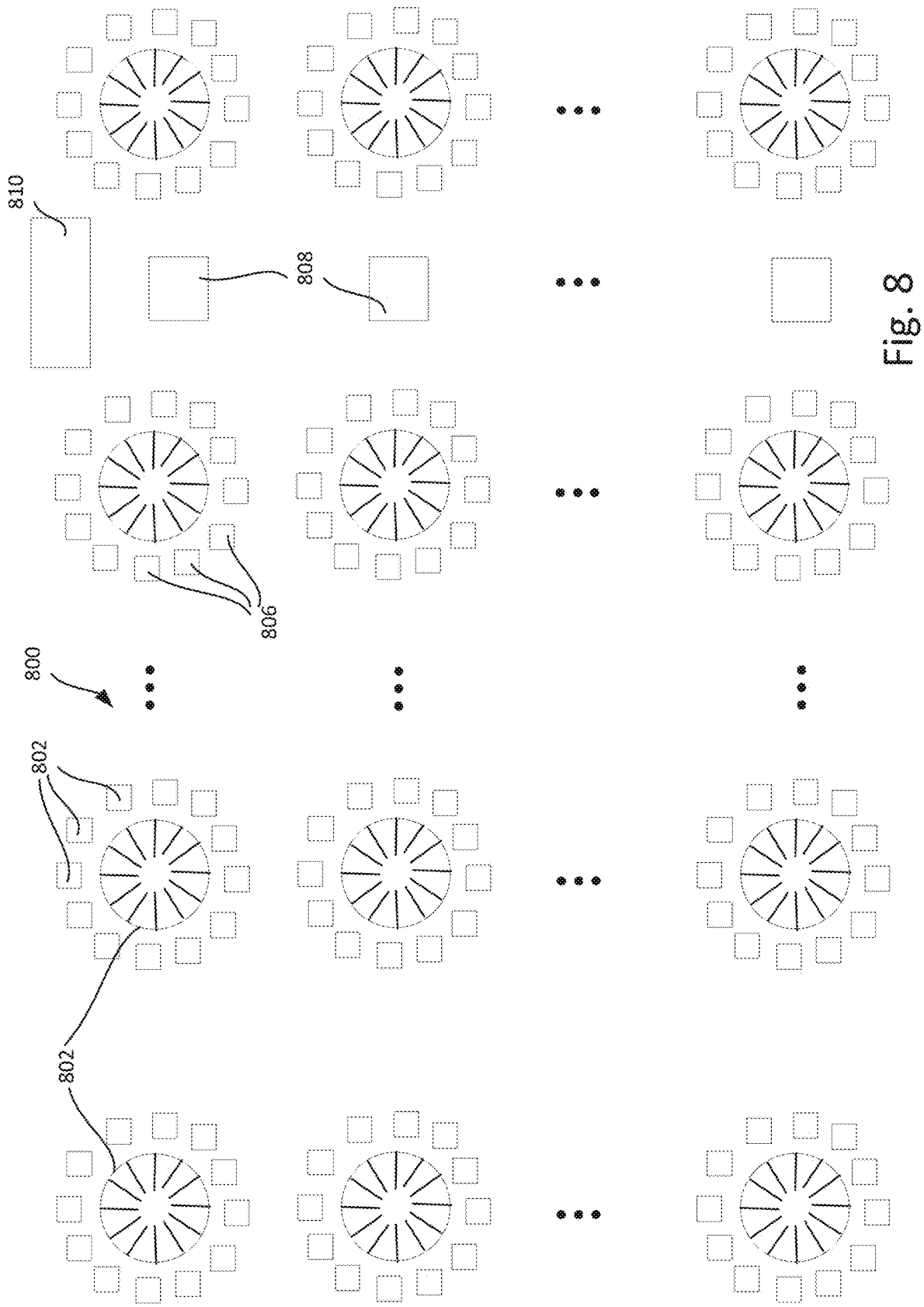
FIG. 8 depicts a schematic view of an embodiment of a configuration of an array that utilizes hierarchical wireless communication protocols for wireless readout of seismic data.
Figure 9:
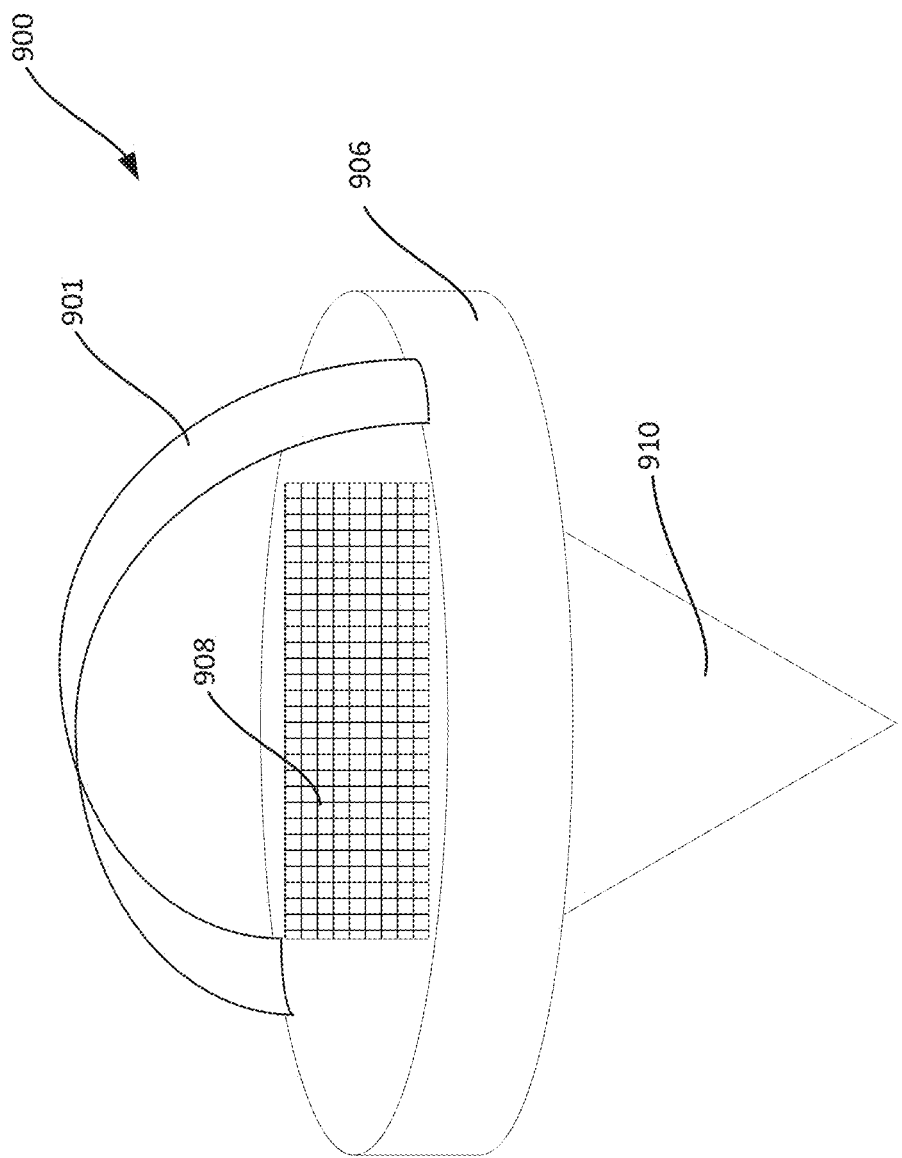
FIG. 9 depicts a perspective view of an embodiment of a mote.

FIG. 8 illustrates an alternative configuration of an array 800 in accordance with the present invention. The array 800 generally includes concentrators 802, motes 806, LIUs 808, and CRU 810 all of which may be similar to the corresponding units as described in connection with FIG. 5. Moreover, the communications from the concentrators 802 to the LIUs 808 and, in turn, to the CRU 810, may generally be conducted as described above. However, in the illustrated embodiment, more than two motes 806 are associated with each concentrator 802. As described above, practical short-range communication protocols for communications between the motes 806 and the concentrator 802 may provide multiple communication channels. Moreover, practical implementations of directional antennas for the concentrator 802 may provide multiple directional elements. Accordingly, the array configuration can readily be expanded to allow multiple motes 806 for each concentrator 802. In the illustrated embodiment, twelve motes 806 are associated with each concentrator 802. This allows for an array that is densely populated with geophones, thereby enhancing image quality, while still avoiding interference due to reuse of channels by motes 806. In the latter regard, the provisioning of channels to individual motes 806 may be angularly rotated as between adjacent concentrators 802 (or otherwise selected) so as insure that co-channel rejection can readily discriminate between mote signals on the same channel. Similarly, the channels utilized by the individual elements of a single antenna may be selected to avoid interference (in some cases, channels may be reused by co-located elements having different directionality, e.g., to associate more motes with a given concentrator).

FIG. 9 and FIGS. 12A, 12B and 12C show various physical implementation of a mote 900. In the illustrated embodiment of FIG. 9, each mote 900 may be a Zigbee or low-power wireless device with integrated digitizer and battery 906, and solar panel 908. The mote 900 further includes an antenna 901 that may be incorporated into a handle that helps carry the unit and pull it from the ground. A group of motes 900 would connect to a concentrator for the purpose of streaming digitized sensor data. Up to 16 devices can be connected to a concentrator at 2 msec intervals. The mote 900 would digitize sample data and send it to the concentrator. The concentrator would provide command and timing information to the mote 900. In order to reduce costs, the mote 900 may not have a GPS receiver and would therefore need to be located at deployment by a survey device that would tell each unit wirelessly its location. The deployment tool would get a go, no-go status form each mote 900. With the number of devices that are being deployed so high, it may be desirable to survey with a very accurate device as units are deployed. Deployed units would be in an ultra-low power state unit the network of concentrators was deployed.

Figure 12A:
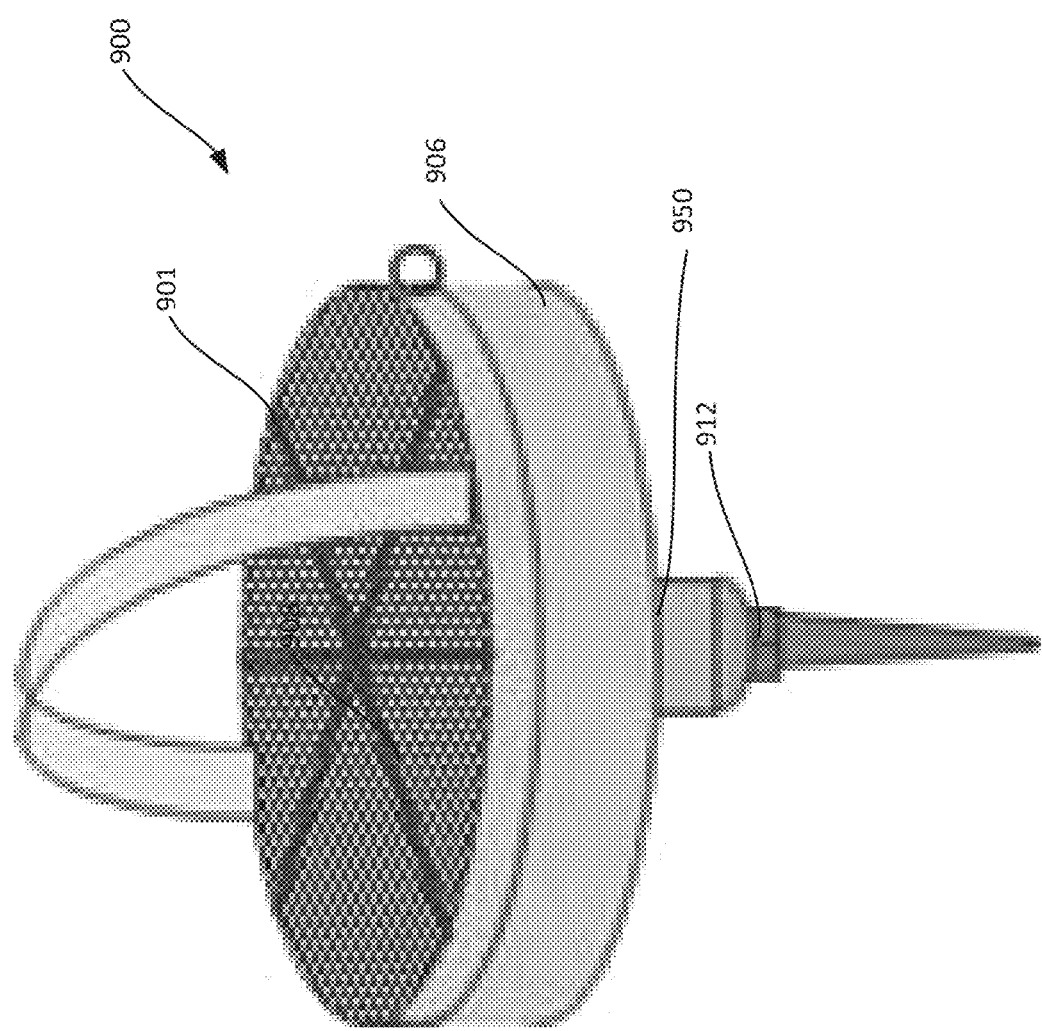

With further reference to FIG. 12A, another embodiment of a mote 900 is depicted. The mote 900 may include a sensor spike 912 as described above. However, the sensor spike 912 may differ from the sensor spike 910 in that the sensor spike 912 may be selectively removable from the mote 900. In this regard, the motes 900 may include a port or other connector 950 for engagement of the removable sensor spike 912. Accordingly, the sensor spike 912 may include a geophone and/or related electronics associated there with to provide a signal to the mote 900. With further reference to FIG. 12B, it may be appreciated that the mote 900 may further be configured with a port 954 for connection of a geophone string 914 directly to the mote 900. In this regard, the geophone string 914 may connect directly to a housing 906 of the mote body. Furthermore, with reference to FIG. 12C, the mote 900 may provide a sensor string attachment module 916 that may, for example, engage a port or connector 950 on the underside of the mote 900 that could alternatively engage a sensor spike 912 as described in FIG. 12A. In this regard, the sensor string attachment module 916 may include a first connector for engagement of the port 950 on the underside of the mote 900 and a separate geophone string connection 952 for connection of a geophone string 914. That is, a given mote 900 may have a geophone string 914 connected directly therewith as is shown in FIG. 12B. Alternatively, a mote 900 as shown in FIG. 12A in FIG. 12C may be provided with a connector 950 on the underside of the mote 900. This connector 950 may be engaged with a sensor spike 912 such that the mote 900 may constitute a single point receiver used in an array. Alternatively, the port or connector 950 on the underside of the mote 900 may be engaged with the sensor string attachment module 916. In turn, sensor string 914 may be connected to the sensor string attachment module 916 such that the mote 900 is in communication with a geophone sensor string 914.

Figure 11:
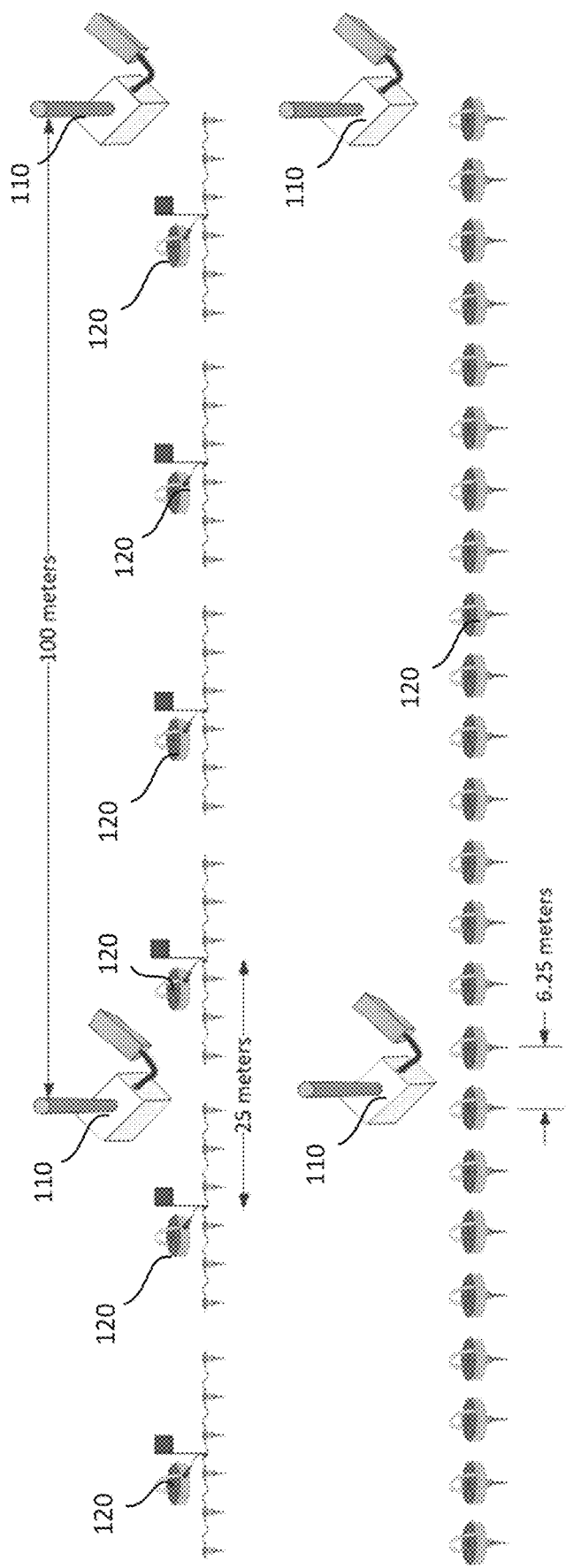
FIG. 11 depicts various embodiments of a portion of an array utilizing hierarchical wireless readout of seismic data.

With further reference to FIG. 11, various lines of motes 120 and concentrators 110 are depicted. Specifically, in the top line in FIG. 11, motes 120 engaged with geophone sensor strings 914 and, in the bottom line in FIG. 11, motes 120 that are provided with integrated geophones such that the motes 120 comprise single-point receivers. In the top line, a plurality of motes 120 may each be in operative communication with a concentrator 110. In one example, the concentrator-to-concentrator spacing of the line may be at or about 100 meters. However, other concentrator-to-concentrator spacings may be provided such as, for example, 25 meter spacings, 50 meter spacings, 75 meter spacings, 125 meter spacings, 150 meter spacings, 175 meter spacings, or even 200 meter spacings. In turn, the motes 120 in operative communication with the geophone strings may be provided on 25 meter spacings. However, motes to mote spacings of greater than or less than 25 m may also be provided. Furthermore, as shown in the top line FIG. 11, each of the motes 120 may be disposed at a survey flag that is predetermined by a survey crew prior to deployment of the motes 120 at a survey flag pre-position by a survey crew. That is, when using geophone strings connected to the motes 120, the motes may be placed at predetermined locations given the plurality of locations associated with each respective element of the geophone string. However, in the context of a single point receiver shown the bottom line of FIG. 11, the motes 120 may be provided on relatively small spacings (e.g., meter m spacings as shown in FIG. 11). Furthermore, given the motes 120 may be single-point receivers, the mote locations may be determined after deployment of the motes without the need to predefine locations for each of the motes 120.

As may be appreciated connection with the description of FIG. 11, and architectures described herein may also provide improved latency over traditional approaches. For example, for practical reasons in connection with the execution of a seismic survey, a line of acquisition units are generally limited to deployment over distance of about 20 km. In this regard, provision of acquisition units along such a 20 km distance may result in a relatively large latency value when communicating data in a serial fashion along the line stretching over this distance. For example, in traditional systems that spread over such a 20 km distance, the latency for receipt of information from the most distant acquisition unit may be on the order of 30 or more seconds. In this regard, both provisioning of commands to the array as well as receipt of data from the array may include unacceptable delay or latency associated with the transmission along the line.

In contrast, the architecture described herein may significantly reduce the latency value over the same distance. Notably, the architecture described herein may allow for the same number of channels to be distributed over a given distance with less latency. For instance, as depicted in FIG. 11, a plurality of concentrators 110 may be provided in a line. Each of these concentrators 110 may be in further communication with a plurality of motes 120. For example, each of these concentrators 110 may be in further communication with 10 or more motes 120. Alternatively, each concentrator may be in communication with 12 or more motes, 14 or more motes, 15 or more motes, 18 or more motes, or even 20 or more motes. In this regard, in an embodiment a line may stretch over a distance of about 20 km. Within that line, 200 concentrators 110 may be provided, each in communication with 20 motes. Accordingly, 4000 motes may be provided along the line. However, as the communications between the concentrators 110 in the LIU 130 and/or CRU 140 may only require serial transmission among hundred concentrators (e.g., assuming the LIU 130 is disposed at the midpoint of the 20 km line), the latency may be on the order of a few seconds (e.g., less than about 10 seconds, less than about eight seconds, less than about five seconds, or less than about three seconds). As may be appreciated, the 4000 motes stretched along the 20 km line may provide the same channel count as other systems that result in latency of 30 seconds or more as described above. In turn, the architecture presented herein may significantly reduce latency for a given number of channels as compared to a traditional approach (e.g., including an improvement by reduction of the latency value by half, a three-time reduction, or even a 10 time reduction in latency as compared to traditional systems). Furthermore, given the spacings described above where 4000 motes are provided over the 20 km line, the resulting mote-to-mote spacing may be on the order of about 5 m. In this regard, the single point receiver threshold 6.25 m may be satisfied such that the mote-to-mote spacing may not only facilitate the reduction in latency, but also facilitate use of single-point receivers along the 20 km line.

The concentrator unit 110 may be a high performance wireless device that may use either to 2.4 GHz or 5.8 GHz bands for relaying the data down the line to the LIU. Each concentrator 110 may have a battery(s) that may be capable of lasting for 30 days at 24 hour operations. The concentrator 110 may be synchronized over the radios or may have GPS for timing and position. Each concentrator 110 may be beam steering capable to reduce self-interference and maximize channel bandwidth. The concentrator 110 may compress and packetize data from the one or more motes 120 with which the concentrator 110 is in communication. Telemetry for each line of concentrator 110 could support 2000 motes 120 on each side of a given LIU for a line. The concentrator 110 may be capable of hybrid operation where it would collect data from motes 120 and store data to flash while sending status and noise monitoring data to the LIU 130 and central recording unit 140. The concentrator 110 may also be capable of interconnecting units with cables in severe NLOS conditions when using 5.8 GHz.

The LIU 130 may be the collection point for the concentrator telemetry units 110. The LIU 130 may collect data from potentially 2×2000 motes 120 through the concentrator telemetry 110. The LIU 130 may have 4 PoE gig Ethernet ports for connecting 10 gigabit fiber and 100 mbps radio. Ten gig fiber may have the potential to carry 1,000,000 channels at 2 msec of end of the recorder. The LIU 130 may be powered by smart lithium batteries, perhaps the same battery 906 as the mote 904. The LIU 130 may be capable of disciplining its clock to GPS pps for the purpose of radio disciplining the concentrator 110 lines. The LIU 130 may use the same beam steering antenna as the concentrators 110.

In one or more embodiments, various antenna configurations may be provided for a concentrator 900. As depicted in FIG. 13, an embodiment of a concentrator 900 may be provided that includes an antenna 1000 that may be a phased array antenna. The phased array antenna 1000 is an example of a smart antenna that may facilitate a directional radiation pattern that may be employed to provide benefits over permanent directional antennas and omni-directional antennas. For example, the phased array antenna 1000 may be operable to modify the radiation pattern of a module in real time by activating different ones of a plurality of antenna elements. As such, issues associated with permanent directional antennas may be avoided because a phased array directional antenna 1000 may continuously monitor and/or modify the radiation pattern to adjust for movement or changes in the relative location of a target, which a permanent directional antenna cannot. In this regard, the targeting of the radiation pattern may be accomplished using control of the phase array rather than requiring a user to manually manipulate a physical portion of the antenna relative to an adjacent module.

Furthermore, the radiation pattern of a smart antenna (e.g., phased array antenna) may be significantly narrower in coverage than an omni-directional antenna. In this regard, radio frequency energy may be directed specifically towards a target module. In this regard, the amount of energy required by a module utilizing a smart antenna may be reduced by transmitting to and receiving from a limited to a direction. That is, for a given distance in the direction in which the radiation pattern is directed, to communicate with a target at a given distance may require less energy than propagating a signal with an omni-directional antenna that would also include the target. Thus, for a given amount of energy, the distance a radiation pattern may extend in the limited direction may be increased over an omni-directional antenna.

Furthermore, a pair of communicating units may utilize corresponding radiation patterns to selectively transmit and selectively receive radio frequency energy in a direction extending between the pair of communicating units. That is, the phased array antenna may allow for targeted reception of radio frequency energy from an adjacent module as well as targeted transmission of radio frequency energy from an adjacent module. Furthermore, in the exemplary context of a serial data communication path, the targeted radiation pattern associated with transmission and/or reception of data from a unit may be modified during the communication of data along the serial data path. For example, a serial data communication path may be defined by a series of wireless units that may employ a full duplex communication technique. In this regard, each unit may in a first time period receive data from an upstream unit and in second time period transmit data to a downstream unit. In this regard, in alternating time periods, a module may receive data from an upstream unit and transmit data to a downstream unit.

Accordingly, a unit may change the direction in which an antenna is targeted each of the time periods. For example, the antenna may be targeted in a first direction in a first time period. For example, the first direction may correspond with upstream unit from which the unit is to receive data. In a second time period, the unit may modify the direction in which the antenna is targeted into a second direction. The second direction may correspond to a downstream unit to which the unit is to transmit data.

Furthermore, during deployment of acquisition units in a seismic survey array, a discovery process may be initiated at each unit. This discovery process may allow for recognition and/or detection of neighboring units that have also been deployed such that appropriate communication pairs between the units may be established. Such appropriate communication pairs may be predetermined according to, for example, a predefined survey design. In any regard, during the discovery process, the smart antenna may scan for an adjacent unit. The smart antenna may be operable to identify a spatial signal signature (e.g., angle of arrival (AOA), etc.) of a response signal of an adjacent unit. For example, antenna elements of a phased array antenna may be controlled to scan throughout a continuum of directions corresponding to a sphere surrounding the module. Once the spatial signal signature is identified, the unit may generate a beamforming vector for use in controlling the antenna to target the unit module. The beamforming vector may correspond with the relative direction of the adjacent unit such that the direction of the radiation pattern corresponds to the relative direction to the adjacent unit. In this regard, during periods where the unit communicates with the adjacent unit, the antenna may be controlled to target the radiation pattern of reception and/or transmission capability towards the adjacent unit. More than one adjacent unit may be located such that a different beamforming vector is established relative to each adjacent unit. Furthermore, a scanning process may occur periodically or continuously during the seismic survey to ensure the targeted directions of adjacent modules are correct.

As the relative positions of the adjacent units are determined during the discovery process by scanning the antenna (e.g., using a phased array antenna), the need for an operator to physically aim or level hardware (as is the case with a permanent directional antenna) may be eliminated. In this regard, units may simply be deployed in the field and undergo discovery process such that the corresponding direction of adjacent units the automatically discovered during the scanning process of a phased array antenna. In this regard, once an adjacent unit is discovered, the scanning unit may target the adjacent module when communicating data between the scanning module and the adjacent unit. The data communicated may include seismic data acquired at either of the scanning unit or the adjacent unit. In addition, other data may be transmitted between the units (e.g., along with or independently from seismic data) such as, for example, timing data, control data, administrative data, setup data, status data, or other appropriate data.

Figure 14:
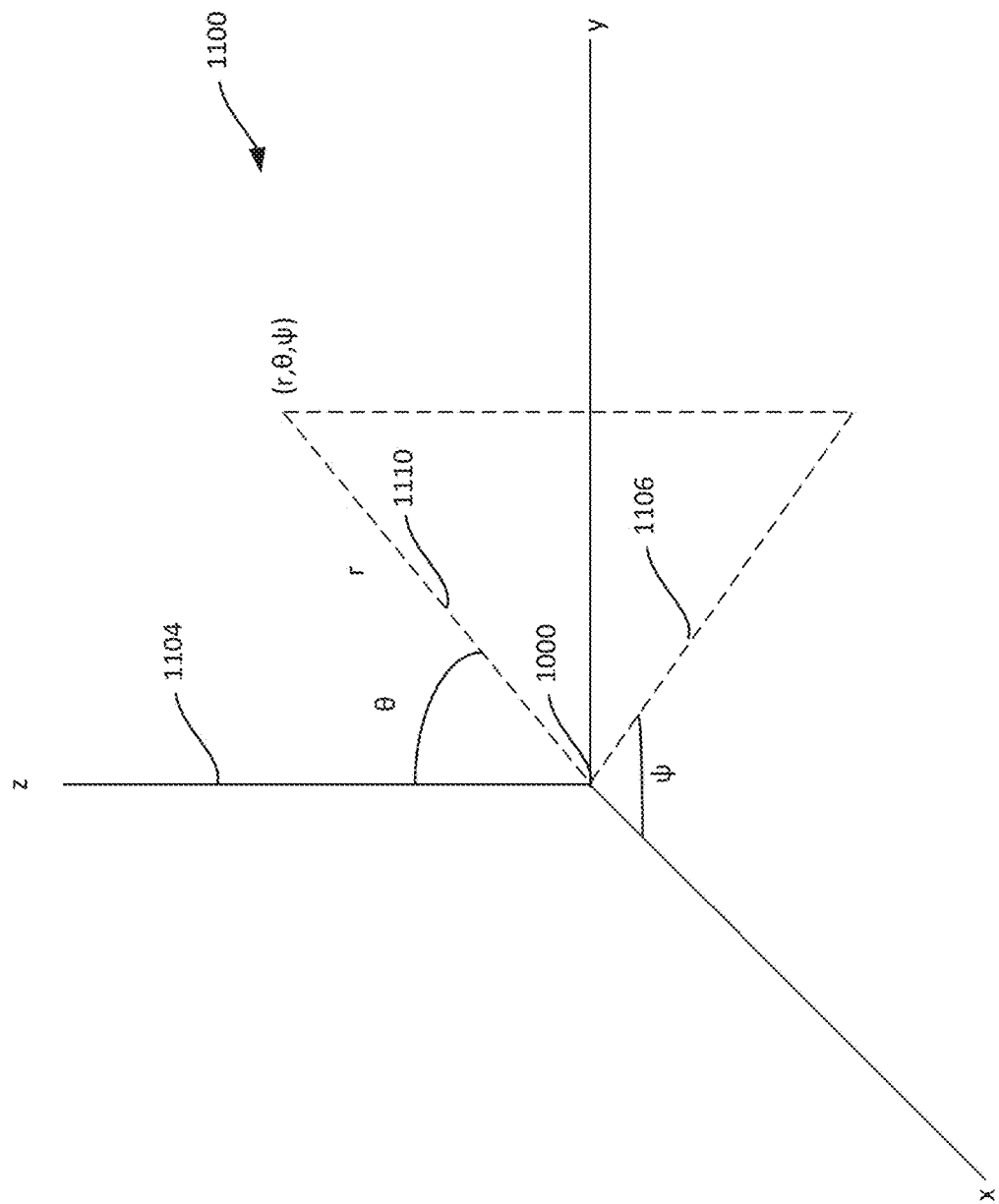
FIG. 14 depicts a spherical coordinate system through which a directionalized antenna may be controlled.

With further reference to FIG. 14, it may be appreciated that a phased array antenna may be capable of controlling the direction of a radiation pattern 1110 for the antenna throughout a continuum of positions associated with a spherical coordinate system 1100. In this regard, the phased array antenna may be modeled in a spherical coordinate system 1100 where the phased array antenna 1000 is located in origin of the spherical coordinate system 1000. As such, a polar angle θ corresponding to the direction of the radiation pattern 1110 measured from a fixed zenith direction 1104 may be controlled. Furthermore, an azimuth angle φ corresponding to an angle defined in a reference plane 1106 corresponding to an orthogonal projection that passes through the origin that is orthogonal to the zenith 1104 may be controlled. Furthermore, radial distance r may be controlled based on controlling the relative power of the transmission or reception gain of the antenna 1000. In any regard, the direction of the radiation pattern 1110 may be controlled throughout a continuum of direction defined in the spherical coordinate system surrounding the antenna.

FIG. 14 shows only a portion of the spherical coordinate system (e.g., corresponding to the positive x, positive y, and positive z directions, but it will be understood that the direction in which the radiation pattern may be controlled may extend to all directions in the spherical coordinate system (e.g., including the negative x, negative y, and negative z directions relative to the coordinate system 1100 shown in FIG. 14). As such, the radiation pattern 1110 may extend in any direction away from the antenna 1100 without limitation.

Figure 15:
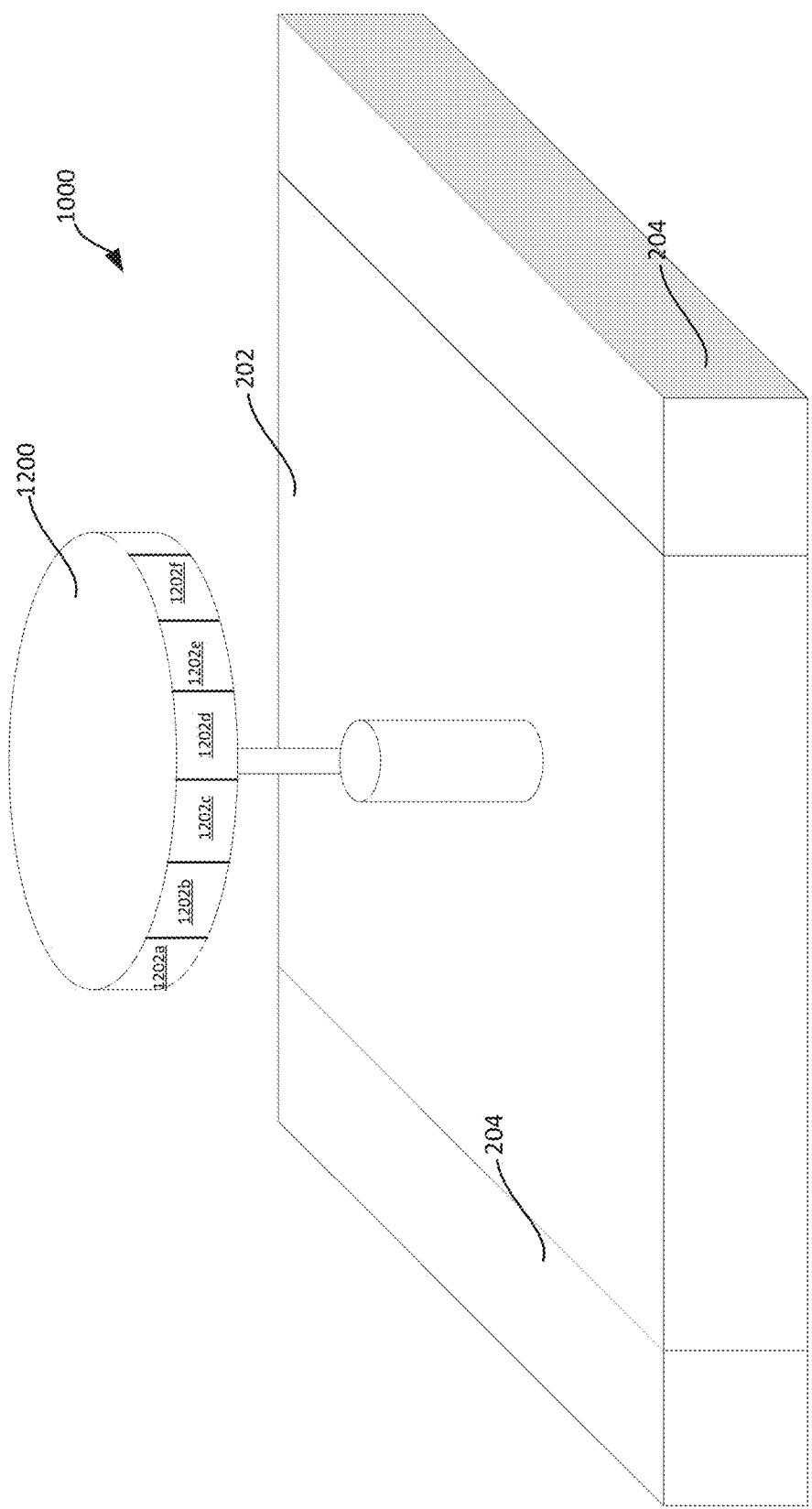
FIG. 15 depicts another embodiment of a concentrator having a directionalized antenna.
Figure 16:
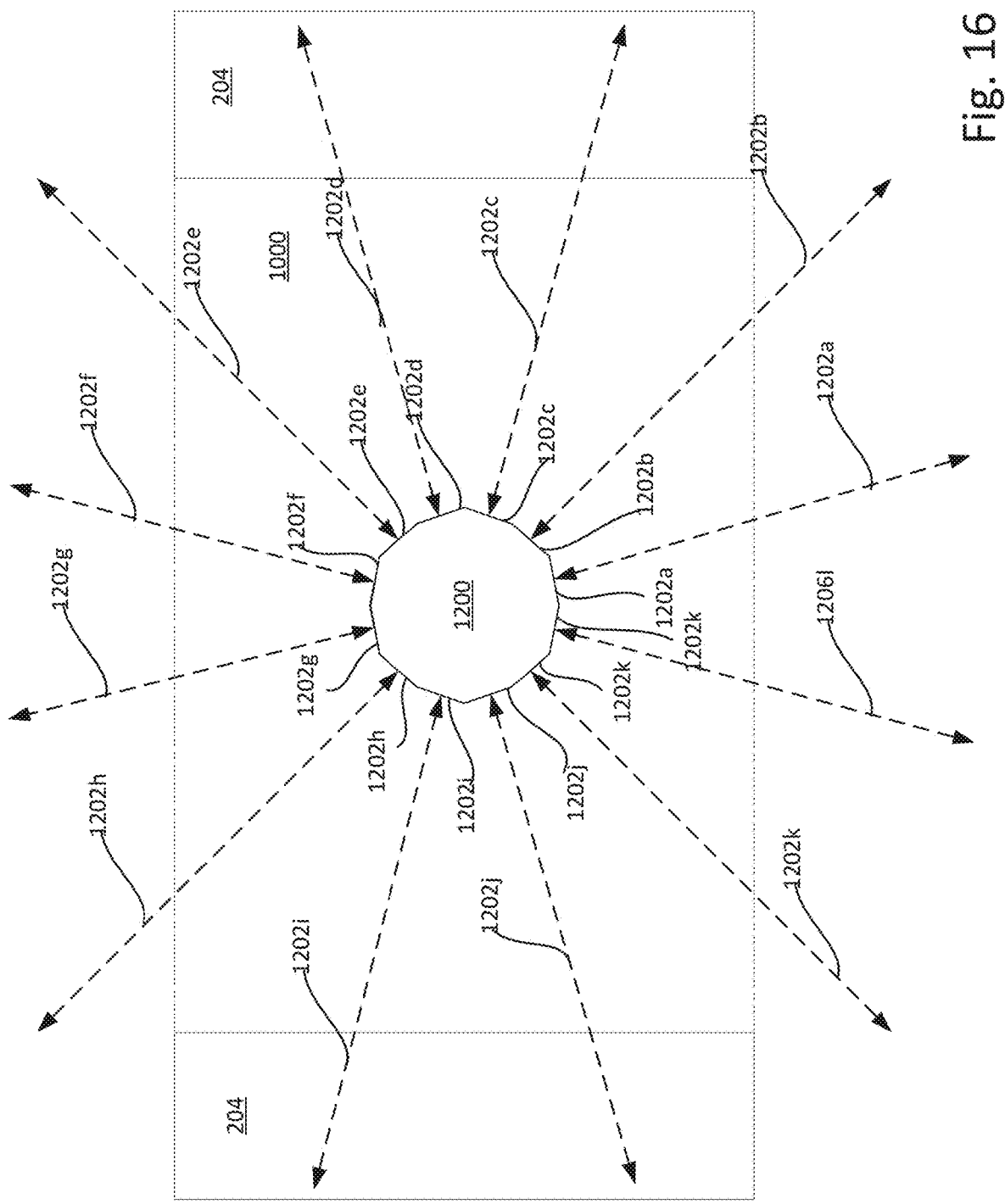
FIG. 16 depicts a top view of the concentrator FIG. 15 depicting various directions in which the directionalized antenna may communicate.

FIG. 15 depicts an embodiment of a concentrator 1000 that may include an antenna 1200 that comprises a segmented element antenna array. In this regard, the antenna 1200 may comprise a plurality of elements e.g. 1202a, 1202b, 1202c, 1202d, 1202e, 1202f, etc.). Each of the elements 1202 may be arranged about the antenna 1200 such that each of the elements 1202 is capable transmission in a given direction with respect to the concentrator 1000. This is further illustrated in FIG. 16 which depicts a top view of the acquisition unit 1000 that includes the segmented element antenna array. As may be appreciated in FIG. 16, the segmented element antenna array may comprise a 12 sided or generally dodecagon shaped body having an element 1202 at each face of the 12 sided antenna. In this regard, each element (1202a, 1202b, 1202c, 1202d, 1202e, 1202f, 1202g, 1202h, 1202i, 1202j, 1202k, and 1202l) may generally be capable of transmitting and/or receiving in 30° increments relative to the acquisition unit 1000. In this regard, corresponding radiation pattern directions (e.g., 1204a, 1204b, 1204c, 1204d, 1204e, 1204f, 1204g, 1204h, 1204i, 1204j, 1204k, and 1204l) are depicted to illustrate the transmissive or receptive radiation patterns for each corresponding element 1202. As depicted, a 12 sided element array is utilized such that the radiation patterns additionally offset by 30°. However, other combinations may be used such as antennas with additional elements with narrower radiation patterns spacing, or fewer elements with wider radiation patterns spacing. For instance, an antenna with eight sides having eight corresponding elements may be provided.

In any regard, the segmented element antenna array may be operative to scan in a space surrounding the concentrator 1000. In this regard, the segmented element antenna array may be directionalized by selectively transmitting and/or receiving from certain one or more of the elements 1202. In this regard, the segmented element antenna array may be operative to selectively scan in a directionalized fashion surrounding the concentrator 1000 and/or control directionalized transmission in or reception to or from the concentrator 1000.

The use of a directionalized antenna such as a phased array antenna or a segmented element array antenna as described above may be useful in a number of contexts for which the unit 130 may be utilized. For instance, various approaches utilization of a directionalized antenna in a seismic data acquisition survey is generally described in U.S. patent application Ser. No. 14/042,251, which is co-owned by the present Applicant and incorporated by reference in its entirety.

Furthermore, it may be appreciated that use of a directionalized antenna within unit 1000 may be operative to assist in array formation during deployment of units 1000 into a seismic survey array. Traditionally, when deploying units into an array a number of approaches have been taken with respect to the formation of the array. For example, and cabled systems, workers would be required to carefully locate acquisition units in predefined known survey locations and in turn connect each unit by way of cables to define a cable telemetry between units for acquisition of data. More recently the use of cableless acquisition units generally included the use of a GPS receiver unit such that when the unit was deployed to the array, and onboard GPS receiver unit would be operative to locate the acquisition unit. In turn, units may utilize beaconing signals to establish communication with acquisition units within transmission range of the beginning signal. In turn, location data may be exchange between units. The units may be provided with predefined transmission pairs based on known locations of the unit's module (e.g., based on the master survey plan). In turn, use of known locations transmitted in response to a beginning signal provided confirmation that correct transmission pairs had established operative communication.

As described in the foregoing, the utilization of a GPS receiver unit to resolve module locations within an array 100 may be disadvantageous due to the reduction in the serviceable deployment time of a concentrator 110 or mote 120 because of the power intensive nature of such GPS receiver units. For example, it may be desirable in the case of a GPS module being located in a given unit (e.g., a concentrator 110 or mote 120) to periodically duty cycle to GPS module to resolve location information and/or provide a time reference for disciplining a local clock. By duty cycling the GPS module, the power requirements for such operation may be reduced, will maintain the benefit of determining location information and obtaining a tiny reference. Specifically, the duty cycling of the GPS module may include putting the GPS module into a low-power state such that the GPS module still powered, but draws less power than would otherwise be required in active operation.

Furthermore, it may be desirable to provide motes 120 without GPS modules. Not only with this in turn provide for units that utilize power more efficiently, but also the overall cost of the unit may not require a module unit may also be reduced, thereby potentially allowing for additional acquisition units to be employed.

However, absent location-based confirmation of unit identity, deployment may be made more difficult. However, with further reference to FIG. 17, an embodiment of a concentrator 1000 utilizing a directionalized transmission pattern to define a limited scan field 1402 for use in array formation is depicted. As may be appreciated, the limited scan field 1402 may comprise a portion of plane in which the unit is disposed. That is, the scan field 1402 may correspond to a limited angular extent relative to the scanning unit 1000. As may be appreciated, even with the utilization of a directionalized antenna to create a scan field 1402, a plurality of other units 1410 and 1412 may be present within the limited scan field 1402. In this regard, it may be required to determine which of the units 1410 or 1412 is the appropriate unit with which the unit 1000 should pair for operative communication in the array (e.g., for either control data commutation and/or seismic data communication). As described above, prior approaches may include utilization of location data in reference to a predefined survey design to determine which of the units 1410 or 1412 should be utilized for communication with module 1000. However, in the embodiment depicted in FIG. 17, the unit 1000 may be operative to determine which of the units 1410 or 1412 with which to communicate based on signal characteristics received in response from a beaconing signal propagated throughout the limited scan field 1402. That is, the unit 1000 may transmit a beaconing signal through the limited scan field 1402. The units 1410 and 1412 may both respond to the beaconing signal with a response signal. In turn, upon receipt of each response from each corresponding unit 1410 and 1412, the unit 1000 may be operative to analyze the signal characteristics of the responses from each corresponding unit determine which of the units corresponds to an appropriate communication partner.

For instance, a predefined configuration (e.g., a predefined survey design) may be established such that each unit is to communicate with the next adjacent unit in a particular direction. In this regard, the unit 1000 may interpret response signals from the unit 1410 and unit 1412 to determine that unit 1410 is nearer unit 1000 than unit 1412. In this regard, the unit 1000 may configure for operative communication with unit 1410 rather than unit 1412. Determination of the next adjacent unit 1410 may be made in a number of ways including for example, scrutinizing a received signal strength indication (RSSI) of each response signal from each corresponding one of the units 1410 or 1412. Furthermore, other methods may be utilized such as use of co-channel rejection to reject a weaker response signal from the unit 1412 by virtue of its greater distance from the unit 1000 than unit 1410. In turn, the response signal from unit 1412 may be more attenuated than the signal from unit 1410. While signal strength is example of one particular signal characteristic that may be used to scrutinize and determine which unit in a scan field 1402 with which to communicate, other signal characteristics may be used without limitation such as, for example, signal codes, signal frequencies, time-based indications, time of arrival data, time delay of arrival data, angle of arrival data, or other measurable signal characteristics that may be compared from a plurality of units to determine an appropriate unit with which to communicate.

Figure 17:
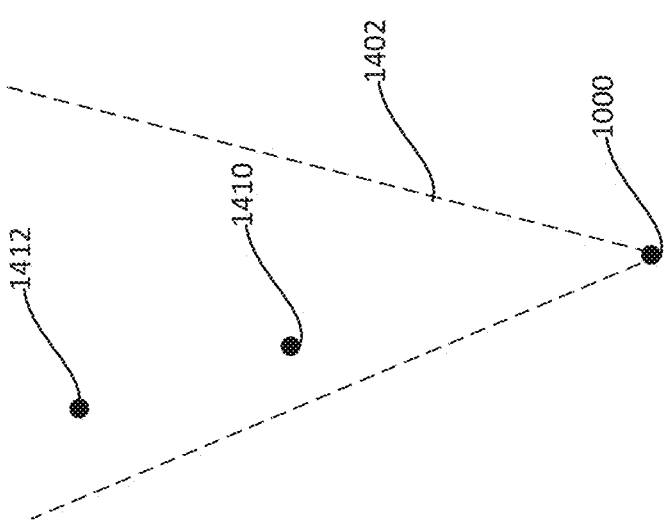
FIGS. 17 and 18 depict use of a directionalized antenna for discovery of adjacent units in an array.
Figure 18:
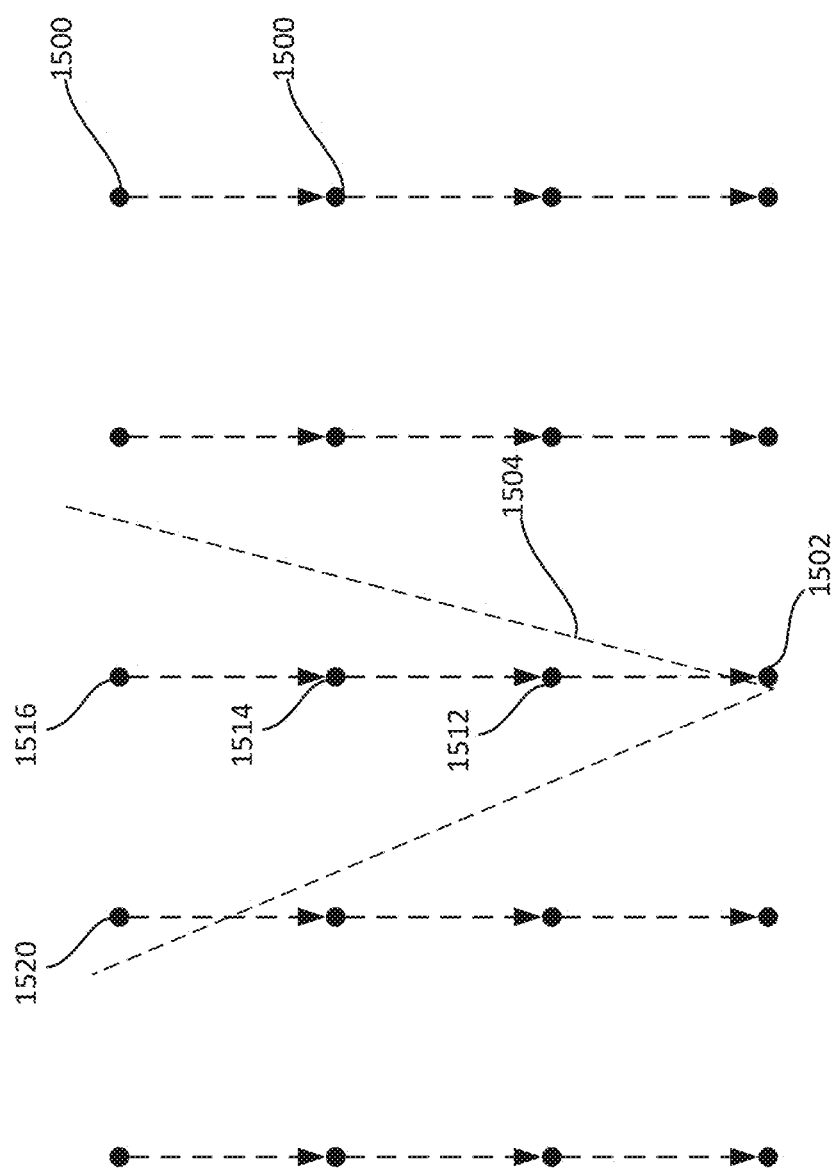

Furthermore, while in FIG. 17 the unit 1000 may scrutinize two units from which to establish operative communication, it may be appreciated that more than two units may be located within a limited scan field 1402 of a unit 1000 even with the use of a directionalized limited scan field 1402. In this regard, it may be appreciated that units 1000 may be generally deployed in a regular geometric array. In turn, with further reference to FIG. 18, an exemplary portion of an acquisition survey is depicted having units 1500 arrange a regular geometric array. Furthermore, it may be appreciated the units 1500 depicted in FIG. 15 are designed for serial communication along the vertical columns of units 1500 as depicted by the dotted lines extending between modules 1500 in FIG. 18. Such communication may be established by a survey plan in which the vertical columns of modules 1500 depicted in FIG. 18 correspond to adjacent lines such as the adjacent ribs. In this regard, it may be desired for each module 1500 to configure for communication in accord with the dotted lines shown in FIG. 18. In this regard, a module 1502 as depicted in FIG. 18 may utilize a directionalized antenna to establish a limited scan field 1504. In this regard, a plurality of modules 1512, 1514, and 1516 from a first line 1510 may be included within the limited scan field 1504 of unit 1502. Additionally, a module 1522 from a second line 1520 may be included in the limited scan field 1504. In this regard, the limited scan field 1504 may encompass units from a plurality of acquisition lines 1510 and 1520. In this regard, at least one of the units within scan field 1504 may belong to the same line in which the scanning unit 1502 belongs as well as including at least one other unit 1522 from an line 1520 different than the one the scanning unit 1502 is located. In any regard, a similar approach is described in FIG. 14 may be utilize whereby a beacon signal may be propagated through the limited scan field 1504 and received by each unit within the scan field 1504. In turn, response signals may be generated and provided to the scanning unit 1502 from each unit receiving the beaconing signal. In response, signal characteristics regarding the reply signals (e.g., in the absence of any other identifying information such as unit identifier or unit location) may be provided. In turn, the scanning unit 1502 may be operative to scrutinize the received signal characteristics from each unit in the scan field 1504 to determine which of the units providing responses the appropriate communicating pair with which to configure. In this regard, the unit 1502 may discern that unit 1512 is the appropriate unit with which to pair for upstream communication.

In turn, once the scan unit 1502 configures for operative communication with unit 1512, any number of additional tasks may be carried out such as, for example, redirecting a radiation beam pattern of the directionalized antenna to target the unit 1512. Furthermore, multiplexing arrangements may be established such that the scanning unit 1502 may communicate an appropriate multiplexing scheme to unit 1512 for establishment of operative communication therebetween as described in the attached references in the appendices hereto.

Figure 19:
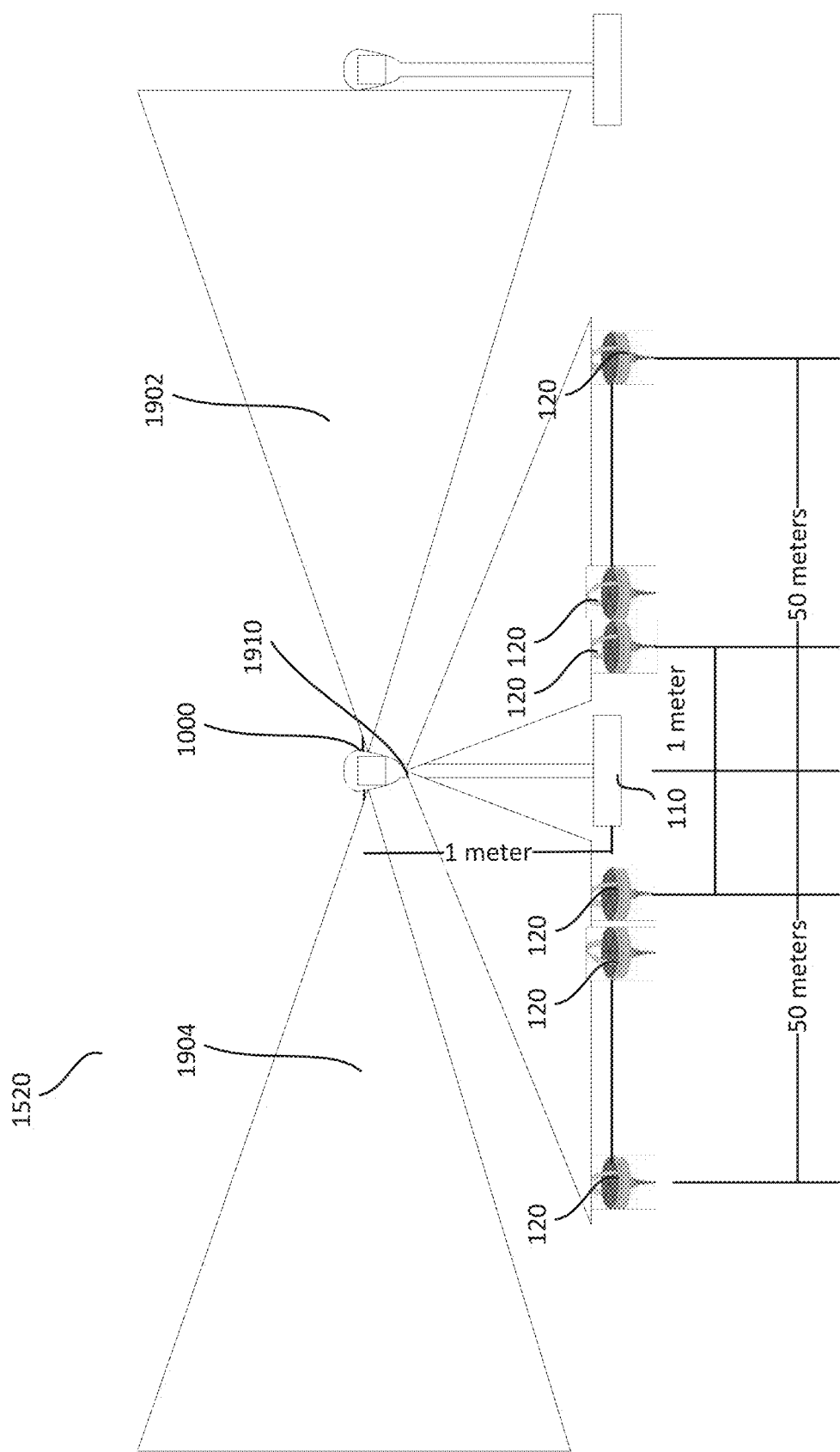
FIG. 19 depicts an embodiment of an arrangement for use of a directionalized antenna at a concentrator unit for concentrator-to-concentrator communication in conjunction with an omnidirectional antenna for communication with a plurality of motes.

With the use of a directional antenna as described above, an arrangement for a concentrator 120 may be provided whereby the concentrator utilizes a directional antenna to assist in communication with a local network of motes 120 as well as other units in the array such as other concentrators 110, LIUs 130, or a CRU 140. One such example of use of a directionalized antenna at a concentrator 110 is depicted in FIG. 19. Specifically, the concentrator 110 may include a directionalized antenna 1000, such as one of those described above. As shown, the directionalized antenna 1000 may be supported above a base of the concentrator 110. For example, the directionalized antenna 1000 may extend above the surface on which the concentrator 110 is resting by about 1 m. In turn, the directionalized antenna 1000 may have a mechanism (e.g., one of the antenna technologies described above) for directionalizing the radiation pattern for receipt or transmission of a radio communication at the concentrator 110. In this regard, the concentrator 110 may utilize the directionalized antenna 1000 to direct a transmission in a directionalized field 1902 to another concentrator 110 in an array 100. Similarly, the directionalized antenna 1000 may be utilized to receive a transmission from another concentrator 110 (not shown) in a directionalized field 1904. In this regard, the concentrator 110 may utilize the directionalized antenna 1000 to create the directionalized fields 1902 and 1904 four corresponding receipt of a transmission to other concentrator units 110.

In addition, the concentrator unit 110 may have a further antenna portion 1910 for communication with a plurality of motes 120 disposed in relation to the concentrator unit 110. As may be appreciated, the antenna portion 1910 may be omnidirectional such that the concentrator unit 110 be in operative communication with the motes 120 that may be disposed about the concentrator unit 110. In this regard, while the motes 120 in FIG. 19 are shown as linearly arranged relative to the concentrator unit 110, it may be appreciated that the motes 120 may be distributed about the concentrator unit 110 in at least two directions such that the omnidirectional antenna may be in operative communication with each of the motes 120. As may be appreciated, the omnidirectional antenna portion 1910 may be provided at a different height in an antenna mast of the concentrator unit 110. In this regard, the omnidirectional antenna portion 1910 may have limited or no overlap in communication field with the directionalized fields 1902 and 1904 used for communication with other concentrator units 110 or the like. Furthermore, it may be appreciated that the spacing between concentrator units 110 may be on the order of about 100 m. However, the furthest distance a mote 120 may be provided from the concentrator unit 110 to maintain communications may be about 50 m. In this regard, the omnidirectional antenna portion 1910 may have a range of about 50 m surrounding the concentrator unit 110. In this regard, while different radio telemetry protocols may be used for communication between motes 120 and other concentrator units 110 by the concentrator unit 110 in FIG. 19, the arrangement and beam patterns for the various antennas 1000/1910 provided with the concentrator unit 110 may further provide isolation between the communication protocols utilized by the concentrator unit 110.

As may be appreciated, the use of one or more directionalized antennas at a concentrator unit 110 may assist in radio telemetry protocol isolation at the concentrator unit 110. Additionally, the directionalized antenna may also be utilized in connection with array organization and/or initialization (e.g., as described above in relation to FIGS. 17 and 18).

Figure 20:
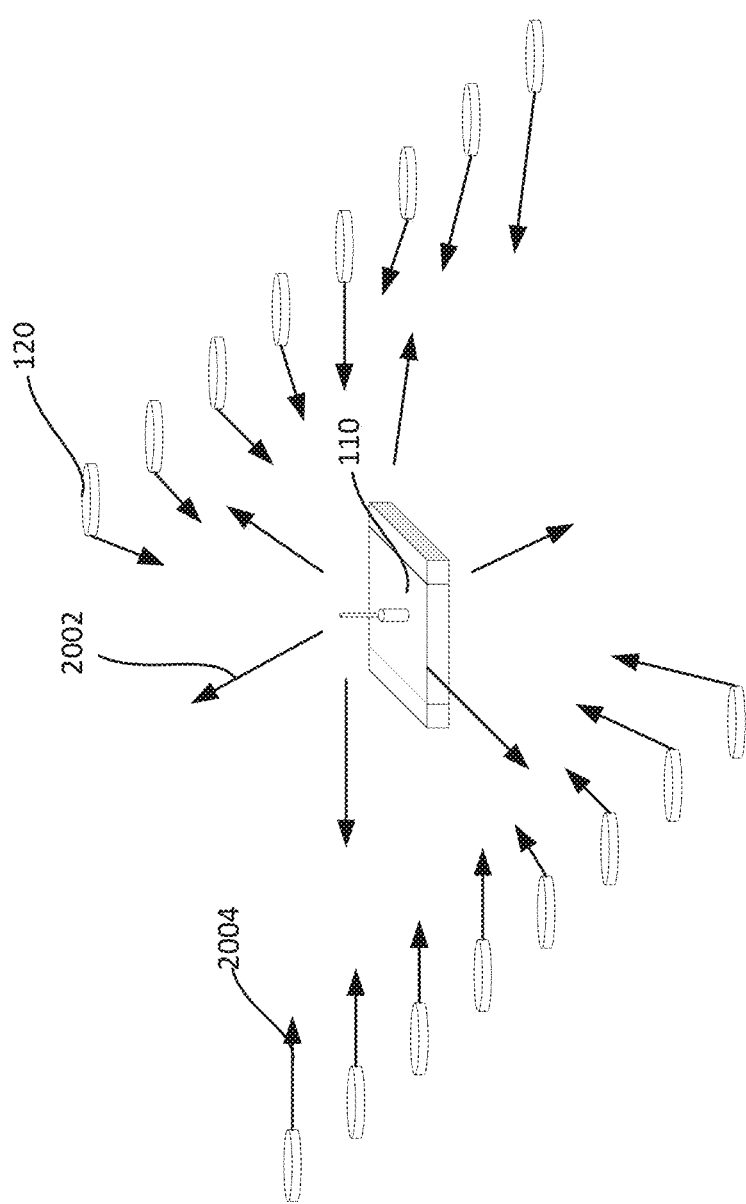
FIGS. 20 and 21 depict various scenarios for array configuration of an array including hierarchical readout of seismic data.

Additional approaches to array configuration may be provided that may utilize directionalized antenna and/or be provided in the absence of such a directionalized antenna. For instance, as shown in FIG. 20, a concentrator unit 110 may broadcast a discovery beacon signal 2002. Upon receipt by a mote 120 capable of communication with the concentrator unit 110, each mote 120 may responds with the reply signal 2004. As may be appreciated, as depicted in FIG. 20, sixteen motes 120 may receive the discovery beacon signal 2002. However, the first protocol may support less than all of the motes 120 capable of communicating with the given concentrator unit 110. In this regard, the concentrator unit 110 have to selectively establish communication with less than each of the motes 120 with which the concentrator unit 110 is capable of communication. In this regard, the concentrator unit 110 may utilize various parameters to determine which motes 120 with which to establish communication for communication during the seismic survey. Such parameters may include a received signal strength indication such that the motes 120 with the strongest signal strength are selected up to the maximum number of motes 120 supported by the given communication protocol employed.

Furthermore, in response to the discovery beacon signal 2002, the motes 120 may respond with a reply signal 2004 that may include or comprise signals related to the location of the motes 120. In this regard, the concentrator unit 110 may be operative to derive the location of the various motes 120 responding with a reply signal 2004. In this regard, the concentrator unit 110 may establish communication with the various motes 120 based on the location of the motes 120 (e.g., in relation to the location of the concentrator unit 110). Other appropriate parameters may be analyzed by the concentrator 110 to determine which motes 120 with which the concentrator unit 110 should establish operative communication.

Figure 21:
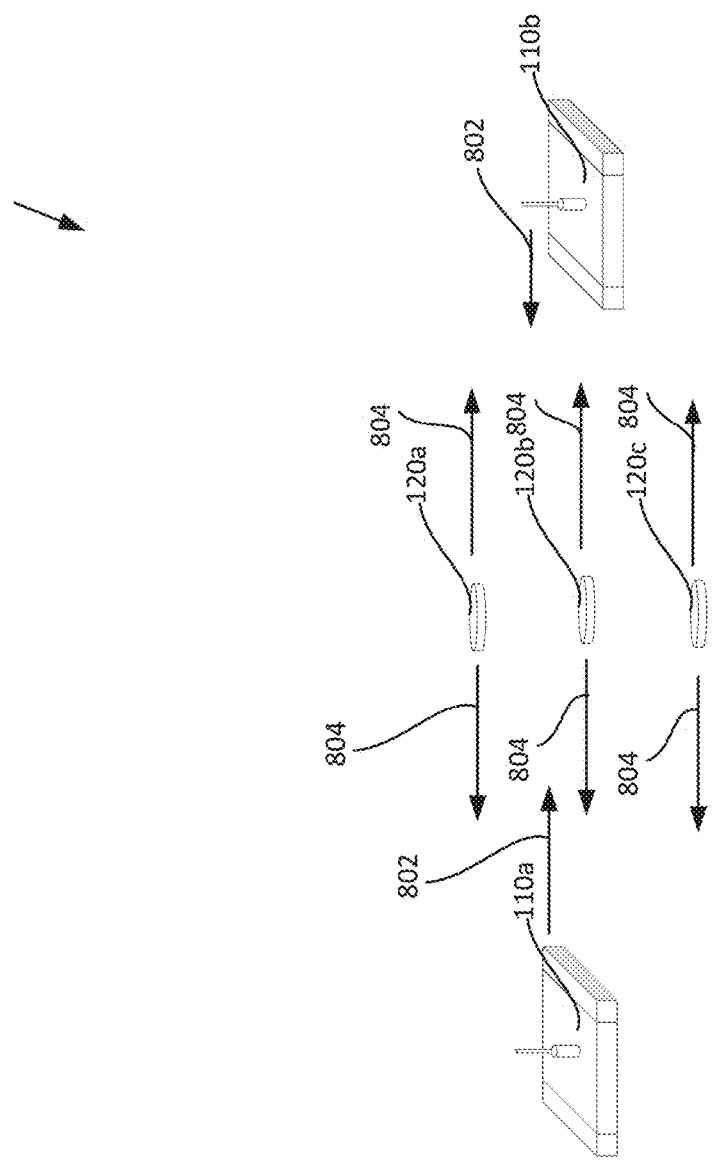

With further reference to FIG. 21, a first concentrator unit 110a and a second concentrator unit 110b may each be in operative communication with a plurality of mote units 120a, 120b, and 120c. In this regard, the first concentrator unit 110a may be operative to communicate with the second concentrator unit 120b to cooperatively determine which of the respective motes 120 each concentrator unit 110 should communicate with. For example, the concentrator units 110 may exchange communications related to one or more parameters regarding the exchange of the discovery beacon signal 2002 and corresponding reply signals 2004 from each mote 120. Again, various parameters such as receipts signal strength indications, location information regarding the motes 120, or other various parameters may be utilized such that the concentrator units 110 may cooperatively make a determination of which motes 120 should communicate with each respective concentrator unit 110.

Furthermore, the concentrator units 110 may communicate parameters or signal indicative of the parameters regarding the exchange of the discovery beacon signal 120 and reply signals 2004 to another unit in the array (e.g., an LIU 130 or the CRU 140). In this regard, the other unit in the array may evaluate the various parameters were signals indicative of the parameters to determine the appropriate assignment of motes 120 to a given concentrator unit 110. In this regard, communication assignments may be at least partially based upon optimization of array coverage such that various motes 120 establish communication with various concentrator units 110 so as to optimize the array coverage and/or telemetry parameters associated with the array. For example, while a given mote 120 may be nearer a first concentrator unit 110a that a second concentrator unit 110b, the first concentrator unit 110a may be operative to communicate with other mote units 120 up to the limits of the given communication protocol utilized that provide improved signal characteristics with the other mote units 120. In this regard, even though the given mote 120 may be further away from the second concentrator unit 110b, it may be advantageous to establish communication between the given mote 120 and the second concentrator unit 110b given the overall array configuration.

Furthermore, the initialization of the array may include dissemination and/or storage of parameters that may assist, for example, in later reconfiguration of the array in the occurrence of the need to skip heal or reconfigure the array. For instance, the concentrator units 110, when deployed, may communicate a beaconing signal utilizing a specific beaconing transmission parameter. In this regard, various ones of the concentrator units 110, once deployed and initialized, may communicate by way of such beaconing signals. The communication using the beaconing signals may facilitate the concentrator units 110 receiving and/or compiling a data table with information corresponding to a wireless communication protocol for use by the concentrator units 110. For instance, a concentrator unit 110 may communicate with adjacent concentrator units 110 to coordinate utilization of unique transmission parameters to prevent interference as described above. Furthermore, a concentrator unit 110 may be deployed with a predetermined data table and an index may be disseminated to the concentrator unit 110 for use in communication with adjacent concentrator units 110 utilizing indexes will be described in greater detail below.

Furthermore, each concentrator unit 110 may utilize a beaconing signal to discover adjacent motes 120 with which the concentrator unit 110 may communicate. In this regard, each concentrator unit 110 may generate a table indicative of the adjacent motes 120 with which the concentrator unit 110 may communicate along with, for example, other parameters regarding the communication using the beaconing transmission parameters such as, for example, a received signal strength indicator for each one of the adjacent motes 120 with which the concentrator unit 110 is capable of communication. In this regard, it may be appreciated that a given concentrator unit 110 may populate such a table with each mote 120 with which the concentrator 110 is capable of communication even if the concentrator 110 communicates with fewer than all of the adjacent motes 120 for purposes of data read out telemetry during the course of the seismic survey. However, the concentrator unit 110 may maintain such information regarding all motes 120 with which the concentrator unit 110 is capable of communication, for example, for purposes of healing the array as be described in greater detail below.

As such, it may be appreciated that each concentrator unit 110 may store information regarding both the adjacent concentrator units 110 with which each concentrator unit 110 is capable of communication as well as information regarding each mote unit 120 with which the concentrator unit 110 is capable of communication. In this regard, upon the need to reconfigure the array, the concentrator units 110 may do so given that the concentrator units 110 may include all information necessary to communicate with each unit within transmission range of a given concentrator 110, even if in any one instance of the survey, the concentrator unit 110 communicates with fewer than all units with which the concentrator unit 110 is capable communication. Furthermore, the determination of which of the units a concentrator unit 110 communicates with during the course of the survey may be at least partially based upon the data collected in relation to the concentrator units 110 and/or mote units 120 with which the concentrator unit 110 is capable of communication.

Such initialization or organization may occur at deployment prior to initiating data acquisition using the system 100. Additionally, such initialization organization may be repeated or occur throughout the survey. For example, in the event that a concentrator unit 110 becomes inactive, the motes 120 that were in communication with the previously active concentrator unit 110 may be reassigned dynamically during the survey to other concentrator units 110 by way of, for example, cooperative communication between the concentrator units 110 and/or assignment by another unit in the system 100 (e.g., a LIU 130 or CRU 140). Further still, varying communication parameters (e.g., ambient noise, moving objects, etc.) may change during the course of the survey such that reconfiguration of the array may be advantageous to dynamically reassign communication links between motes 120 and concentrator units 110, between concentrator 110, and/or between any other communicating unit pairs in the system 100.

Further still, it may be appreciated that after the deployment of motes 120 and concentrators 110 in the array 100, it may be necessary to reconfigure and/or heal the array 100 (e.g., in the event of loss of radio communication with a given unit). For example, for various reasons a given concentrator 110 may lose communication with other concentrators 110 and/or motes 120. In the event of the loss of such communication, it may be advantageous to maintain protocols whereby the seismic data acquired by the motes 120 may be preserved for later processing and or later read out of the data.

Figure 24A:
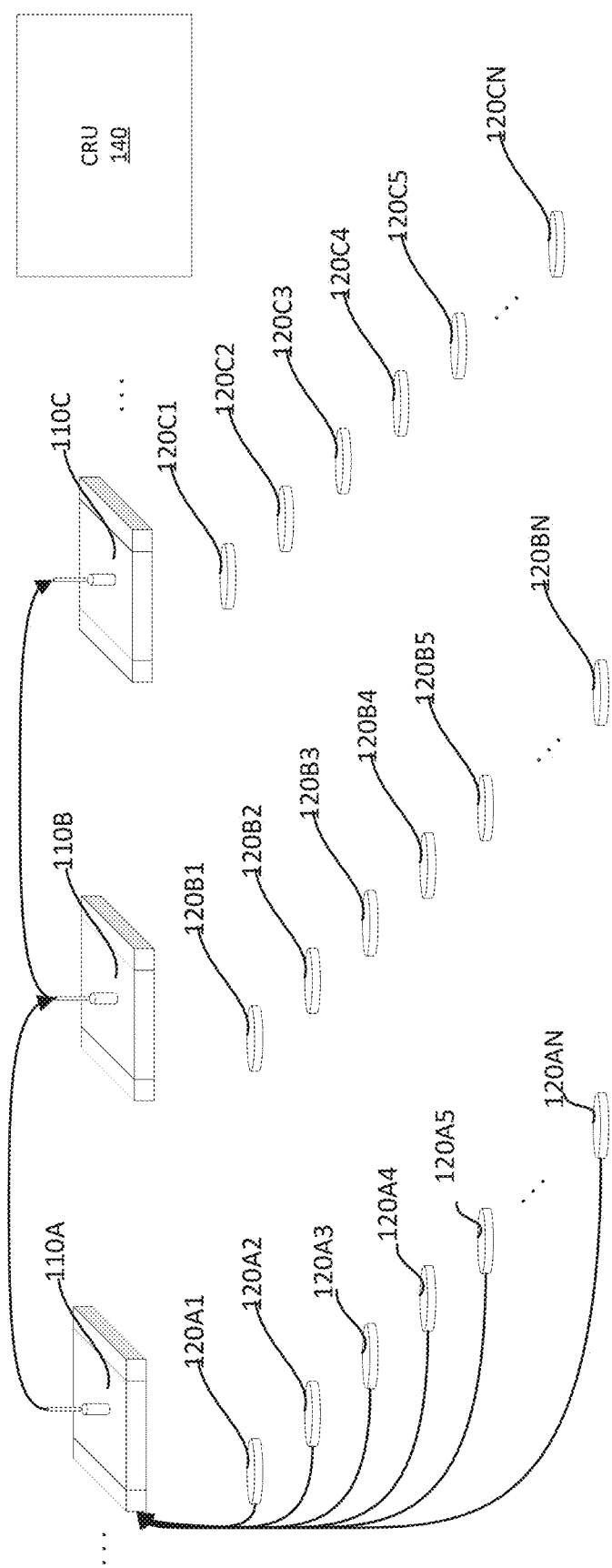
FIGS. 24A-24D depict various embodiments of a portion of an array during an operation to perform healing of the array in the event a unit becomes disabled.

Turning to FIG. 24A, a portion of a line of concentrators 110 is depicted. Concentrator 110A, concentrator 110B, and concentrator 110C may be configured for communication as shown in FIG. 24A where concentrator 110A communicates data to concentrator 110B, which in turn communicates data to concentrator 110C. This communication may be provided according, as described above, a first telemetry protocol. For instance, the first telemetry protocol may facilitate half duplex or full duplex communication between the concentrators 110A-110C as shown in FIG. 24A. Furthermore, each concentrator 110 may be in communication with motes 120 that communicate data to a concentrator 110. For instance, in FIG. 24A, radio links are shown between motes 120A1-120AN. Similar communication links are provided from motes 120B1-120BN to concentrator 110B and motes 120C1-120CN and concentrator 110C, however these links are not depicted in FIG. 24A for purposes of preserving clarity. Accordingly, data may generally be passed from each mote 120 to a respective concentrator 110. In turn, each concentrator may communicate the data downstream to a subsequent concentrator 110 for movement towards a CRU 140. In this regard, FIG. 24A is intended to depict only a portion of a line of concentrators 110 such that it may be appreciated that additional concentrators 110 may be provided generally according to those described in FIG. 24A.

Figure 24B:
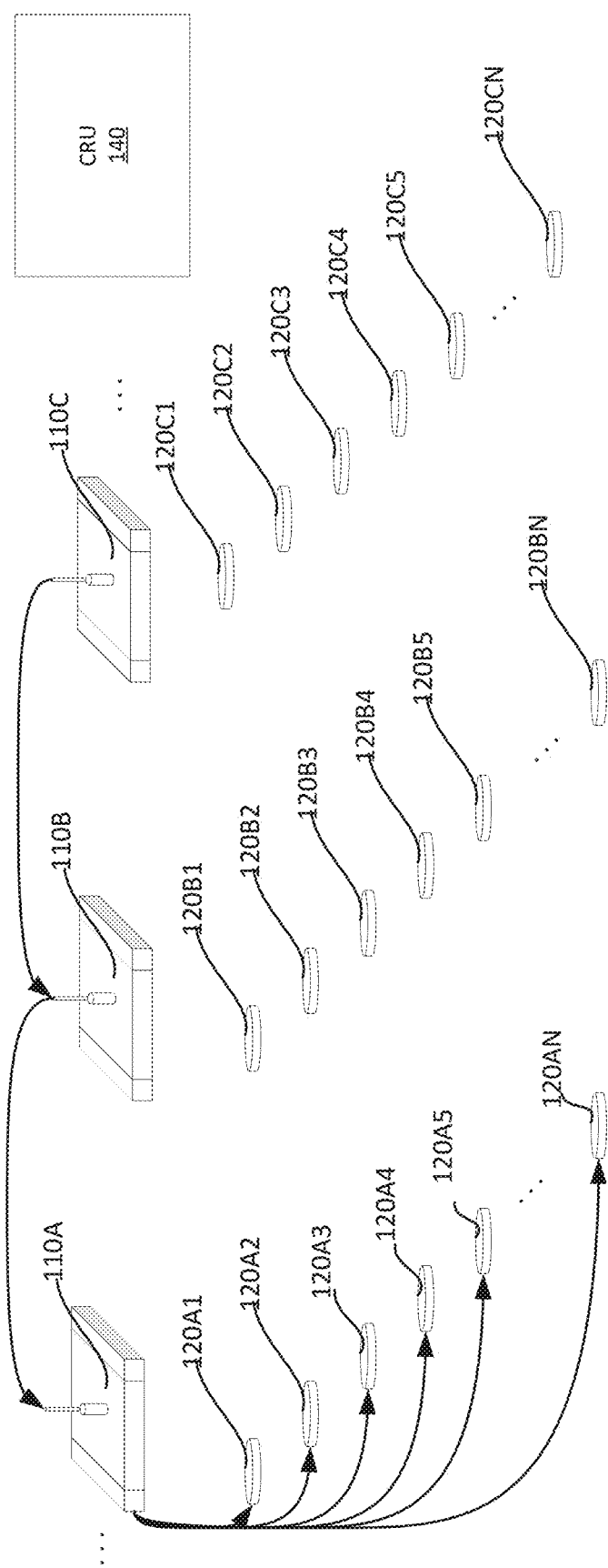

FIG. 24B further illustrates that data may be passed upstream using the protocols as described in connection with FIG. 24A. That is, data may be passed upstream from concentrator 110 to concentrator 110 and in turn on down to corresponding motes 120 in communication with the concentrator 110. This may be important for, for example, provision of synchronization of the concentrators 110 and motes 120 using radio protocols as described above. Further still, FIG. 24D depict an arrangement whereby the motes 120 may exhibit mote-to-mote communication. In this regard, the concept regarding line healing may also apply in such a scenario that includes serial data communication among the motes 120.

Figure 24C:
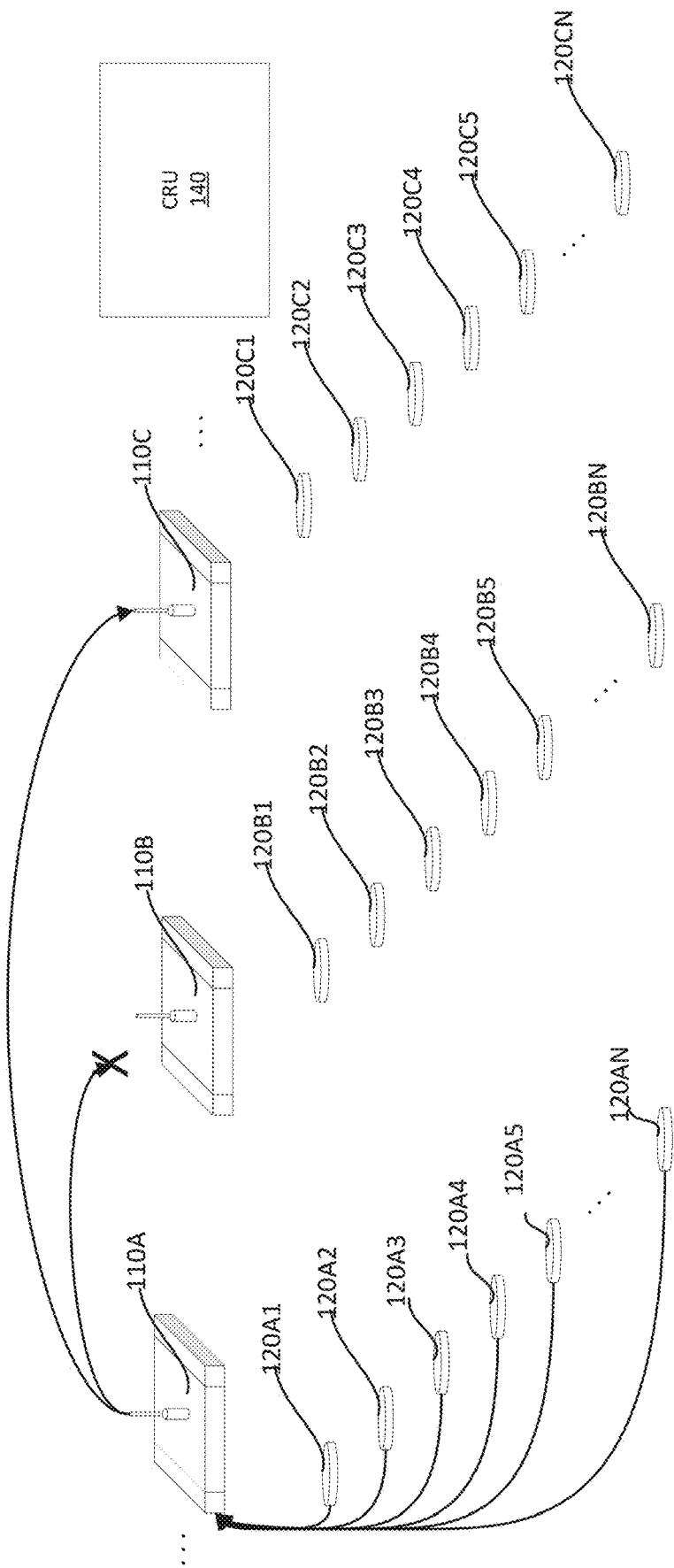
Figure 24D:
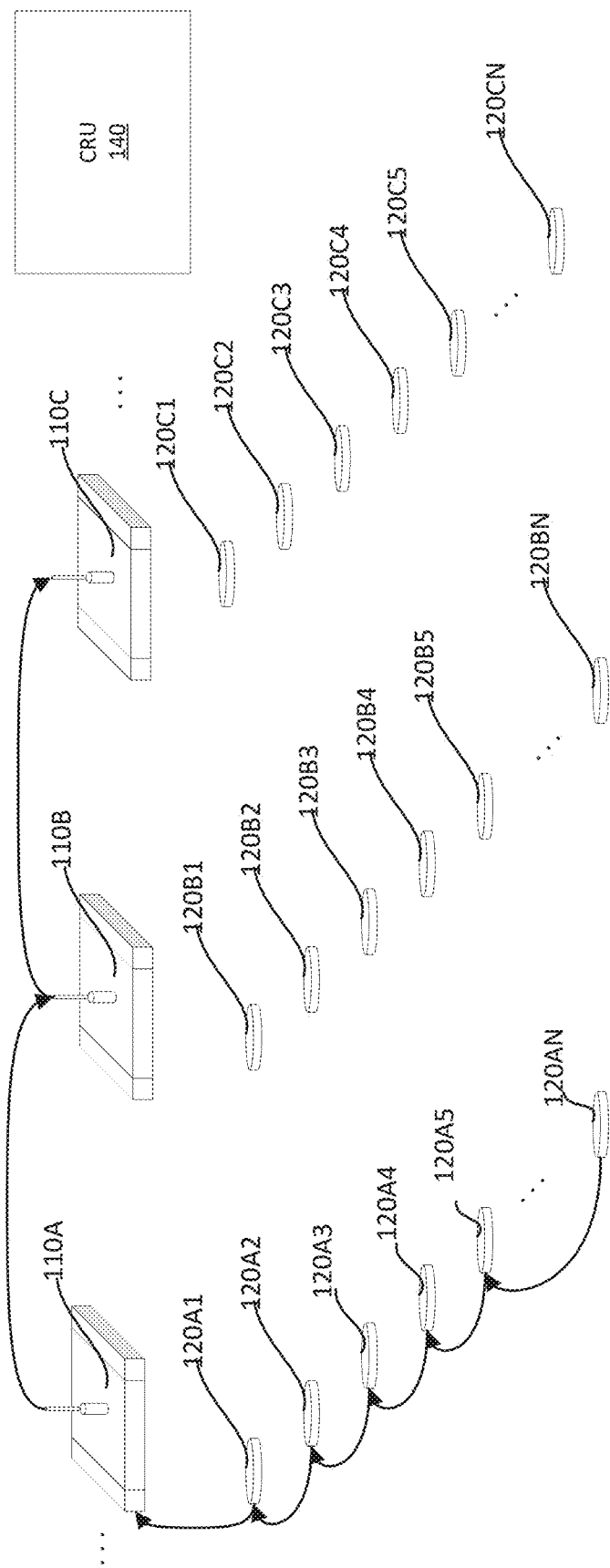

With further reference to FIG. 24C, it may be appreciated that concentrator 110B may, for various reasons, lose communication such that the concentrator 110B is not capable of receiving or sending data with concentrator 110A nor is concentrator 110B capable of communicating with concentrator 110C. As may be appreciated, loss of communication with concentrator 110B may limit upstream communication within the line beyond concentrator 110B and limit downstream communication within the line from concentrators beyond concentrator 110B. In this regard, each concentrator 110 downstream of concentrator 110B may lose communication with a CRU 140 such that commands may not be provision to those concentrators 110 and in turn those motes 120 in communication therewith. As such, absent reconfiguration of the line, real-time data read out from the units beyond concentrator 110B as well as the motes 120B1-120BN previously in communication with concentrator 110B may be lost. For purposes of discussion below, concentrator 110B may be referred to as a disabled concentrator and motes 120B1-120BN may be referred to as orphaned motes.

Embodiments of the units presented herein may provide utilities that allow for preservation of the data in the event of a disabled concentrator such as that depicted in FIG. 24C. Utilities may include hybrid radio telemetry is that allow for at least temporary storage of data in the array and/or utilities for healing a line to bypass the disabled concentrator 110B. Accordingly, one approach to preserving such data in the event of a loss of radio communication of one or more concentrator units 110 is to provide a hybrid radio telemetry approach. In this regard, for instance, if a concentrator unit 110B loses communication with other concentrator units 110A and 100C such that the concentrator unit 110B is no longer able to relay seismic data in real-time or near real-time data read out, the concentrator unit 110B and/or the motes 120B1-120BN in operative communication with the concentrator 110B may go into a mode whereby the motes 120B1-120BN and/or concentrator 110B locally stores the seismic data acquired by the motes 120B1-120BN. In this regard, as described above, the motes 120 may have internal memory for such purposes. In this regard, the concentrator unit 110B, upon loss of communication with other concentrator units 110A/110C or upon the motes 120B1-120BN detecting the concentrator unit 110B is no longer in communication with a mote, may go into a nodal mode whereby the motes 120B1-120BN begin to store acquired seismic data into a local memory of the respective mote 120.

In the event that communication is reestablished between the motes 120B1-120BN and the concentrator unit 110B or another concentrator unit (e.g., concentrator 110A or 110C), further readout of data from the motes 120B1-120BN may be reestablished. That is, the mote 120 may revert to a real time data read out mode whereby data is relayed from the motes 120B1-120BN to a concentrator 110 for subsequent readout to other concentrators 110 and/or a line interface unit 130. In addition to the real time or near real-time data provided by the mote 120 to the concentrator unit 110 once real-time data read out resumes, the motes 120B1-120BN may also be operative to provide data from the memory of the mote 120 such that the seismic data stored by the mote 120 during the loss of communication may be read out over time. In this regard, the data read out from the memory may be provided in a trickled fashion. That is, the radio telemetry between the mote 120 and the concentrator 110 may provide dedicated bandwidth (e.g., reserved portions within a packet container defined by the wireless protocol) for interposing of previously recorded seismic data from the memory of the mote 120 upon reestablishment communication with a concentrator 110. In this regard, less than a full record of seismic data may be provided in each given transmission from a mote 120 to the concentrator 110. As such, stored seismic data from the memory of a remote 120 may be trickled out over the remaining course of the survey. Alternatively, in the event the concentrator 110 loses serial communication with other concentrator units 110, but maintains communication with the motes 120, the motes 120 may provide seismic data to the concentrator 110 that may in turn be stored by the concentrator 110. Similarly, once/if communication is reestablished between the concentrator 110 and other units in the array, the concentrator 110 may be operative to interpose such stored seismic data that is stored at concentrator 110 for later readout over the remaining course of the survey.

Furthermore, in the event of loss of communication between the concentrator 110B and other concentrators 110A/110C in the line, the array may be provided with the capability to skip heal such that the disabled concentrator 110B is taken out of the wireless telemetry for the array 100. In this regard, the disabled concentrator 110B may be skipped such that communication up and down the line may be reestablished for the other concentrators 110. In this regard, each of the concentrators 110 may be provided with a data table that may provide, for example, information indicative of the wireless protocol for communication between each of the concentrators 110 within a line of concentrators 110 as described above. For example, a data table may include frequency allocations and/or frequency hopping schedules that are followed by respective concentrators 110 to coordinate communication between the concentrators 110. In this regard, an index may be indicated to each given one of the concentrators 110 that provides an indication within the data table utilized by the concentrator 110 for use in communicating with other adjacent concentrators 110 such that the communicating concentrator 110 may coordinate communication with one or more adjacent concentrators 110. In this regard, each of the concentrators 110 may have awareness of the appropriate protocol parameters for communication with any other of the concentrators 110 within transmission range of a given concentrator 110. In this regard, in the event of a disabled concentrator 110B losing communication, the adjacent concentrators 110A/110C may become aware of the loss of communication with the disabled concentrator 110B such that these adjacent concentrators 110A/110C may coordinate so that the disabled concentrator 110B is removed from the line. As such, the adjacent concentrators 110A/110C may initiate direct communication with each other. This may be initiated at the adjacent concentrators 110A/110C upon recognition of the loss of communication with the disabled concentrator 110B and/or be directed by a central recording unit 140 or other remote unit in the array 100. For example, each of the adjacent concentrators 110A/110C may adjust the index within the data table such that each adjacent concentrator 110A/110C utilizes communication parameters to communicate with each other. This adjustment may be autonomously performed by the adjacent concentrators 110A/110C or a new index may be provided each of the concentrators 110A/110C from the CRU 140.

It may be appreciated that in the case of loss of communication with the disabled concentrator 110B, those concentrators 110 downstream of the disabled concentrator 110B may lose communication with concentrators upstream of the disabled concentrator 110B, and therefore the LIU 130 and CRU 140. In this regard, in an embodiment, the upstream concentrator 110C may automatically adjust its index within the data table for initiation communication with the other adjacent concentrator 110A. Alternatively, in the event the downstream concentrators (i.e., concentrator 110C and those concentrators 110 further downstream from concentrator 110C) lose such communication, the concentrators 110 may revert to an initiation mode whereby the concentrators 110 listen for a beacon signal on one or more predetermined beaconing frequencies and/or communicate a beacon signal on one or more predetermined beaconing frequencies. In this regard, the communication over the beaconing frequencies may allow for reestablishment communication with these downstream concentrators 110.

Furthermore, in such a scenario where the adjacent concentrators 110A/110C skip heal over the disabled concentrator 110B there may be associated with the disabled concentrator 110B a plurality of motes 120B1-120BN that were previously in operative communication with the disabled concentrator 110B. In this regard, the adjacent concentrators 110A/110C that, after the skip healing, are in direct communication with one another may be able to communicate with the now orphaned motes 120B1-120BN such that the orphaned motes 120B1-120BN may establish communication with one of the adjacent concentrator units 110A/110C.

For example, when a mote 120 becomes orphaned (i.e., loses communication with its concentrator 110), the mote 120 may revert to a discovery mode whereby the mote 120 monitors one or more beaconing frequencies in an attempt to establish communication with another concentrator unit 110. In this regard, the adjacent concentrators 110A/110C, upon becoming aware of the loss of communication with the disabled concentrator unit 110B, may initiate transmissions on the one or more beaconing frequencies on which the orphaned motes 120B1-120BN are listening. Upon establishment of communication with the motes 120 on the one or more beaconing frequencies, the adjacent concentrator units 110A/110C may appropriately address the various orphaned motes 120B1-120BN to reestablish communication with the orphaned motes 120B1-120BN.

In this regard, in the event of loss communication with a concentrator 110B, the adjacent concentrators 110A/110C may skip heal the line such that the serial data communication down the line of concentrators 110 is reestablished. This is illustrated in FIG. 24C where concentrator 110A has established communication with concentrator 110C. While the representation depicted in FIG. 24C shows downstream communication from concentrator 110 80 concentrator 110C, it may also be appreciated that upstream communication from 110C to concentrator 110A may also be established. Furthermore, the orphaned motes 120B1-120BN of the disabled concentrator 110 may be reconfigured for operative communication with the adjacent concentrators 110A/110C such seismic data from the orphaned motes 120B1-120BN is still recoverable and capable of being read out in real time or near real-time to one of the adjacent concentrators 110A/110C. Alternatively, in the event of a loss of communication between the orphaned motes 120B1-120BN and a given concentrator 110B, the motes 120B1-120BN may initiate local storage of acquired seismic data at each one of the motes 120 for later read out (e.g., by wireless means, or by physical data connections to the mote 120 upon retrieval the mote 120 from the array 100). For example, the motes 120 may initiate local storage during the reconfiguration process whereby the adjacent concentrators 110A/110C appropriately determine which of the orphaned motes 120B1-120BN will communicate with respective ones of the adjacent concentrators 110A/110C. It may be appreciated that different respective ones of the orphaned motes 120B1-120BN may reestablish communication with different ones of the adjacent concentrators 110A/110C. That is, a subset of the orphaned motes 120B1-120BN may establish communication with concentrator 110A while a second subset (e.g., including the remainder of the motes 120B1-120BN that did not establish communication with concentrator 110A) of the orphaned motes 120B1-120BN may establish communication with concentrator 110B.

In addition, loss of communication with concentrator 110B may also result in difficulties in connection with synchronization of local clocks for units downstream of the disabled concentrator 110B. That is, for example, in the case where the array 100 is synchronized by way of transmission of time reference signals between units in the array as described above, concentrator units 110 may receive a time reference from another unit in the array (e.g., another concentrator unit 110 such as a concentrator unit 110 nearer the CRU 140 than the receiving concentrator unit 110) and thereafter transmit the time reference further upstream for radio synchronization. In turn, a given concentrator 110 may synchronize a local clock of the given concentrator 110 and thereafter provide a synchronization signal using the protocol for concentrator-to-mote communication to synchronize the clocks of each given mote 120 in operative communication with the concentrator 110. That is, a time reference may be received using the wireless telemetry protocol for concentrator-to-concentrator communication and thereafter the time reference may be provided on to motes in communication with a given concentrator using the concentrator-to-mote protocol. It may be appreciated that if communication is lost with a disabled concentrator unit 110B, the motes 120B1-120BN may lack the ability to synchronize the local clocks at each respective mote 120 using the radio synchronization technique. Accordingly, the orphaned motes 120B1-120BN may, in the event the motes 120B1-120BN are provided with a GPS module, begin to synchronize the local clock of the mote 120 utilizing an onboard GPS module. As may be appreciated it may be advantageous to duty cycle the GPS module in this regard so as to reduce battery consumption at the orphaned motes 120B1-120BN. Furthermore, the motes 120 may establish operative communication with adjacent concentrators 110A/110C such that the motes 120 may be operative to receive a synchronization signal from the still operative concentrator units 110A/120B (e.g., even if the motes 120 do not communicate seismic data to the adjacent concentrators 110A/110B). Furthermore, concentrators 110 upstream from the disabled concentrator 110B may also lose the ability to radio synchronize from communications of concentrators 110 downstream from the disabled concentrator unit 110B. In this regard, each of the concentrators 110 upstream from the disabled concentrator 110B may initialize radio synchronization with an onboard GPS module at each of the given concentrators 110B. In turn, a radio synchronization technique may provided to the motes 120 in operative communication with each respective one of these upstream concentrators 110. Furthermore, a given one of the upstream concentrators 110 may synchronize to UTC time using an onboard GPS module and in turn provide further radio synchronization among the upstream concentrators 110 that are still in communication, albeit not with the CRU 140 by way of the potential loss of communication at the disabled concentrator 110B.

As addressed above, it may be advantageous to limit the amount of power dedicated to a GPS module at mote 120 to preserve the serviceable deployment time of the mote 120. As addressed above, certain approaches may include doing away with a GPS module. However, as discussed herein, it is important to precisely know the location of each mote 120 to produce reliable information regarding the subsurface geological structure(s) of interest. However, accurately determining the location of each mote 120 has traditionally placed additional demands on the local power sources thus further limiting serviceable deployment time of the motes 120 (e.g., when each of the motes 120 are equipped with respective on-board GPS modules having GPS receivers, processors for processing received GPS signals, memory, etc.). Furthermore, labor intensive and costly surveying techniques have nevertheless been traditionally required to precisely locate the various units in a survey.

As such, the present disclosure provides embodiments the may include a distributed GPS approach that may reduce power consumption at a mote 120, while providing benefits of synchronization of motes 120 and location of motes 120 utilizing GPS positioning signals. In this regard, a mote 120 may be equipped with a GPS receiver rather than GPS module. A GPS receiver may be capable of acquiring GPS signals from GPS satellites, however, the GPS receiver may lack the processing capacity to analyze the GPS signals to determine the time reference and/or a position of the mote 120. However, the mote 120 may be operative to communicate the acquired GPS signals for remote processing of those GPS signals. For example, the mote 120 may communicate such GPS signals to a concentrator 110. In turn, the concentrator 110 may include a GPS module capable of performing the necessary analysis on the GPS signals received from the mote 120 to determine a location for the mote 120 and/or derive a time reference relative to UTC from the GPS signals. In turn, the location of the mote 120 may be derived. Furthermore, the concentrator 110 may be operative to synchronize a local clock to UTC. In turn, a synchronization signal may in turn be provided to the mote 120 by way of radio communication between the concentrator 110 in the mote 120.

Figure 22:
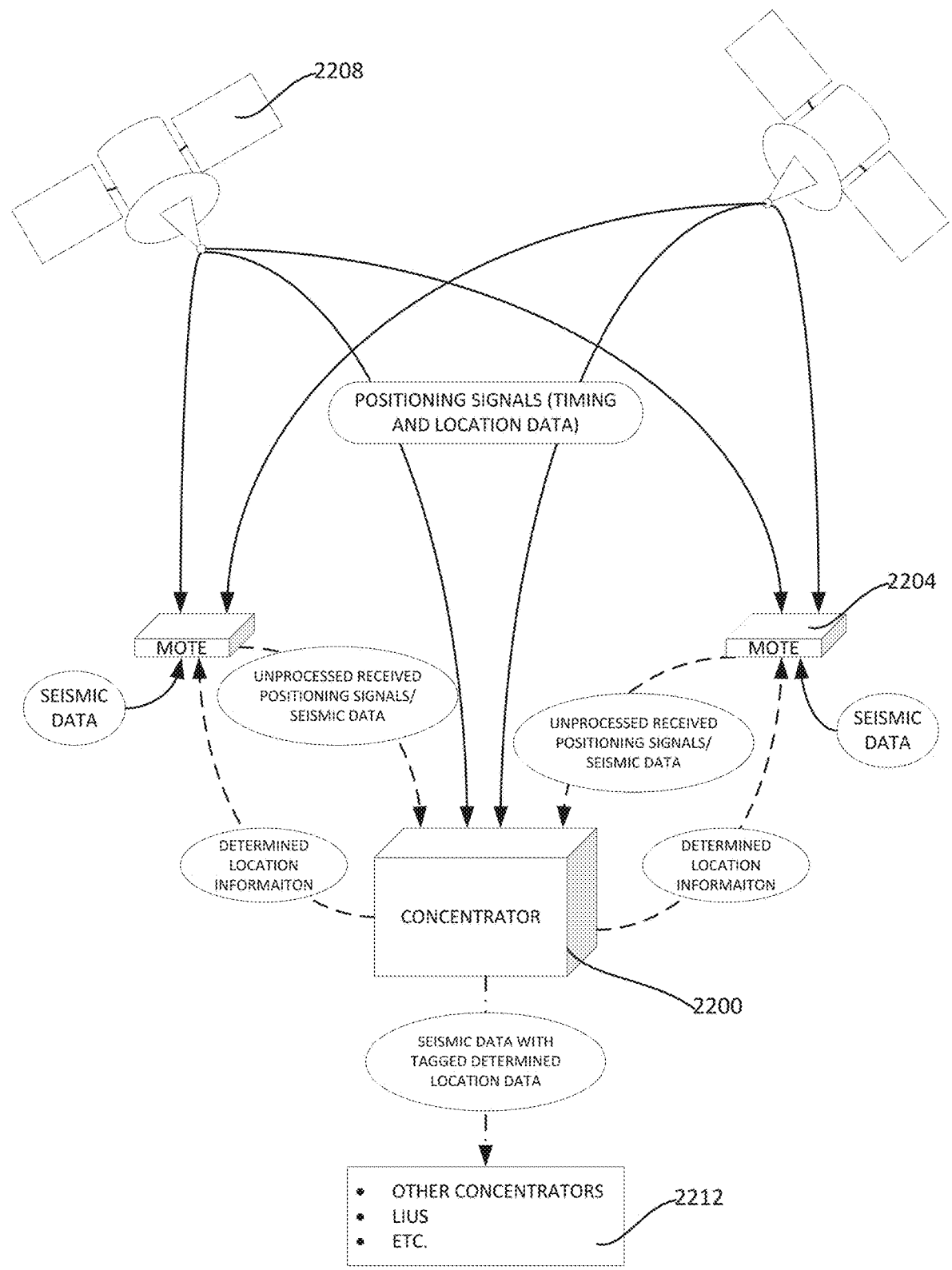
FIG. 22 is a schematic view depicting an embodiment of an operation of a distributed GPS process between motes and a concentrator.
Figure 23:
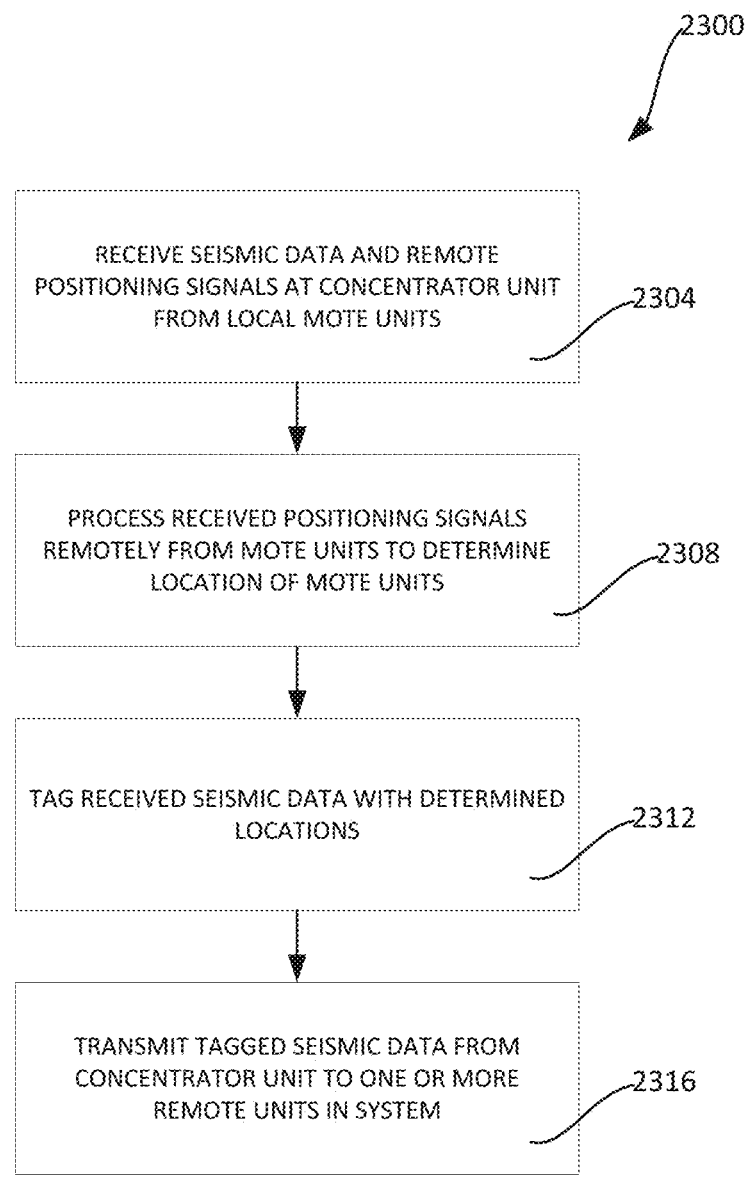
FIG. 23 is a flow chart depicting an embodiment of a method of operation of a distributed GPS process.

In this regard, and turning now to FIG. 22, a schematic diagram illustrating motes receiving positioning signals from a remote positioning system and transmitting the same to a local concentrator for mote location determination is illustrated. In connection with the following discussion in relation to FIG. 22, reference will also be made to FIG. 23 which is a flow diagram of a method 2300 for use in acquiring seismic data in a seismic survey.

At step 2304, seismic data and remote positioning signals (e.g., including location and timing data) may be received at a concentrator unit from one or more local mote units. As shown in FIG. 22, for instance, a plurality of motes 2204 (only two shown in FIG. 22 in the interest of clarity) may acquire subterranean seismic data and remote positioning signals (e.g., GPS signals) from GPS/GNSS satellites 2208 according to any appropriate frequency and in any appropriate manner. The motes 2204 may then wirelessly transmit the acquired seismic data and remote positioning signals to the local concentrator 2200 which may receive the seismic data and remote positioning signals for processing 2308 to determine respective locations (e.g., GPS coordinates or the like) of the motes 2204 as will be discussed in more detail below.

For instance, the motes 2204 may be configured to automatically transmit the seismic data and remote positioning signals to the local concentrator 2200 upon acquisition thereof in substantial real time. In another arrangement, the motes 2204 may store the seismic data and remote positioning signals in internal storage in the case of a network interruption and wirelessly transmit the same to the concentrator 2200 upon restoration of the network connection. In a further arrangement, the motes 2204 may automatically store the seismic data and remote positioning signals in internal storage and only transmit the same to the concentrator 2200 upon a request being sent by the concentrator and received by the motes 2204 according to any appropriate frequency or schedule. In addition to the seismic data and remote positioning signals, the motes 2204 may also transmit corresponding timing references supplied by an internal clock to concentrator 2200.

It is noted that the remote positioning signals received by the motes 2204 may be wirelessly transmitted to the concentrator 2200 in a fully or substantially fully unprocessed state. That is, the motes 2204 substantially retransmit the remote positioning signals received from the satellites 2208 and/or other remote positioning system to the concentrator 2200 in a substantially raw form (e.g., free or substantially free of processing the remote positioning signals). This arrangement reduces the amount and/or degree of signal processing that needs to occur in the motes 2204, thereby limiting the costs associated with producing and operating the motes 2204.

In one arrangement, the concentrator 2200 may solicit (e.g., broadcast a request for) positioning information (e.g., remote positioning signals) from motes 2204 and process the received remote positioning signals in view of its own location to form a "network" of local motes 2204 from which the concentrator 2200 is to subsequently receive seismic data. This arrangement advantageously limits the need for system installers to have to manually determine which subsets of the plurality of plurality of motes 2204 are to send data to which of the plurality of concentrators 2200.

In any event, and returning to FIG. 23, the method 2300 may include processing 2308 the received remote positioning signals from the motes 2204 (e.g., from the determined local network of motes 2204) at a location remote from the motes 2204 to determine a location of the motes 2204. As one example, the concentrator 2200 may be configured to process the received remote positioning signals to determine the locations of the motes 2204. For instance, the concentrator 2200 may utilize real time kinematics (RTK) whereby the concentrator 2200 serves as the base station while each local mote unit 2204 serves as a rover station. After making an initial determination of the location of each mote 604 with the received positioning signals, the concentrator 2200 may utilize its location together with any appropriate code and carrier measurements to fix any phase ambiguities in the initially determined location of the mote 2204 to resolve the location of each mote 2204 to sub-meter levels of accuracy (e.g., less than 10 cm accuracy, such as less than 5 cm accuracy).

As another example, the concentrator 2200 may utilize differential processing whereby the remote positioning signals received from each mote 2204 may be processed in combination with positioning signals received directly at the concentrator 2200 to resolve the location of each mote 2204 to sub-meter levels of accuracy. More specifically, it may be accurately assumed that each mote 2204 may be stationary in the array 100. In turn, time spread approach to GPS signal acquisition may be utilized whereby a given mote 2204 may acquire GPS signals over a relatively long duration (e.g., longer than a given GPS epoch). The acquisition of such GPS signals over this duration may allow for highly precise determination of a location of the mote 2204. It may further be appreciated that, assuming stationary motes 2204, it may not be necessary to determine the location of each mote 2204 prior to initiation of the survey. That is, the motes 2204 may require positioning signals over the duration of the survey such that processing of the GPS signals after the initiation of the survey may provide highly precise determination of the location of the mote 2204 based on the GPS signals acquired over a relatively long duration. The precision of the location of the mote 2204 may improve given the potential to acquire signals from a plurality of GPS satellites in many different relative orientations to the mote 2204. In this regard, the geometric diminishment of precision values for remote 2204 may be very low based on the time spread acquisition of GPS signals. Furthermore, with the increased number of GPS signals processed, the noise or biases present in any one of the given GPS signals may be filtered such that a very accurate and highly precise measurement of the mote 2204 location may be determined.

While the processing of the remote positioning signals from the motes 2204 to determine their locations at sub-meter levels of accuracy has been discussed above as occurring at each concentrator 2200, other embodiments of the present disclosure alternatively or additionally include such processing as occurring at other platforms remote from the motes 2204 and the concentrator 2200. For instance, each concentrator 600 may transmit the "raw" remote positioning signals received from its local motes 2204 to an LIU (e.g., an LIU 130 of the row or line within which the concentrator is located, via concentrator-to-concentrator transmission using a mid-range wireless protocol within the row or line) which may have functionality to processes the raw remote positioning signals to determine the locations of the motes 604 and transmit the locations back to the various concentrators 2200. Alternatively, the LIUs may transmit the received remote positioning signals to a further remote platform (e.g., CRU 140 of FIG. 1) which may serve to determine the locations of the motes 2204 and send the same back to the concentrators 2200 via the LIUs and/or in other manners. Still further, each concentrator 2200 may transmit the remote positioning signals received from its local motes 2204 to another remote platform (e.g., using a different wireless protocol than those for communications with the motes 2204 or adjacent concentrators 2200) for location determination of the motes 2204 which may serve to return the determined locations to the concentrators 200 in any appropriate manner.

Again returning back to FIG. 23, the method 2300 may include tagging 2312 (e.g., associating, linking, etc.) seismic data received from the motes with the determined locations of the motes. As one example, the concentrator 2200 may process 2308 the received (raw) remote positioning signals to determine mote locations in substantial real-time (e.g., upon receiving 2304 the remote positioning signals) and immediately tag 2312 the determined location with the seismic data received with the raw remote positioning signals used to determine the location and store the same in any appropriate data structure. For instance, the concentrator 2000 may process 2308 the remote positioning signals in the order they are received from each mote 2204. As another example, the receiving step 2304 of the method 2300 may include the concentrator 2200 of FIG. 22 initially storing the seismic data and associated (unprocessed) remote positioning signals from the various motes 2204 in any appropriate data structure. After the positioning signals have been processed 2308 (e.g., either at the concentrator 2200 and/or other platform remote from the motes 2204) to determine the locations of the motes 2204, the concentrator 2200 may then tag or append each determined location to the seismic data in the data structure associated with unprocessed (raw) remote positioning signals that correspond to the determined location (i.e., the remote positioning signals used to generate the determined location).

In one arrangement, the concentrator 2200 may also appropriately synchronize timing references received with the seismic data and remote positioning signals from the various motes 2204 (e.g., in the case where such timing references are local to each of the various motes 2204) to a standardized time (e.g., UTC or GPS time) to facilitate accurate subsequent processing and analysis of the seismic data (e.g., by CRU 140 or the like). In another arrangement, the concentrator 2200 may periodically transmit synchronized timing references to each of its local motes 2204, where each mote 2204 may utilize the received timing references to update its local clock to a standardized/synchronized time across all of the motes 2204. The updated/synchronized time may then be appended to the seismic data before transmitted the same to the concentrator 2200.

Referring again to FIGS. 22-23, the method 2300 may then include transmitting 2316 the seismic data and tagged determined mote locations from the concentrator 2200 to one or more remote units/components 2212 in the system. For instance, each concentrator 2200 (e.g., each concentrator 110 of FIG. 1) may transmit the tagged seismic data to adjacent concentrators 2200 (e.g., in a "bucket brigade or serial data transfer path) which may eventually be received by a corresponding LIU (e.g., LIU 130 of FIG. 1). The various LIUs 130 may then appropriately transmit (e.g., wired or wirelessly) the tagged seismic data to adjacent LIUs (e.g., in a bucket brigade) all of which may be received and appropriately stored by CRU 140 (e.g., in any appropriate non-volatile memory such as solid state drives, RAIDs, etc.) for further processing, analysis, retrieval, etc.

The CRU 140 of FIG. 1 may take various forms and be implemented in a variety of manners to efficiently store and make available the large amounts of seismic data that may be generated by the various motes 120 of the system 100 (e.g., up to and beyond 25,000 channels). In one arrangement, the CRU 140 may be implemented by way of a multi-backhaul, multi-server model (e.g., a "distributed server model) with one client controlling three servers, one of which is a master and the other two of which are slaves. In another arrangement, the CRU 140 may be implemented by way of one backhaul with a single client and server (e.g. a "distributed collection model). In this arrangement, data would be stored in several locations on a line, where the data could be stored in a file format in accord with industry standards.

In one arrangement, and as shown in FIG. 22, the concentrator 2200 may transmit the determined locations (e.g., from the processing step 2308 of FIG. 23) back to each of its respective local motes 2204 which may store the determined locations and append the same to seismic data subsequently received and transmitted to the concentrator 2200. This arrangement may advantageously allow the motes 2204 to at least temporarily cease transmitting raw remote positioning signals to the concentrator 2200 thus reducing bandwidth usage. In one variation, the concentrator 2200 may periodically solicit raw positioning signals from its local motes 2204 for use in re-determining the mote locations and comparing against or otherwise validating the mote locations received with the seismic data from the motes 2204. For instance, in the case the re-determined location was more than "x" distance away from the mote locations received with the seismic data from the motes 2204 (the latter being previously transmitted from the concentrator 2200 to the motes 2204), the concentrator 2200 may replace the previously determined location with the re-determined location and send the re-determined location to the motes 2204 for subsequent use.

Turning now to FIGS. 25A-25E, various simplified screenshots 2400 of a dashboard are illustrated that are broadly configured to present various types of information related to a seismic survey (e.g., such as those disclosed herein) to an operator, technician and/or the like associated with the seismic survey. The dashboard may be in the form of any appropriate software module or package that is executable on any appropriate computing device(s) and is configured to communicate with the CRU 140 (or other data repository) to retrieve data, telemetry information, etc. related to the seismic survey (e.g., in substantially real time) and then process and present the same in various manners to convey various types of information related to the seismic survey. As just one example, the dashboard may run on any appropriate central server or computing device that is remotely accessible by users via any appropriate web-based interface. Alternatively, the dashboard may run on a computing device at the central recording unit 140. Also the dashboards may be used to control various functions of the array.

Broadly, the screenshots 2400 may include various display portions 2404 that convey information regarding the seismic survey based on a particular zoom level selected by a user (e.g., via manipulation of zoom toolbar 2408). For instance, the display portion 2404 in the screenshot $2400_1$ of FIG. 25A may present array-wide information regarding the array as a whole (e.g., note how toggle on zoom toolbar 2408 is zoomed out to the highest level). One basic level or type of information that may be conveyed in the display portion 2404 is a real-time operational status of the array as a whole such as "working," "down," "completed," etc. (e.g., in any appropriate manner such as via color coding, graphics, and/or the like).

Operators may be able to customize various parameters usable by the dashboard to determine the appropriate status to convey in the screenshot $2400_1$ of FIG. 25A. As an example, FIG. 26 presents a screenshot 2500 of spread threshold parameters 2504 that may be customizable by a user, where the dashboard analyzes data of the array as a whole in view of the spread threshold parameters 2504 to determine the particular status to convey in the display portion of the screenshot $2400_1$ of FIG. 25A. As just one example, the "Max Consecutive Defective Stations" parameter may specify the maximum number of consecutive concentrators 110 that may be defective in any particular line of the survey (e.g., as determined by the inability of an adjacent concentrator 110 to establish a connection with the concentrator and/or in various other manners) before the entire survey is stopped and the status thereof is considered "down." In one arrangement, detection of any one of the thresholds being exceeded may trigger at least temporary suspension of the survey and a "down" status of the like being conveyed in the screenshot $2400_1$ of FIG. 25A. The screenshot $2400_1$ of FIG. 25A may also convey various other types of information regarding the survey as a whole.

Figure 25B:
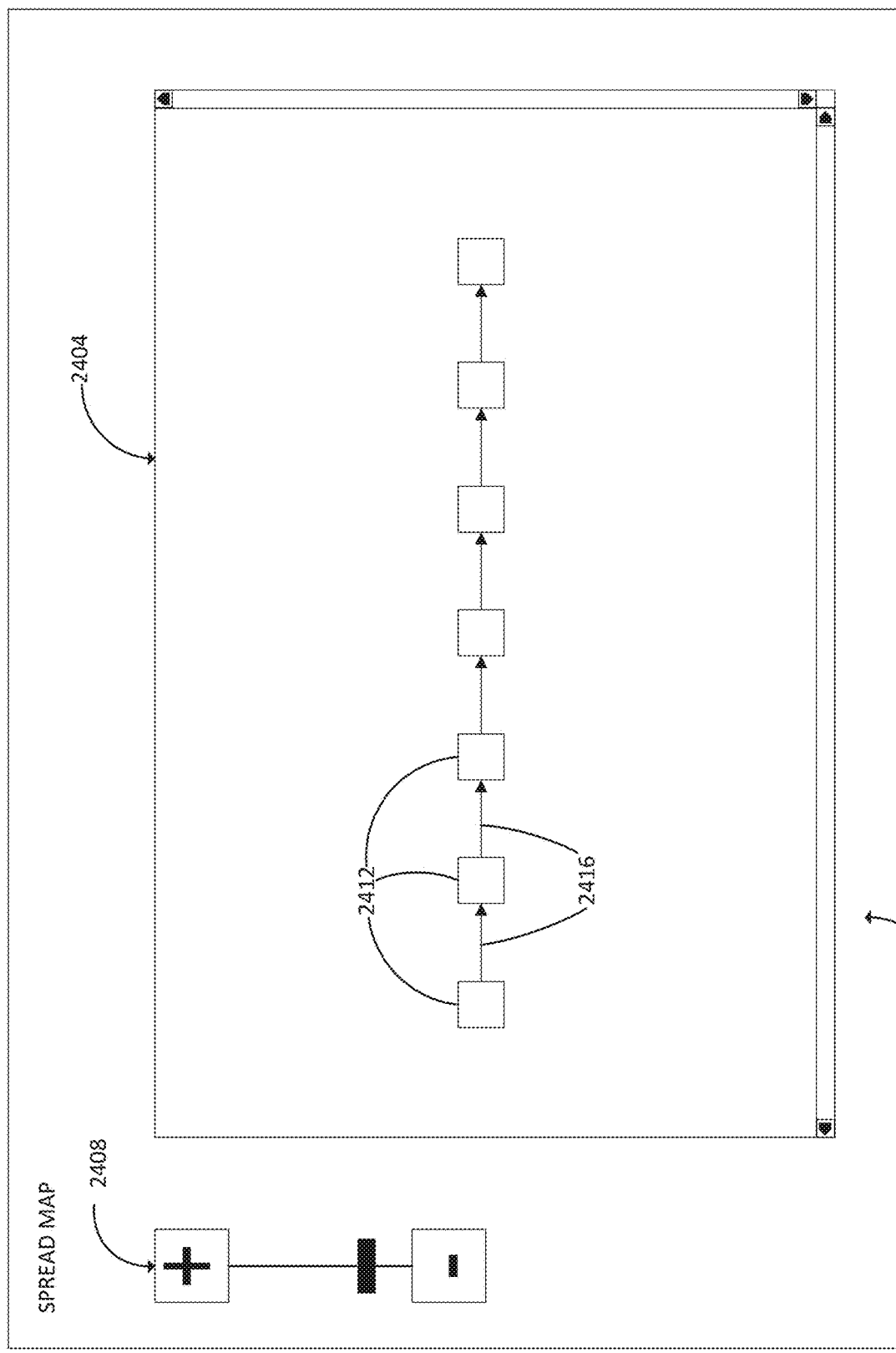
Figure 26:
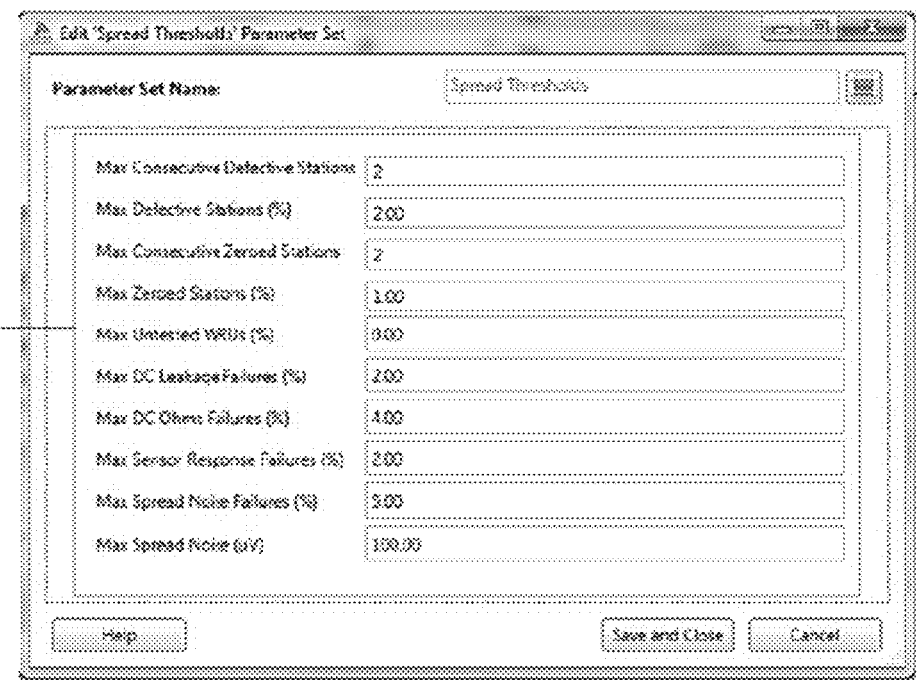
FIG. 26 depicts a parameter selection window for use in an embodiment of a dashboard to control operation of a hierarchical array for readout of seismic data based on a plurality of selectable parameters regarding the array.

Turning now to FIG. 25B, another screenshot $2400_2$ of the dashboard is presented upon a user zooming into the LIU layer of the survey. As an example, the display portion 2404 of FIG. 25B may include a plurality of graphical icons that illustrate and/or provide access to information regarding the various LIUs 2412 (e.g., LIUs 130 of FIG. 1) as well as the respective wired or wireless connections 2416 therebetween. For instance, the LIUs 2412 and connections 2416 may be appropriately color coded or the like to indicate a status thereof (e.g., working, down, etc.). One or more other pieces of information may also be presented by, on or adjacent each of the LIUs 2412 and connections 2416 such as serial number, battery life, information regarding data received/sent, etc. In one arrangement, a user may be able to obtain more detailed information regarding a particular LIU 2412 or connection 2416 by manipulating (e.g., tapping, clicking, etc.) the same which may trigger the dashboard to present the same in one or more further screenshots.

Figure 25C:
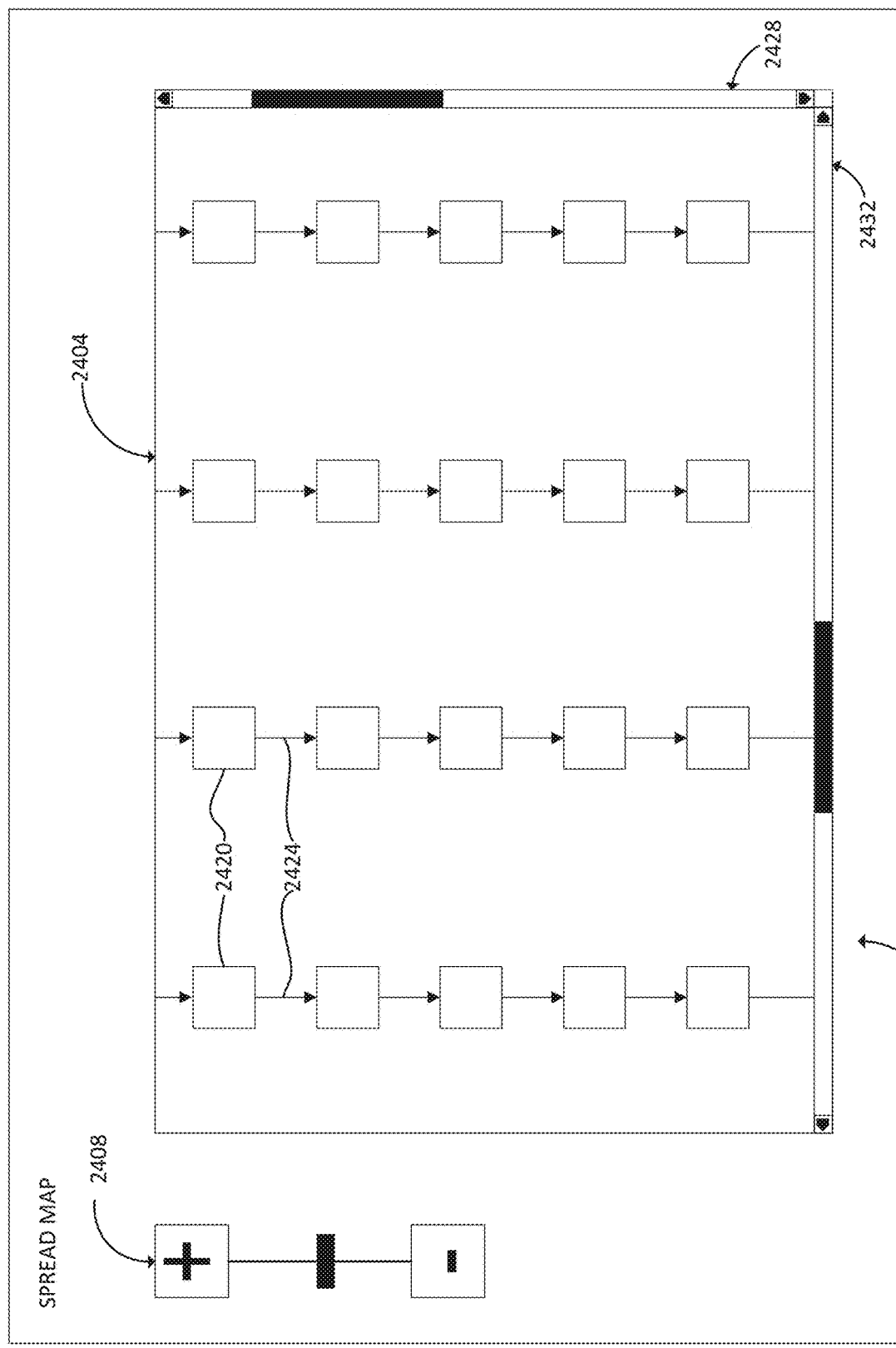

Turning now to FIG. 25C, another screenshot $2400_3$ of the dashboard is presented upon a user zooming into the concentrator layer of the survey. As an example, the display portion 2404 of FIG. 25C may include a plurality of graphical icons that illustrate and/or provide access to information regarding the various concentrators 2420 (e.g., concentrators 110 of FIG. 1) as well as the respective wireless connections 2424 therebetween. Again, the concentrators 2420 and connections 2424 may be appropriately color coded or the like to indicate a status thereof (e.g., working, down, etc.). One or more other pieces of information may also be presented by, on or adjacent each of the LIUs 2412 and connections 2416 such as serial number, battery life, information regarding data received/sent, etc. In one arrangement, a user may be able to obtain more detailed information regarding a particular concentrator 2420 or connection 2424 by manipulating (e.g., tapping, clicking, etc.) the same which may trigger the dashboard to present the same in further screenshots. In the event a user wants information regarding a concentrator 2420 or connection 2424 not presented in the display portion 2404, the user may appropriately manipulate vertical and/or horizontal scroll bars 2428, 2432 to locate the same.

FIG. 25D presents another screenshot $2400_4$ of the dashboard upon a user zooming into the mote layer of the survey. As an example, the display portion 2404 of FIG. 25D may include a plurality of graphical icons that illustrate and/or provide access to information regarding the various motes 2436 (e.g., motes 120 of FIG. 1) as well as the respective wireless connections 2440 between each mote 2436 and the concentrator 2420 with which the mote 2436 is communicating (e.g., or is supposed to be communicating) as part of the seismic survey. In one arrangement, the presence of a wireless connection 2440 between a mote 2436 and a concentrator 2420 indicates that a connection is active while the absence of a wireless connection 2440 between a mote 2436 and a concentrator 2420 indicates that no active connection exists between the mote 2436 and the concentrator 2420. In one arrangement, each mote 2436 may be color coded or the like to indicate a particular acquisition state of the mote 2436 such as "armed" (e.g., currently sending data to the particular concentrator 2420 identified by the connection 2440 emanating from the mote 2436), "standby" (e.g., not currently sending data to the particular concentrator 2420, but could be doing so upon signaling by the concentrator 2420), "dead" (e.g., not sending data and not able to do so for one or more reasons), etc.

One or more other pieces of information may also be presented by, on or adjacent each of the motes 2436 such as serial number, battery life, memory, humidity level (e.g., indicative of a possible breach of geophone seal), information regarding data received/sent, etc. Various information may also be presented in association with each of the connections 2440 and/or concentrators 2420 as discussed previously. Again, a user may be able to obtain more detailed information regarding a particular mote 2436 or connection 2440 by manipulating (e.g., tapping, clicking, etc.) the same and/or vertical and/or horizontal scroll bars 2428, 2432.

Figure 25E:
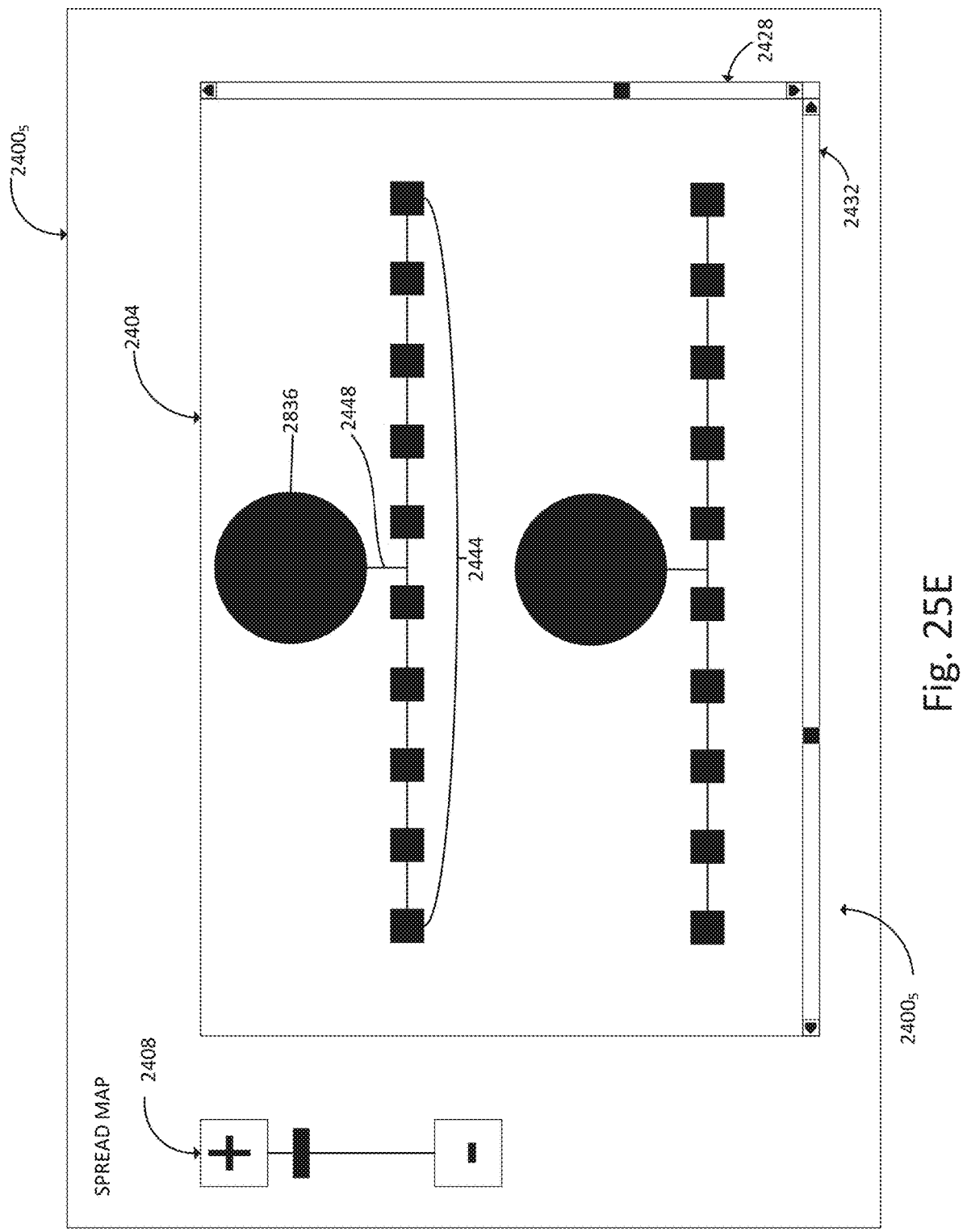

FIG. 25E presents another screenshot $2400_5$ of the dashboard upon a user zooming into the geophone layer of the survey (e.g., see FIG. 12B). As an example, the display portion 2404 of FIG. 25E may include a plurality of graphical icons that illustrate and/or provide access to information regarding the various strings of geophones 2444 (e.g., geophones 914 of FIG. 12B) as well as the various connections 2448 between adjacent geophones 2444 in a string and the mote 2836 to which the geophones 2444 are configured to send seismic data and the like as part of the seismic survey. Again, the various graphical icons may be appropriately colored and/or like and/or manipulated to convey or obtain various additional information regarding the same.

In view of the potentially large scale of the disclosed seismic survey (e.g., thousands of concentrators, hundreds of thousands of motes, etc.), it may be advantageous to substantially decouple the process of collecting seismic and other data by the motes and concentrators on the one hand and the process of acquiring the collected data from the motes and concentrators by the CRU or other data repository on the other hand to facilitate performance of the seismic survey. That is, it may be advantageous in some situations to not necessarily acquire the seismic and other data by the CRU or other data repository from the concentrators in substantial real time as the same is being collected by the concentrators.

For instance, system operators may coordinate the acquisition of seismic data from certain groups of concentrators that have already collected and stored seismic data from one or more shots while other groups of concentrators are still collecting seismic data or have not even begun the collection of seismic data. In this pursuit, one or more of the above-discussed screenshots may appropriately convey information regarding seismic and related data acquired or to be acquired by the CRU or other data repository from the various motes (via the concentrators, LIUs, etc.), such as whether or not seismic data is stored in memory at each particular concentrator, whether or not seismic data has been acquired by the CRU or other data repository from each particular concentrator, etc., all of which may be conveyed on a shot by shot basis.

With reference to the screenshot $2400_3$ of FIG. 25C, for example, each concentrator 2420 may be color coded, flagged, etc. to indicate a presence of seismic data and/or whether seismic data has already been acquired therefrom on a shot by shot basis. For instance, a user may manipulate any appropriate toolbar or the like (not shown) to toggle between respective shots of the survey. The motes 2436 of the screenshot $2400_4$ of FIG. 25D may also be similarly color coded or the like. This information can guide system operators as to those concentrators from which seismic data still needs to be acquired to complete the seismic survey.

As just one example, assume one of the concentrators 2420 of FIG. 25C indicates to an operator that it has no seismic data stored for a particular shot nor has the CRU even acquired any seismic data from the concentrator for the particular shot. As part of investigating the same, the operator may manipulate the zoom toolbar 2408 to display the mote layers of the survey (e.g., the screenshot $2400_4$ of FIG. 25D). Alternatively, the operator may manipulate (e.g., click, tap) the particular concentrator 2420 in FIG. 25C to display the screenshot $2400_4$ of FIG. 25D. In any case, assume one of the concentrators 2420 in FIG. 25D corresponds to the above-discussed concentrator of FIG. 25C and that there are motes 2436 near the concentrator 2420 with stored seismic data (e.g., as indicated by color coding or the like) but without any connections 2440 to the concentrator 2420 (or to any other concentrators 2420).

In one arrangement, the operator may attempt to establish connections between one or more other concentrators 2420 of the array and the motes 2436 storing yet to be acquired seismic data for one or more particular shots and then acquire the same. In the event the operator is successful, the motes 2436, connections 2440, etc. in the screenshots may update accordingly. In the event the operator is unsuccessful, the operator may deploy technicians to manually retrieve the stored seismic data from the particular motes 2436. The dashboard may be utilized in numerous other manners to facilitate acquisition of collected data, troubleshooting regarding the same, and the like.

While the invention has been illustrated and described in detail in the drawings and foregoing description, such illustration and description is to be considered as exemplary and not restrictive in character. For example, certain embodiments described hereinabove may be combinable with other described embodiments and/or arranged in other ways (e.g., process elements may be performed in other sequences). Accordingly, it should be understood that only the preferred embodiment and variants thereof have been shown and described and that all changes and modifications that come within the spirit of the invention are desired to be protected.

What is claimed is:

1. A seismic system for use in conducting a seismic survey, comprising:
    a concentrator for wirelessly receiving seismic data via a first wireless protocol from a plurality of motes and for wirelessly transmitting the seismic data via a second wireless protocol to another concentrator;
    first and second wireless motes of the plurality of motes, each of the wireless motes including a sensor for acquiring seismic data and a short-range radio for communicating with the concentrator via the first wireless protocol enabling communication between the first wireless mote and the concentrator and the second wireless mote and the concentrator wherein the short-range radio of each of the first and second motes is adapted for short-range communications;
    wherein at least one of said first and second wireless motes has a local memory and is operative for detecting a loss of communication with said concentrator and to record seismic data in said local memory in response to said detecting.

2. The system of claim 1, wherein the short-range radio of each of the first and second motes is adapted for short range communications of less than 100 m.

3. The system of claim 2, wherein the concentrator is adapted for mid-range wireless communications of greater than 100 m.

4. The system of claim 1, wherein said at least one of said first and second wireless motes is further operative for detecting re-establishment of communication with said concentrator and to send the stored seismic data to the concentrator.

5. A method for use in seismic data acquisition, comprising:
    detecting loss of communication with a disabled concentrator in a serial data transmission line comprising a plurality of concentrators, wherein each concentrator is in operative communication with a plurality of motes to receive acquired seismic data from the plurality of motes; and
    recording seismic data at a local memory of each of a plurality of motes orphaned by the disabled concentrator in response to the detecting by the at least one of the plurality of wireless motes.

6. The method of claim 5, further comprising:
    reestablishing operative communication between the plurality of motes orphaned by the disabled concentrator and the disabled concentrator; and
        transmitting the seismic data recorded at the local memory of each of the plurality of motes orphaned by the disabled concentrator to the disabled concentrator.

7. The method of claim 6, wherein the transmitting further comprises:
    sending real time seismic data from each of the plurality of motes orphaned by the disabled concentrator to the disabled concentrator and sending the seismic data recorded at the local memory of each of the plurality of motes orphaned by the disabled concentrator to the disabled concentrator in a common transmission packet.

8. The method of claim 6, wherein the seismic data recorded at the local memory of each of the plurality of motes orphaned by the disabled concentrator sent to the disabled concentrator comprises less than an entire seismic data record.

9. The method of claim 5, wherein the method further comprises:
    enabling a GPS module at each of the plurality of motes orphaned by the disabled concentrator;
    synchronizing a local clock at each of the orphaned motes using the GPS module; and
    tagging the seismic data seismic data recorded at the local memory of each of the orphaned motes with a time stamp from the local clock of each of the orphaned motes.

10. The method of claim 5, further comprising:
    enabling a GPS module of at least one upstream concentrator disposed upstream of the disabled concentrator in the serial data transmission line; and
    synchronizing a local clock at the at least one upstream concentrator using the GPS module.

11. The method of claim 10, wherein the at least one upstream concentrator provides a synchronization signal to a plurality of motes in operative communication with the at least one upstream concentrator based on the local clock of the at least one upstream concentrator.

12. The method of claim 11, wherein the at least one upstream concentrator communicates a time reference based on the local clock of the at least one upstream concentrator to at least one other upstream concentrator, and wherein the at least one other upstream concentrator provides a synchronization signal to a plurality of motes in operative communication with the at least one other upstream concentrator.

13. The method of claim 10, further comprising:
    enabling a GPS module of each of a plurality of motes in operative communication with the at least one upstream concentrator; and
    synchronizing a local clock at each of the plurality of motes using the respective GPS module of each mote.

* * * * *